(12) United States Patent
Wu et al.

(10) Patent No.: US 11,668,902 B2
(45) Date of Patent: Jun. 6, 2023

(54) LENS ASSEMBLY

(71) Applicants: Sintai Optical (Shenzhen) Co., Ltd., ShenZhen (CN); Asia Optical Co., Inc., Taichung (TW)

(72) Inventors: Guo-Yang Wu, Taichung (TW); Bo-Yan Chen, Taichung (TW); Hsi-Ling Chang, Taichung (TW); Chun-Yang Yao, Taichung (TW); Chien-Hung Chen, Taichung (TW)

(73) Assignees: SINTAI OPTICAL (SHENZHEN) CO., LTD., Shenzhen (CN); ASIA OPTICAL CO., INC., Taichung (TW)

( * ) Notice: Subject to any disclaimer, the term of this patent is extended or adjusted under 35 U.S.C. 154(b) by 411 days.

(21) Appl. No.: 17/004,255

(22) Filed: Aug. 27, 2020

(65) Prior Publication Data

US 2021/0096325 A1 Apr. 1, 2021

(30) Foreign Application Priority Data

Sep. 27, 2019 (CN) .......................... 201910923848.4
Oct. 31, 2019 (TW) .................................. 108139552
Mar. 5, 2020 (TW) .................................. 109107271

(51) Int. Cl.
  *G02B 9/62* (2006.01)
  *G02B 13/00* (2006.01)

(52) U.S. Cl.
  CPC ............ *G02B 9/62* (2013.01); *G02B 13/0045* (2013.01); *G02B 13/0065* (2013.01)

(58) Field of Classification Search
  CPC .. G02B 9/62; G02B 13/0045; G02B 13/0065; G02B 13/004
  See application file for complete search history.

(56) References Cited

U.S. PATENT DOCUMENTS 7,423,810 B2  9/2008  Bito et al.
9,191,561 B2  4/2015  Lin et al.
(Continued)

FOREIGN PATENT DOCUMENTS

CN    1573407 A    2/2005
CN  106154497 A   11/2016
(Continued)

OTHER PUBLICATIONS

US 10,698,175 B2, 06/2020, Liao et al. (withdrawn)
(Continued)

*Primary Examiner* — Pinping Sun
*Assistant Examiner* — Jhein L Siclon
(74) *Attorney, Agent, or Firm* — McClure, Qualey & Rodack, LLP

(57) ABSTRACT

A lens assembly includes a first lens, a second lens, a third lens, and a fourth lens. The first lens is with positive refractive power and includes a concave surface facing an object side and a convex surface facing an image side. The second lens is with negative refractive power and includes a concave surface facing the object side. The third lens is with positive refractive power. The fourth lens is with refractive power and includes a concave surface facing the image side. The first lens, the second lens, the third lens, and the fourth lens are arranged in order from the object side to the image side along an optical axis. The lens assembly satisfies: TTL/f>1.2; wherein TTL is a total length of optical system of the lens assembly and f is an effective focal length of the lens assembly.

20 Claims, 52 Drawing Sheets

(56) References Cited

U.S. PATENT DOCUMENTS

| | | |
|---|---|---|
| 9,128,266 B2 | 9/2015 | Chen |
| 9,164,257 B2 | 10/2015 | Lin et al. |
| 9,316,810 B2 | 4/2016 | Mercado |
| 9,557,535 B1 | 1/2017 | Liao et al. |
| 9,557,627 B2 | 1/2017 | Mercado |
| 9,869,846 B1 * | 1/2018 | Bone .................. G02B 9/56 |
| 9,897,780 B1 | 2/2018 | Bone et al. |
| 10,215,955 B2 | 2/2019 | Lin et al. |
| 10,234,659 B2 | 3/2019 | Yao et al. |
| 10,302,906 B2 | 5/2019 | Cao et al. |
| 10,509,203 B2 | 12/2019 | Lee |
| 10,539,766 B2 | 1/2020 | Shiokawa et al. |
| 10,684,453 B2 | 6/2020 | Lai et al. |
| 2004/0257677 A1 * | 12/2004 | Matsusaka ............ G02B 13/18 359/783 |
| 2013/0279023 A1 | 10/2013 | Chen |
| 2015/0103241 A1 * | 4/2015 | Lin .................. G02B 13/0045 359/740 |
| 2016/0170176 A1 | 6/2016 | Liao et al. |
| 2016/0223796 A1 * | 8/2016 | Lee ..................... G02B 9/62 |
| 2016/0231540 A1 * | 8/2016 | Mercado .............. G02B 9/56 |
| 2018/0267271 A1 * | 9/2018 | Tseng ............... G02B 13/0045 |
| 2019/0227281 A1 | 7/2019 | Baik et al. |

FOREIGN PATENT DOCUMENTS

| | | | |
|---|---|---|---|
| CN | 106802463 A | 6/2017 | |
| CN | 107085277 A | 8/2017 | |
| CN | 107085278 A | 8/2017 | |
| CN | 107085286 A | 8/2017 | |
| CN | 107193109 A | 9/2017 | |
| CN | 107462976 A | 12/2017 | |
| CN | 107577033 A * | 1/2018 | ......... G02B 13/0045 |
| CN | 108267835 A | 7/2018 | |
| CN | 110261994 A | 9/2019 | |
| CN | 110275273 A | 9/2019 | |
| JP | 2012194597 A | 10/2012 | |
| JP | 2016126133 A | 7/2016 | |
| TW | 201418762 A | 5/2014 | |
| TW | 201421063 A | 6/2014 | |
| TW | 201447353 A | 12/2014 | |
| TW | 201539026 A | 10/2015 | |
| TW | 201539028 A | 10/2015 | |
| TW | 201710734 A | 3/2017 | |
| TW | 201723562 A | 7/2017 | |
| TW | 201723577 A | 7/2017 | |
| TW | 201818114 A | 5/2018 | |
| TW | 201913158 A | 4/2019 | |
| TW | 201913163 A | 4/2019 | |
| TW | 202001324 A | 1/2020 | |
| WO | 2007145194 A1 | 12/2007 | |
| WO | 2017172794 A1 | 10/2017 | |

OTHER PUBLICATIONS

Michael Pfeffer, "Optomechanics of Plastic Optical Components", p. 23 of the "Handbook of Optics" edited by Stefan Baumer, 2010, Wiley-VCH (Year: 2010).*

* cited by examiner

LENS ASSEMBLY

BACKGROUND OF THE INVENTION

Field of the Invention

The invention relates to a lens assembly.

Description of the Related Art

The current development trend of a lens assembly for mobile phone is toward high resolution. The number of lenses used in the lens assembly for mobile phone is increasing, making the total length of the lens assembly for mobile phone is getting longer, which can no longer meet the requirements of thin and light for mobile phone. Therefore, the lens assembly needs a new structure in order to meet the requirements of high resolution and miniaturization at the same time.

BRIEF SUMMARY OF THE INVENTION

The invention provides a lens assembly to solve the above problems. The lens assembly of the invention is provided with characteristics of a shortened total lens length, an increased resolution, and still has a good optical performance.

The lens assembly in accordance with an exemplary embodiment of the invention includes a first lens, a second lens, a third lens, and a fourth lens. The first lens is with positive refractive power and includes a concave surface facing an object side and a convex surface facing an image side. The second lens is with negative refractive power and includes a concave surface facing the object side. The third lens is with positive refractive power. The fourth lens is with refractive power and includes a concave surface facing the image side. The first lens, the second lens, the third lens, and the fourth lens are arranged in order from the object side to the image side along an optical axis. The lens assembly satisfies: TTL/f>2; wherein TTL is a total length of optical system of the lens assembly and f is an effective focal length of the lens assembly.

The lens assembly in accordance with another exemplary embodiment of the invention includes a first lens, a second lens, a third lens, a fourth lens, and a reflective element. The first lens is with positive refractive power and includes a convex surface facing an image side. The second lens is with negative refractive power and includes a concave surface facing an object side. The third lens is with positive refractive power. The fourth lens is with refractive power and includes a concave surface facing the image side. The reflective element includes a reflective surface. The first lens, the second lens, the third lens, and the fourth lens are arranged in order from the object side to the image side along an optical axis. The reflective element is disposed between the first lens and the fourth lens. The lens assembly satisfies: 2 mm<L<6 mm; wherein L is an interval from an object side surface of a lens closest to the object side to the reflective surface along the optical axis.

In another exemplary embodiment, the lens assembly further includes a reflective element disposed between the first lens and the fourth lens, the reflective element includes a reflective surface.

In yet another exemplary embodiment, the second lens further includes a convex surface or a concave surface facing the image side, the third lens includes a convex surface facing the object side.

In another exemplary embodiment, the third lens further includes a concave surface or another convex surface facing the image side, the fourth lens is with negative refractive power and further includes a convex surface facing the object side.

In yet another exemplary embodiment, the lens assembly further includes a fifth lens disposed between the object side and the first lens, the fifth lens is a meniscus lens with positive refractive power and includes a convex surface facing the object side and a concave surface facing the image side, the third lens further includes a plane surface or another convex surface facing the image side, the fourth lens is with negative refractive power and further includes a plane surface or a convex surface facing the object side.

In another exemplary embodiment, the lens assembly further includes a fifth lens disposed between the fourth lens and the image side or the third lens and the fourth lens, the fifth lens is with positive refractive power and includes a convex surface facing the image side.

In yet another exemplary embodiment, the fifth lens further includes another convex surface facing the object side, the second lens further includes a convex surface or a concave surface facing the image side, the third lens includes a convex surface facing the object side and a concave surface or a convex surface facing the image side, the fourth lens is with positive or negative refractive power and further includes a convex surface facing the object side.

In another exemplary embodiment, the lens assembly further includes a sixth lens disposed between the third lens and the fifth lens, the sixth lens is a meniscus lens with negative refractive power and includes a concave surface facing the object side and a convex surface facing the image side, the fifth lens is a meniscus lens and further includes a concave surface facing the object side, the second lens further includes another concave surface facing the image side, the third lens further includes another convex surface facing the image side, the fourth lens is with positive refractive power and further includes a convex surface facing the object side.

In yet another exemplary embodiment, the lens assembly satisfies at least any one of the following conditions: 5 mm<ALOD<14 mm; 0<TTL/ALOD<2; 1<(TTL+f)/$f_{obj1}$<5; 1<$f_{obj1}$/L1T<4; 0.2 mm<L1T×L1SD<2.2 mm$^2$; −4 mm$^2$<L1T×$R_{11}$<0 mm$^2$; wherein ALOD is a total effective optical diameter of an object side surface of each lens of the lens assembly, TTL is a total length of optical system of the lens assembly, f is an effective focal length of the lens assembly, $f_{obj1}$ is an effective focal length of a lens closest to the object side, L1T is a thickness along the optical axis of the first lens, L1SD is an effective optical semi-diameter of an image side surface of the first lens, and $R_{11}$ is a radius of curvature of an object side surface of the first lens.

In another exemplary embodiment, the lens assembly satisfies at least any one of the following conditions: 0.5<M1T/L1T<4; 1<TTL/L<5; 0<L/f<2.5; −1<$f_{obj3}$/$f_{obj4}$<2; wherein M1T is an interval from an image side surface of the first lens to the reflective surface along the optical axis, L1T is a thickness along the optical axis of the first lens, TTL is a total length of optical system of the lens assembly, L is an interval from an object side surface of a lens closest to the object side to the reflective surface along the optical axis, $f_{obj3}$ is an effective focal length of a lens third close to the object side, $f_{obj4}$ is an effective focal length of a lens fourth close to the object side, and f is an effective focal length of the lens assembly.

In yet another exemplary embodiment, the lens assembly satisfies: −2 mm<8×M1T−($OD_2$+$OD_3$+$OD_4$+$OD_5$)<1 mm;

wherein M1T is an interval from an image side surface of the first lens to the reflective surface along the optical axis, $OD_2$ is an effective optical diameter of an object side surface of a lens second close to the object side, $OD_3$ is an effective optical diameter of an object side surface of a lens third close to the object side, $OD_4$ is an effective optical diameter of an object side surface of a lens fourth close to the object side, and $OD_5$ is an effective optical diameter of an object side surface of a lens fifth close to the object side.

In another exemplary embodiment, the second lens further includes a convex surface or a concave surface facing the image side, the third lens includes a convex surface facing the object side.

In yet another exemplary embodiment, the first lens further includes another convex surface facing the object side.

In another exemplary embodiment, the lens assembly satisfies at least any one of the following conditions: 5 mm<ALOD<14 mm; 0<TTL/ALOD<2; wherein ALOD is a total effective optical diameter of an object side surface of each lens of the lens assembly and TTL is a total length of optical system of the lens assembly.

In yet another exemplary embodiment, the lens assembly satisfies at least any one of the following conditions: $1<(TTL+f)/f_{obj1}<5$; $-1<f_{obj3}/f_{obj4}<2$; $1<f_{obj1}/L1T<4$; $0.2$ $mm^2<L1T\times L1SD<2.2$ $mm^2$; $-4$ $mm^2<L1T\times R_{11}<0$ $mm^2$; $0.5<M1T/L1T<4$; $1<TTL/L<5$; $0<L/f<2.5$; wherein TTL is a total length of optical system of the lens assembly, f is an effective focal length of the lens assembly, $f_{obj1}$ is an effective focal length of a lens closest to the object side, $f_{obj3}$ is an effective focal length of a lens third close to the object side, $f_{obj4}$ is an effective focal length of a lens fourth close to the object side, L1T is a thickness along the optical axis of the first lens, L1SD is an effective optical semi-diameter of an image side surface of the first lens, $R_{11}$ is a radius of curvature of an object side surface of the first lens, M1T is an interval from an image side surface of the first lens to the reflective surface along the optical axis, L1T is a thickness along the optical axis of the first lens, L is an interval from an object side surface of a lens closest to the object side to the reflective surface along the optical axis, and f is an effective focal length of the lens assembly.

In another exemplary embodiment, the lens assembly further includes a fifth lens disposed between the object side and the first lens, the fifth lens is a meniscus lens with positive refractive power and includes a convex surface facing the object side and a concave surface facing the image side, the second lens further includes a convex surface facing the image side, the third lens includes a convex surface facing the image side, the fourth lens is with negative refractive power and further includes a convex surface facing the object side.

In yet another exemplary embodiment, the lens assembly satisfies: 8 mm≤TTL1≤9 mm; wherein TTL1 is an interval from the convex surface of the fifth lens to an image plane along the optical axis.

In another exemplary embodiment, the lens assembly satisfies: D=f/2, 2.85 mm≤D≤2.95 mm; wherein D is an effective diameter of an entrance pupil of the lens assembly and f is an effective focal length of the lens assembly.

In yet another exemplary embodiment, the lens assembly satisfies at least any one of the following conditions: 55 degrees≤FOV≤65 degrees; 0/° C.≤TCE<10×10⁻⁶/° C.; 0.5≤L5T/E≤1.47; $Nd_5$≥1.9; $Vd_5$<20; wherein FOV is a field of view of the lens assembly, TCE is a coefficient of thermal expansion of the fifth lens at 25 degrees Celsius, L5T is a thickness along the optical axis of the fifth lens, E is a thickness of the outermost periphery of the fifth lens, $Nd_5$ is an index of refraction of the fifth lens, and $Vd_5$ is an Abbe number of the fifth lens.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
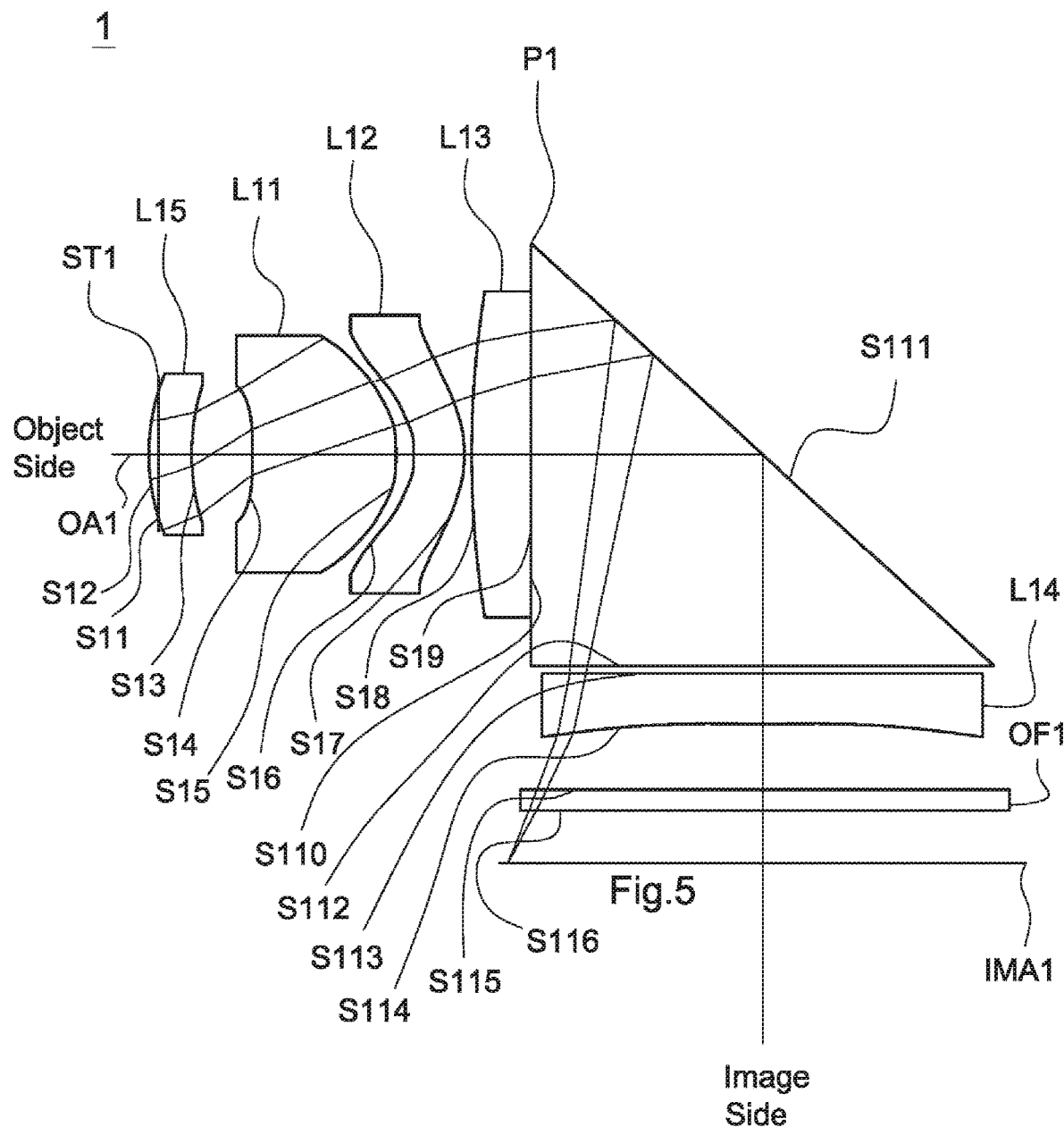
FIG. 1 is a lens layout and optical path diagram of a lens assembly in accordance with a first embodiment of the invention.

The following description is made for the purpose of illustrating the general principles of the invention and should not be taken in a limiting sense. The scope of the invention is best determined by reference to the appended claims.

The present invention provides a lens assembly including a first lens, a second lens, a third lens, and a fourth lens. The first lens is with positive refractive power and includes a concave surface facing an object side and a convex surface facing an image side. The second lens is with negative refractive power and includes a concave surface facing the object side. The third lens is with positive refractive power. The fourth lens is with refractive power and includes a concave surface facing the image side. The first lens, the second lens, the third lens, and the fourth lens are arranged in order from the object side to the image side along an optical axis. The lens assembly satisfies: TTL/f>1.2; wherein TTL is a total length of optical system of the lens assembly and f is an effective focal length of the lens assembly.

The present invention provides another lens assembly including a first lens, a second lens, a third lens, a fourth lens, and a reflective element. The first lens is with positive refractive power and includes a convex surface facing an image side. The second lens is with negative refractive power and includes a concave surface facing an object side. The third lens is with positive refractive power. The fourth lens is with refractive power and includes a concave surface facing the image side. The reflective element includes a reflective surface. The first lens, the second lens, the third lens, and the fourth lens are arranged in order from the object side to the image side along an optical axis. The reflective element is disposed between the first lens and the fourth lens. The lens assembly satisfies: 2 mm<L<6 mm; wherein L is an interval from an object side surface of a lens closest to the object side to the reflective surface along the optical axis.

Referring to Table 1, Table 2, Table 4, Table 5, Table 7, Table 8, Table 10, Table 11, Table 13, Table 14, Table 16, Table 17, Table 19, Table 20, Table 22, Table 23, Table 25, Table 26, Table 28, Table 29, Table 31, Table 32, Table 34, Table 35, Table 37, and Table 38, wherein Table 1, Table 4, Table 7, Table 10, Table 13, Table 16, Table 19, Table 2 Table 25, Table 28, Table 31, Table 34, and Table 37 show optical specification in accordance with a first, second, third, fourth, fifth, sixth, seventh, eighth, ninth, tenth, eleventh, twelfth, and thirteenth embodiments of the invention respectively and Table 2, Table 5, Table 8, Table 11, Table 14, Table 17, Table 20, Table 23, Table 26, Table 29, Table 32, Table 35, and Table 38 show aspheric coefficients of each aspheric lens in Table 1, Table 4, Table 7, Table 10, Table 13, Table 16, Table 19, Table 22, Table 25, Table 28, Table 31, Table 34, and Table 37 respectively.

FIG. 1, FIG. 3, FIG. 5, FIG. 7, FIG. 9, FIG. 11, FIG. 13, FIG. 15, FIG. 17, 19, FIG. 21, FIG. 23, and FIG. 25 are lens layout and optical path diagrams of the lens assemblies in accordance with the first, second, third, fourth, fifth, sixth, seventh, eighth, ninth, tenth, eleventh, twelfth, and thirteenth embodiments of the invention respectively.

The first lenses L11, L21, L31, L41, L51, L61, L71, L81, L91, L101, L111, L121, L131 are with positive refractive power and made of glass or plastic material, wherein the image side surfaces S15, S23, S33, S43, S53, S63, S73, S83, S93, S105, S115, S125, S135 are convex surfaces and both of the object side surfaces S14, S22, S32, S42, S52, S62, S72, S82, S92, S104, S114, S124, S134 and image side surfaces S15, S23, S33, S43, S53, S63, S73, S83, S93, S105, S115, S125, S135 are aspheric surfaces.

The second lenses L12, L22, L32, L42, L52, L62, L72, L82, L92, L102, L112, L122, and L132 are with negative refractive power and made of glass or plastic material, wherein the object side surfaces S16, S24, S34, S44, S54, S67, S77, S87, S97, S106, S116, S126, S136 are concave surfaces and both of the object side surfaces S16, S24, S34, S44, S54, S67, S77, S87, S97, S106, S116, S126, S136 and image side surfaces S17, S25, S35, S45, S55, S68, S78, S88, S98, S107, S117, S127, S137 are aspheric surfaces.

The third lenses L13, L23, L33, L43, L53, L63, L73, L83, L93, L103, L113, L123, and L133 are with positive refractive power and made of glass or plastic material, herein the object side surfaces S18, S26, S36, S46, S56, S69, S79, S89, S99, S108, S118, S128, S138 are convex surfaces.

The fourth lenses L14, L24, L34, L44, L54, L64 L74, L84, L94, L104, L114, L124, L134 are made of glass or plastic material, wherein the image side surfaces S114, S212, S312, S412, S514, S612, S712, S814, S916, S1011, S1111, S1211, S1311 are concave surfaces and the image side surfaces S114, S212, S312, S412, S514, S612, S712, S814, S916, S1011, S1111, S1211, S1311 are aspheric surfaces.

In addition, the lens assemblies 1, 2, 3, 4, 5, 6, 7, 8, 9 satisfy at least one of the following conditions:

$$TTL/f > 1.2; \tag{1}$$

$$2 \text{ mm} < L < 6 \text{ mm}; \tag{2}$$

$$5 < TTL/OD_1 < 14; \tag{3}$$

$$0.5 < ID_1/OD_1 < 1.5; \tag{4}$$

$$5 \text{ mm} < ALOD < 14 \text{ mm}; \tag{5}$$

$$0 < TTL/ALOD < 2; \tag{6}$$

$$1 < ALOD/f < 4; \tag{7}$$

$$1 < (TTL+f)/f_{obj1} < 5; \tag{8}$$

$$|f_{obj1}| + |f_{obj2}| < |f_{obj4}|; \tag{9}$$

$$-3 \text{ mm} < f_{obj3} < 0 \text{ mm}; \tag{10}$$

$$|f_{obj4}| < |f_{obj5}|; \tag{11}$$

$$FPD_{max} < 4 \text{ mm}; \tag{12}$$

$$-1 < f_{obj3}/f_{obj4} < 2; \tag{13}$$

$$1 < f_{obj1}/L1T < 4; \tag{14}$$

$$0.2 \text{ mm}^2 < L1T \times L1SD < 2.2 \text{ mm}^2; \tag{15}$$

$$-4 \text{ mm}^2 < L1T \times R_{11} < 0 \text{ mm}^2; \tag{16}$$

$$0.5 < M1T/L1T < 4; \tag{17}$$

$$1 < TTL/L < 5; \tag{18}$$

$$0 < L/f < 2.5; \tag{19}$$

$$-2 \text{ mm} < 8 \times M1T - (OD_2 + OD_3 + OD_4 + OD_5) < 1 \text{ mm}; \tag{20}$$

wherein TTL is a total length of optical system of the lens assemblies 1, 2, 3, 4, 5, 6, 7, 8, 9 for the first to ninth embodiments, that is, an interval from the stops ST1, ST2, ST3, ST4, ST5, ST6, ST7, ST8, ST9 to the image planes IMA1, IMA2, IMA3, IMA4, IMA5, IMA6, IMA7, IMA8, IMA9 along the optical axes OA1, OA2, OA3, OA4, OA5, OA6, OA7, OA8, OA9 respectively, f is an effective focal length of the lens assemblies 1, 2, 4, 5, 6, 7, 8, 9 for the first to ninth embodiments, L is an interval from the object side surfaces S12, S22, S32, S42, S52, S62, S72, S82, S92 of the lenses L15, L21, L31, L41, L51, L61, L71, L81, L91 which are closest to the object side to the reflective surfaces S111, S29, S39, S49, S59, S65, S75, S85, S95 along the optical axes OA1, OA2, OA3, OA4, OA5, OA6, OA7, OA8, OA9 respectively for the first to ninth embodiments, $OD_1$ is an effective optical diameter of the object side surfaces S12, S22, S32, S42, S52 of the lenses L15, L21, L31, L41, L51 which are the closest to the object side respectively for the first to fifth embodiments, $OD_2$ is an effective optical diameter of the object side surfaces S87, S97 of the lenses L82, L92 which are the second close to the object side respectively for the eighth to ninth embodiments, $OD_3$ is an effective optical diameter of the object side surfaces S89, S99 of the lenses L83, L93 which are the third close to the object side respectively for the eighth to ninth embodiments, $OD_4$ is an effective optical diameter of the object side surfaces S811, S911 of the lenses L85, L96 which are the fourth close to the object side respectively for the eighth to ninth embodiments, $OD_5$ is an effective optical diameter of the object side surfaces S813, S913 of the lenses L84, L95 which are the fifth close to the object side respectively for the eighth to ninth embodiments, $ID_1$ is an effective optical diameter of the image side surfaces S13, S23, S33, S43, S53 of the lenses L15, L21, L31, L41, L51 which are the closest to the object side respectively for the first to fifth embodiments, ALOD is a total of the effective optical diameter of the object side surfaces of each lenses for the first to ninth embodiments, $f_{obj1}$ is an effective focal length of the lenses L15, L21, L31, L41, L51, L61, L71, L81, L91 which are the closest to the object side for the first to ninth embodiments, that is, an effective focal length of the lens which is arranged in order from the object side and is ranged the first, $f_{obj2}$ is an effective focal length of the lenses L11, L22, L32, L42, L52 which are the second close to the object side for the first to fifth embodiments, that is, an effective focal length of the lens which is arranged in order from the object side and is ranged the second, $f_{obj3}$ is an effective focal length of the lenses L12, L63, L73, L83, L93 which are the third close to the object side for the first and sixth to ninth embodiments, that is, an effective focal length of the lens which is arranged in order from the object side and is ranged the third, $f_{obj4}$ is an effective focal length of the lenses L13, L24, L34, L44, L54, L64, L74, L85, L96 which are the fourth close to the object side for the first to ninth embodiments, that is, an effective focal length of the lens which is arranged in order from the object side and is ranged the fourth, $f_{obj5}$ is an effective focal length of the lens L14 which is the fifth close to the object side for the first embodiment, that is, an effective focal length of the lens which is arranged in order from the object side and is ranged the fifth, $FPD_{max}$ is a maximum effective optical diameter of the lenses on the object side of the reflective elements P1, P2, P3, P4, P5 for the first to fifth embodiments, L1T is a thickness of the first lenses L61, L71, L81, L91 along the optical axes OA6, OA7, OA8, OA9 for the sixth to ninth embodiments, M1T is an interval from the image side surfaces S63, S73, S83, S93 of the first lenses L61, L71, L81, L91 to the reflective surfaces S65, S75, S85, S95 along the optical axes OA6, OA7, OA8, OA9 respectively for the sixth to ninth embodiments, L1SD is an effective optical semi-diameter of the image side surfaces S63, S73, S83, S93 of the first lenses L61, L71, L81, L91 for the sixth to ninth embodiments, and $R_{11}$ is a radius of curvature of the object side surfaces S62, S72, S82, S92 of the first lenses L61, L71, L81, L91 for the sixth to ninth embodiments. With the lens assemblies 1, 2, 3, 4, 5, 6, 7, 8, 9 satisfying at least one of the above conditions (1)-(20), the total lens length can be effectively shortened, the resolution can be effectively increased, the aberration can be effectively corrected, and the chromatic aberration can be effectively corrected.

In addition, the lens assemblies 10, 11, 13 satisfy at least one of the following conditions:

$$D=f/2, 2.85\ mm \leq D \leq 2.95\ mm; \tag{21}$$

$$55\ degrees \leq FOV \leq 65\ degrees; \tag{22}$$

$$8\ mm \leq TTL1 \leq 9\ mm; \tag{23}$$

$$Nd_5 \geq 1.9; \tag{24}$$

$$0.5 \leq L5T/E \leq 1.47; \tag{25}$$

$$0°\ C. \leq TCE < 10 \times 10^{-6}/° C.; \tag{26}$$

$$Vd_5 < 20; \tag{27}$$

$$2.2 \geq Nd_5 \geq 1.9; \tag{28}$$

$$17 < Vd_5 < 20; \tag{29}$$

wherein f is an effective focal length of the lens assemblies 10, 11, 12, 13 for the tenth to the thirteenth embodiments, D is an effective diameter of an entrance pupil of the lens assemblies 10, 11, 12, 13 for the tenth to thirteenth embodiments, FOV is a full field of view of the lens assemblies 10, 11, 12, 13 for the tenth to thirteenth embodiments, TTL1 is an interval from the object side surfaces S11, S21, S31, S41 of the fifth lenses L105, L115, L125, L135 to the image planes IMA10, IMA11, IMA12, IMA13 along the optical axes OA10, OA11, OA12, OA13 respectively for the tenth to thirteenth embodiments, $Nd_5$ is an index of refraction of the fifth lens L105, L115, L125, L135 for the tenth to thirteenth embodiments, L5T is a thickness of the fifth lenses L105, L115, L125, L135 along the optical axes OA10, OA11, OA12, OA13 for the tenth to thirteenth embodiments, E is a thickness of the outermost periphery of the fifth lenses L105, L115, L125, L135 for the tenth to thirteenth embodiments, TCE is a coefficient of thermal expansion of the fifth lenses L105, L115, L125, L135 at 25 degrees Celsius for the tenth to thirteenth embodiments, and $Vd_5$ is an Abbe number of the fifth lenses L105, L115, L125, L135 for the tenth to thirteenth embodiments. With the lens assemblies 10, 11, 12, 13 satisfying at least one of the above conditions (21)-(29), the total lens length can be effectively shortened, the resolution can be effectively increased, the environmental temperature change can be effectively resisted, the aberration can be effectively corrected, and the chromatic aberration can be effectively corrected.

A detailed description of a lens assembly in accordance with a first embodiment of the invention is as follows. Referring to FIG. 1, the lens assembly 1 includes a stop ST1, a fifth lens L15, a first lens L11, a second lens L12, a third lens L13, a reflective element P1, a fourth lens L14, and an optical filter OF1, all of which are arranged in order from an object side to an image side along an optical axis OA1. The reflective element P1 includes an incident surface S110, a reflective surface S111, and an exit surface S112, wherein the incident surface S110 and the exit surface S112 are perpendicular to each other. The reflective surface S111 may contains a metal layer, such as a metal thin film layer of aluminum (Al), silver (Ag), etc., and the reflective surface S111 can be made to include metal layer in any suitable ways, such as coating a metal thin film layer. In this way, the color shift phenomenon and the occurrence of halo during imaging can be avoided, so that the color shift can be effectively improved, the point light source can be effectively concentrated, and has a good image quality for the lens assembly 1. In operation, the light from the object side is reflected by the reflective surface S111 to change the propagation direction and imaged on an image plane IMA1. The image plane IMA1 and the exit surface S112 are parallel to each other. In the first embodiment, the reflective element takes a prism as an example but is not limited thereto. For example, the reflective element may be a reflective mirror which only includes a reflective surface.

According to the foregoing, wherein: the fifth lens L15 is a meniscus lens with positive refractive power and made of glass or plastic material, wherein the object side surface S12 is a convex surface, the image side surface S13 is a concave surface, and both of the object side surface S12 and image side surface S13 are aspheric surfaces; the first lens L11 is a meniscus lens, wherein the object side surface S14 is a concave surface; the second lens L12 is a meniscus lens, wherein the image side surface S17 is a convex surface; the third lens L13 is a plane-convex lens, wherein the image side surface S19 is a plane surface and the object side surface S18 is an aspheric surface; the fourth lens L14 is a plane-concave lens with negative refractive power, wherein the object side surface S113 is a plane surface; and both of the object side surface S115 and image side surface S116 of the optical filter OF1 are plane surfaces.

With the above design of the lenses, reflective element P1, stop ST1, and at least any one of the conditions (1)-(20) satisfied, the lens assembly 1 can have an effective shortened total lens length, an effective increased resolution, an effective corrected aberration, and is capable of an effective corrected chromatic aberration.

Table 1 shows the optical specification of the lens assembly 1 in FIG. 1.

TABLE 1

Effective Focal Length = 2.69192 mm F-number = 2.6
Total Optical System Length = 6.354404 mm Field of View = 62.33 degrees

| Surface Number | Radius of Curvature (mm) | Thickness (mm) | Nd | Vd | Effective Focal Length (mm) | Remark |
|---|---|---|---|---|---|---|
| S11 | ∞ | −0.05 | | | | Stop ST1 |
| S12 | 1.920745 | 0.2653972 | 1.855472 | 36.86999 | 7.837847 | The Fifth Lens L15 |
| S13 | 2.514984 | 0.3620153 | | | | |
| S14 | −1.49846 | 0.8913461 | 1.72512 | 52.5106 | 1.196022 | The First Lens L11 |
| S15 | −0.68846 | 0.1073452 | | | | |
| S16 | −0.48904 | 0.3073362 | 1.671339 | 19.2429 | −2.73696 | The Second Lens L12 |
| S17 | −0.83279 | 0.048041 | | | | |
| S18 | 14.60879 | 0.4065464 | 1.606501 | 57.54 | 24.01075 | The Third Lens L13 |
| S19 | ∞ | 0 | | | | |
| S110 | ∞ | 1.39 | 1.802 | 44.3 | | Reflective Element P1 Incident Surface |
| S111 | ∞ | 1.39 | 1.802 | 44.3 | | Reflective Element P1 Reflective Surface |
| S112 | ∞ | 0.03982983 | | | | Reflective Element P1 Exit Surface |
| S113 | ∞ | 0.3286899 | 1.670997 | 20.16101 | −84.1182 | The Fourth Lens L14 |
| S114 | 56.94673 | 0.3728562 | | | | |
| S115 | ∞ | 0.145 | 1.5 | 60 | | Optical Filter OF1 |
| S116 | ∞ | 0.3 | | | | |

The aspheric surface sa z of each aspheric lens in table 1 can be calculated by the following formula:

$$z = ch^2 / \{1 + [1 - (k+1)c^2h^2]^{1/2}\} + Ah^4 + Bh^6 + Ch^8 + Dh^{10} + Eh^{12} + Fh^{14} + Gh^{16}$$

where c is curvature, h is the vertical distance from the lens surface to the optical axis, k is conic constant and A, B, C, D, E, F and G are aspheric coefficients.

In the first embodiment, the conic constant k and the aspheric coefficients A, B, C, D, E, F, G of each aspheric lens are shown in Table 2.

TABLE 2

| Surface Number | k | A | B | C | D |
|---|---|---|---|---|---|
| | | E | F | G | |
| S12 | 4.976822 | 0.083554694 | 0.34409237 | −3.238094 | 3.1215641 |
| | | 68.051673 | −342.36581 | 468.78044 | |
| S13 | 0.294968 | 0.20307365 | −0.06816194 | 3.3441261 | −78.801281 |
| | | 478.13625 | −1388.0483 | 1402.5153 | |
| S14 | −18.558 | −1.0626488 | 2.9323527 | −25.198071 | 10.426915 |
| | | 692.26689 | −4272.6448 | 6704.9929 | |
| S15 | −0.62533 | 0.22080619 | 0.013686309 | −1.8516094 | 4.819221 |
| | | −6.1047322 | 2.9726467 | 0.25724607 | |
| S16 | −1.35718 | 0.37547258 | −0.18473306 | 0.53075068 | −3.100164 |
| | | 8.7872601 | −9.3355906 | 3.3930467 | |
| S17 | −0.86516 | 0.35868629 | −0.03283751 | 0.25468627 | −0.81134706 |
| | | 1.1538557 | −0.88183494 | 0.34412961 | |
| S18 | 152.0305 | 0.07683288 | −0.02409805 | −0.01397754 | −0.00419835 |
| | | 0.003333245 | 0.011395619 | −0.0069344 | |
| S114 | 110.0914 | 0.009061355 | 0.005413381 | 0.000280848 | −0.0003746 |
| | | −4.9044E−05 | −2.5169E−05 | 1.30282E−05 | |

Table 3 shows the parameters and condition values for conditions (1)-(12) and (18)-(19) in accordance with the first embodiment of the invention. It can be seen from Table 3 that the lens assembly 1 of the first embodiment satisfies the conditions (1)-(12) and (18)-(19).

TABLE 3

| L | 3.778027 mm | $OD_1$ | 1.04 mm | $ID_1$ | 0.960858 mm |
|---|---|---|---|---|---|
| ALOD | 8.28542 mm | $f_{obj1}$ | 7.837847 mm | $f_{obj2}$ | 1.196022 mm |
| $f_{obj3}$ | −2.73696 mm | $f_{obj4}$ | 24.01075 mm | $f_{obj5}$ | −84.1182 mm |
| TTL/f | 2.360547 | $TTL/OD_1$ | 6.110004 | $ID_1/OD_1$ | 0.923902 |
| TTL/ALOD | 0.766938 | ALOD/f | 3.077885 | $(TTL + f)/f_{obj1}$ | 1.154185 |
| $|f_{obj1}| + |f_{obj2}|$ | 9.033869 mm | $FPD_{max}$ | 2.143724 mm | TTL/L | 1.681937 |
| L/f | 1.403469 | | | | |

Figure 2A:
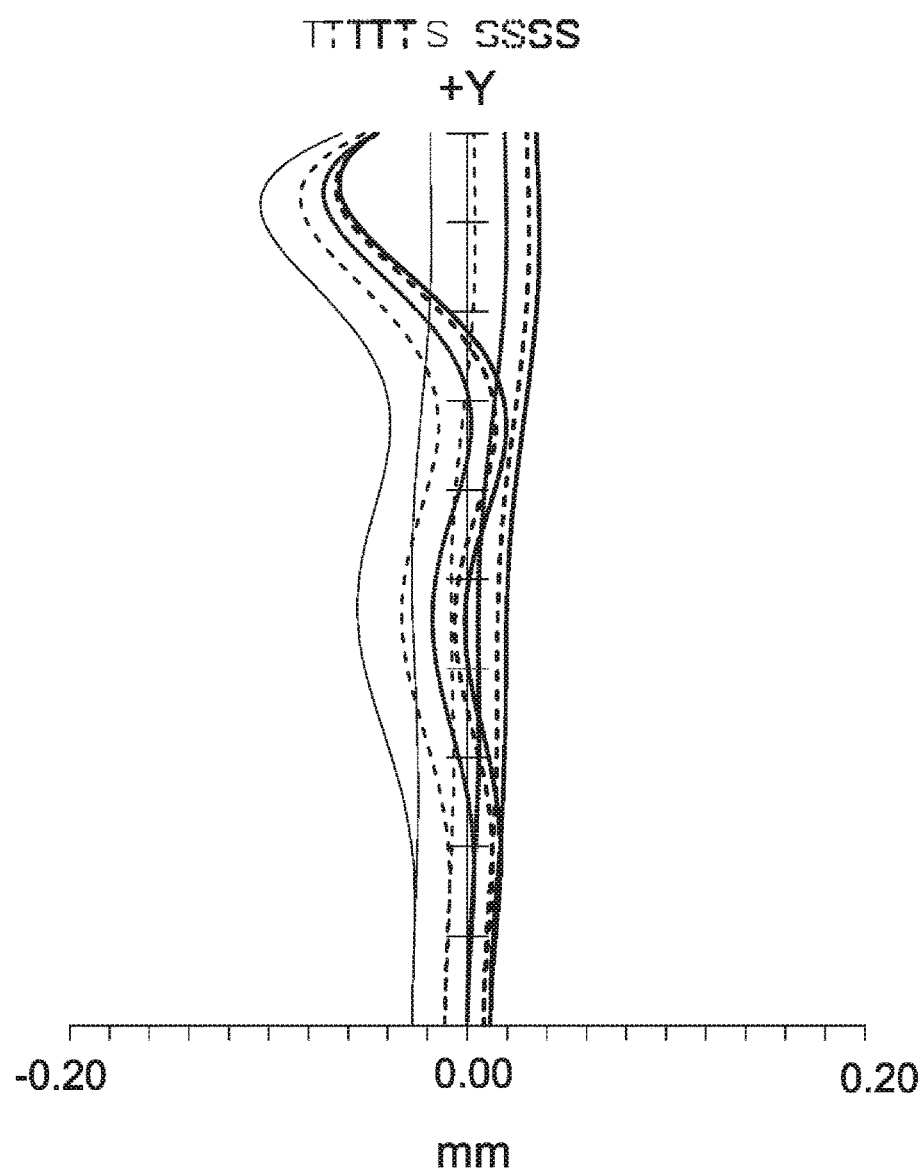
FIG. 2A depicts a field curvature diagram of the lens assembly in accordance with the first embodiment of the invention.
Figure 2B:
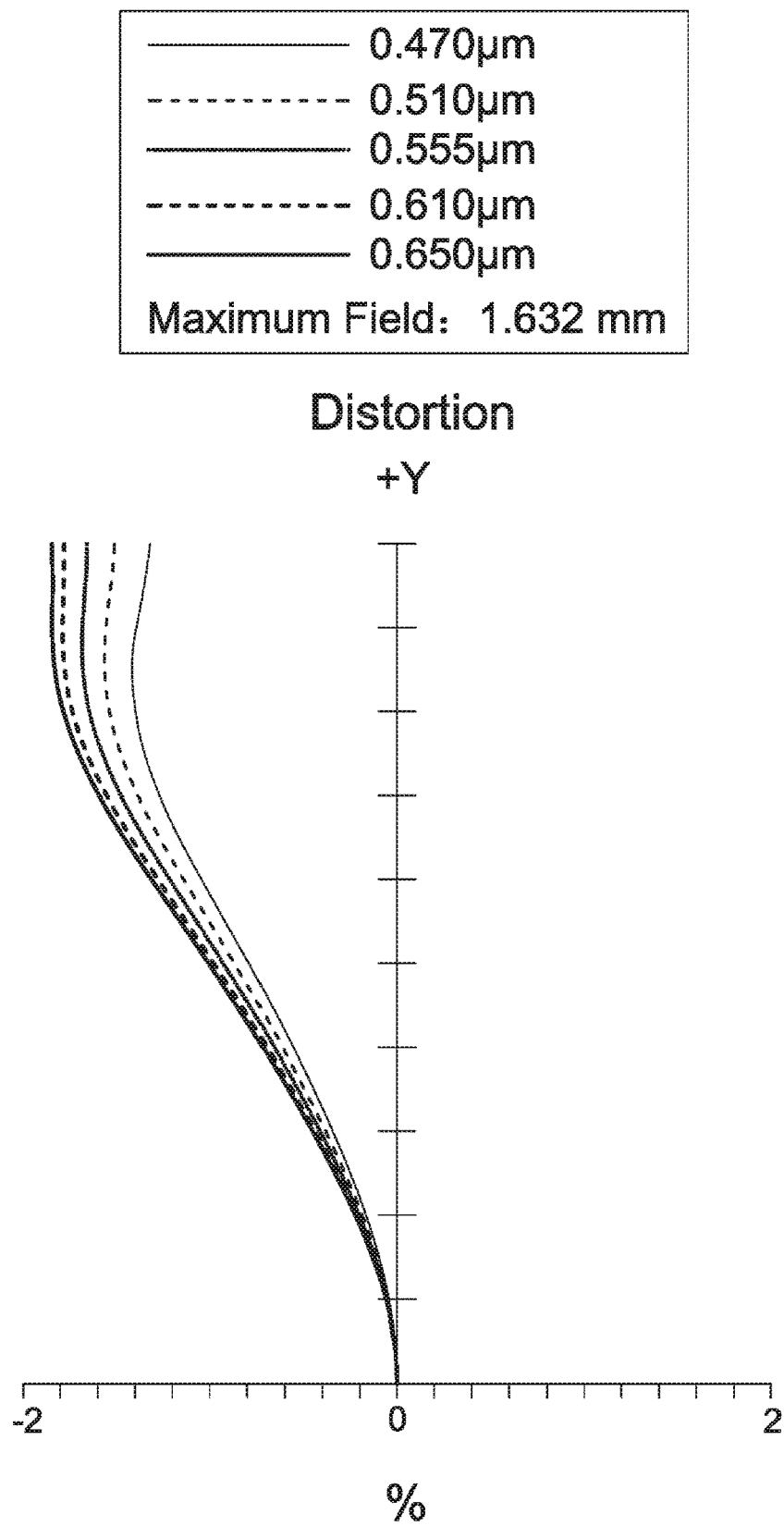
FIG. 2B is a distortion diagram of the lens assembly in accordance with the first embodiment of the invention.
Figure 2C:
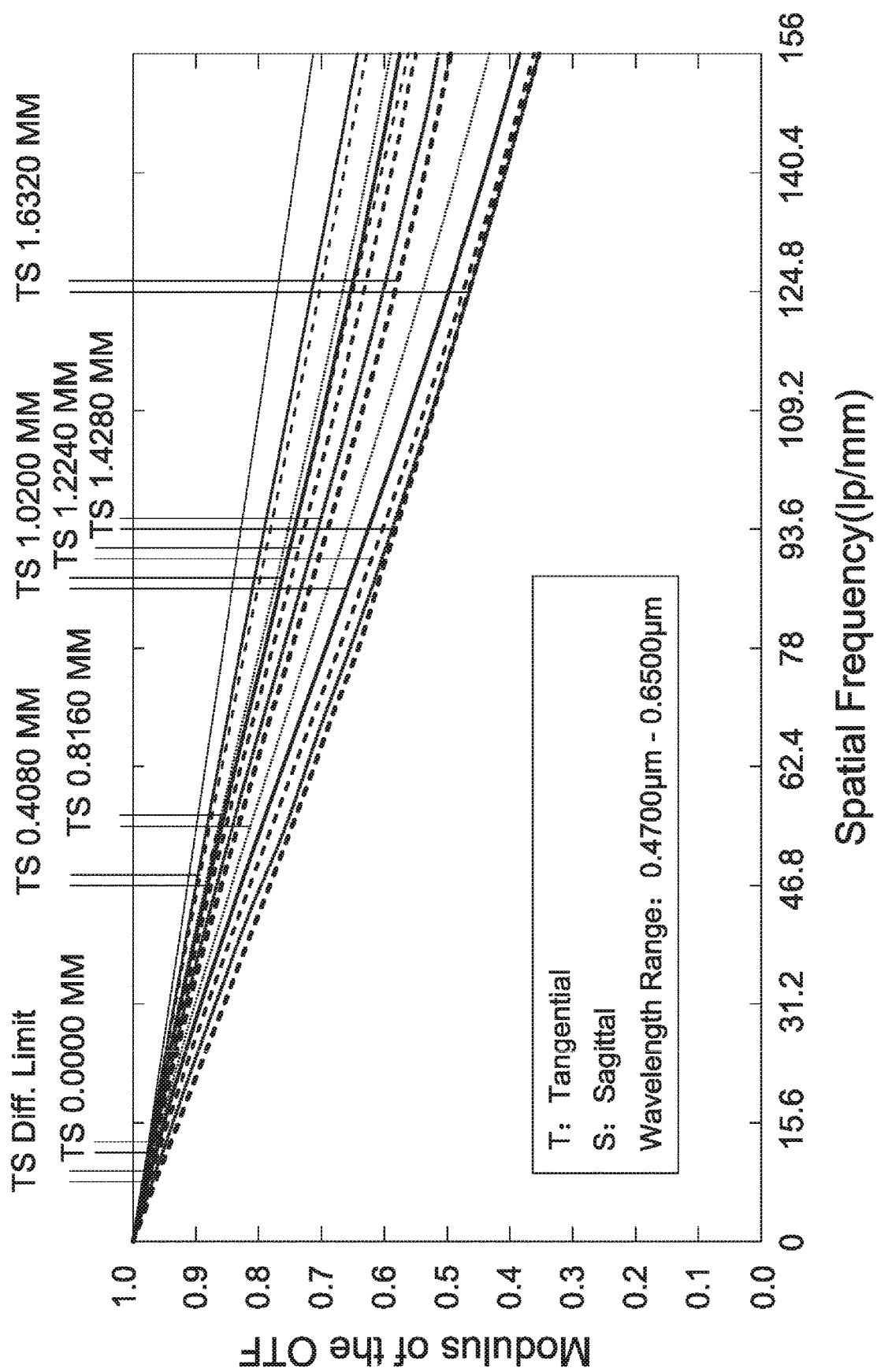
FIG. 2C is a modulation transfer function diagram of the lens assembly in accordance with the first embodiment of the invention.

By the above arrangements of the lenses, reflective element P1, and stop ST1, the lens assembly 1 of the first embodiment can meet the requirements of optical performance as seen in FIGS. 2A-2C.

It can be seen from FIG. 2A that the field curvature of tangential direction and sagittal direction in the lens assembly 1 of the first embodiment ranges from −1.2 mm to 0.04 mm. It can be seen from FIG. 2B that the distortion in the lens assembly 1 of the first embodiment ranges from −2% to 0%. It can be seen from FIG. 2C that the modulation transfer function of tangential direction and sagittal direction in the lens assembly 1 of the first embodiment ranges from 0.36 to 1.0.

It is obvious that the field curvature and the distortion of the lens assembly 1 of the first embodiment can be corrected effectively, and the resolution of the lens assembly 1 of the first embodiment can meet the requirement. Therefore, the lens assembly 1 of the first embodiment is capable of good optical performance.

Figure 3:
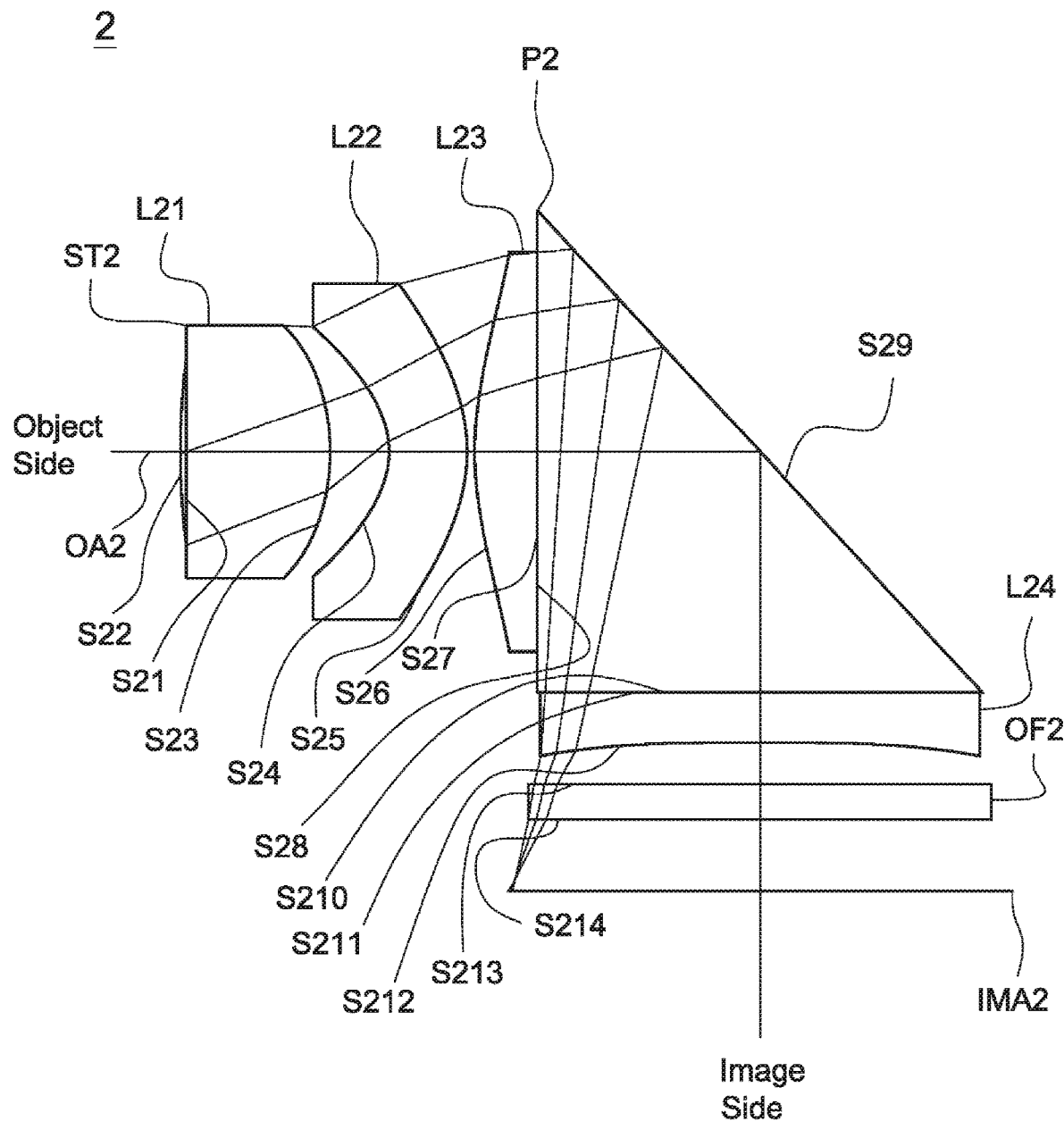
FIG. 3 is a lens layout and optical path diagram of a lens assembly in accordance with a second embodiment of the invention.

Referring to FIG. 3, the lens assembly 2 includes a stop ST2, a first lens L21, a second lens L22, a third lens L23, a reflective element P2, a fourth lens L24, and an optical filter OF2, all of which are arranged in order from an object side to an image side along an optical axis OA2. The reflective element P2 includes an incident surface S28, a reflective surface S29, and an exit surface S210, wherein the incident surface S28 and the exit surface S210 are perpendicular to each other. The reflective surface S29 may contains a metal layer, such as a metal thin film layer of aluminum (Al), silver (Ag), etc., and the reflective surface S29 can be made to include metal layer in any suitable ways, such as coating a metal thin film layer. In this way, the color shift phenomenon and the occurrence of halo during imaging can be avoided, so that the color shift can be effectively improved, the point light source can be effectively concentrated, and has a good image quality for the lens assembly 2. In operation, the light from the object side is reflected by the reflective surface S29 to change the propagation direction and imaged on an image plane IMA2. The image plane IMA2 and the exit surface S210 are parallel to each other. In the second embodiment, the reflective element takes a prism as an example but is not limited thereto. For example, the reflective element may be a reflective mirror which only includes a reflective surface.

According to the foregoing, wherein: the first lens L21 is a biconvex lens, wherein the object side surface S22 is a convex surface; the second lens L22 is a meniscus lens, wherein the image side surface S25 is a convex surface; the third lens L23 is a plane-convex lens, wherein the image side surface S27 is a plane surface and the object side surface S26 is an aspheric surface; the fourth lens L24 is a plane-concave lens with negative refractive power and made of glass or plastic material, wherein the object side surface S211 is a plane surface; and both of the object side surface S213 and image side surface S214 of the optical filter OF2 are plane surfaces.

With the above design of the lenses, reflective element P2, stop ST2, and at least any one of the conditions (1)-(20) satisfied, the lens assembly 2 can have an effective shortened total lens length, an effective increased resolution, an effective corrected aberration, and is capable of an effective corrected chromatic aberration.

Table 4 shows the optical specification of the lens assembly 2 in FIG. 3.

TABLE 4

Effective Focal Length = 3.17744 mm F-number = 2.8
Total Optical System Length = 6.420778 mm Field of View = 53.29 degrees

| Surface Number | Radius of Curvature (mm) | Thickness (mm) | Nd | Vd | Effective Focal Length (mm) | Remark |
|---|---|---|---|---|---|---|
| S21 | ∞ | −0.03 | | | | Stop ST2 |
| S22 | 3.2631 | 0.977638 | 1.460871 | 50.28586 | 2.219825 | The First Lens L21 |
| S23 | −1.27745 | 0.383133 | | | | |
| S24 | −0.50863 | 0.506806 | 1.766014 | 19.23837 | −2.27626 | The Second Lens L22 |
| S25 | −1.0262 | 0.05 | | | | |
| S26 | 1.806555 | 0.411432 | 1.5352 | 56.11 | 3.364525 | The Third Lens L23 |
| S27 | ∞ | 0 | | | | |
| S28 | ∞ | 1.45 | 1.802 | 44.3 | | Reflective Element P2 Incident Surface |

TABLE 4-continued

Effective Focal Length = 3.17744 mm F-number = 2.8
Total Optical System Length = 6.420778 mm Field of View = 53.29 degrees

| Surface Number | Radius of Curvature (mm) | Thickness (mm) | Nd | Vd | Effective Focal Length (mm) | Remark |
|---|---|---|---|---|---|---|
| S29 | ∞ | 1.45 | 1.802 | 44.3 | | Reflective Element P2 Reflective Surface |
| S210 | ∞ | 0 | | | | Reflective Element P2 Exit Surface |
| S211 | ∞ | 0.3 | 1.671 | 19.24 | −68.294 | The Fourth Lens L24 |
| S212 | 46.2536 | 0.25 | | | | |
| S213 | ∞ | 0.21 | 1.5 | 60 | | Optical Filter OF2 |
| S214 | ∞ | 0.431769 | | | | |

The definition of aspheric surface sag z of each aspheric lens in table 4 is the same as that of in Table 1, and is not described here again.

In the second embodiment, the conic constant k and the aspheric coefficients A, B, C, D, E, F, G of each aspheric lens are shown in Table 5.

TABLE 5

| Surface Number | k | A<br>E | B<br>F | C<br>G | D |
|---|---|---|---|---|---|
| S22 | 0.074745 | −0.048011492<br>7.4167268 | −0.3028321<br>−1.9108243 | 1.6353412<br>1.0042208 | −5.9820629 |
| S23 | 0.011904 | −0.1828205<br>−3.1499386 | 0.47158168<br>1.0549963 | −1.6667905<br>−0.25722916 | 3.1545451 |
| S24 | −0.6883 | 0.52533852<br>2.0444956 | 0.07700536<br>−1.5328175 | 0.73537126<br>0.61504974 | −1.5005463 |
| S25 | −0.45923 | 0.072598913<br>0.065592419 | 0.06002844<br>0.00191003 | 0.10395908<br>−0.00640127 | −0.15761884 |
| S26 | −12.3712 | 0.016757851<br>−0.000158888 | −0.0149707<br>−0.00019911 | 0.00115345<br>1.93E−05 | 0.000765445 |
| S212 | 99.85161 | 0.016564398<br>1.85E−07 | −0.0009307<br>−1.38E−07 | −0.00020828<br>2.90E−08 | 3.70E−06 |

Table 6 shows the parameters and condition values for conditions (1)-(9), (12), and (18)-(19) in accordance with the second embodiment of the invention. It can be seen from Table 6 that the lens assembly 2 of the second embodiment satisfies the conditions (1)-(9), (12), and (18)-(19).

TABLE 6

| L | 3.779009 mm | $OD_1$ | 1.14468 mm | $ID_1$ | 1.51875 mm |
|---|---|---|---|---|---|
| ALOD | 7.823504 mm | $f_{obj1}$ | 2.219825 mm | $f_{obj2}$ | −2.27626 mm |
| $f_{obj4}$ | −68.294 mm | | | | |
| TTL/f | 2.020739 | $TTL/OD_1$ | 5.609234 | $ID_1/OD_1$ | 1.32679 |
| TTL/ALOD | 0.820704 | ALOD/f | 2.462204 | $(TTL + f)/f_{obj1}$ | 4.323862 |
| $|f_{obj1}| + |f_{obj2}|$ | 4.496082 mm | $FPD_{max}$ | 2.40044 mm | TTL/L | 1.699064 |
| L/f | 1.189325 | | | | |

Figure 4A:
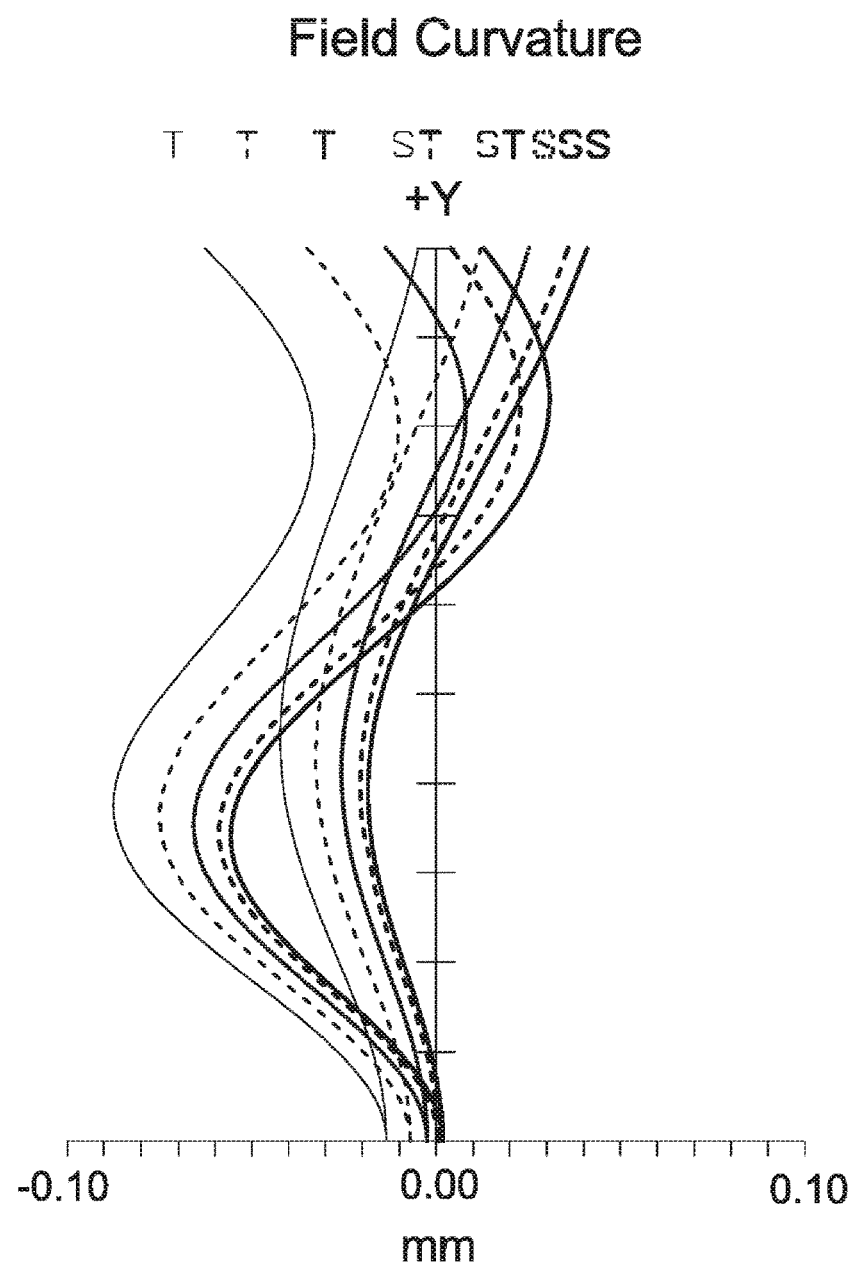
FIG. 4A depicts a field curvature diagram of the lens assembly in accordance with the second embodiment of the invention.
Figure 4B:
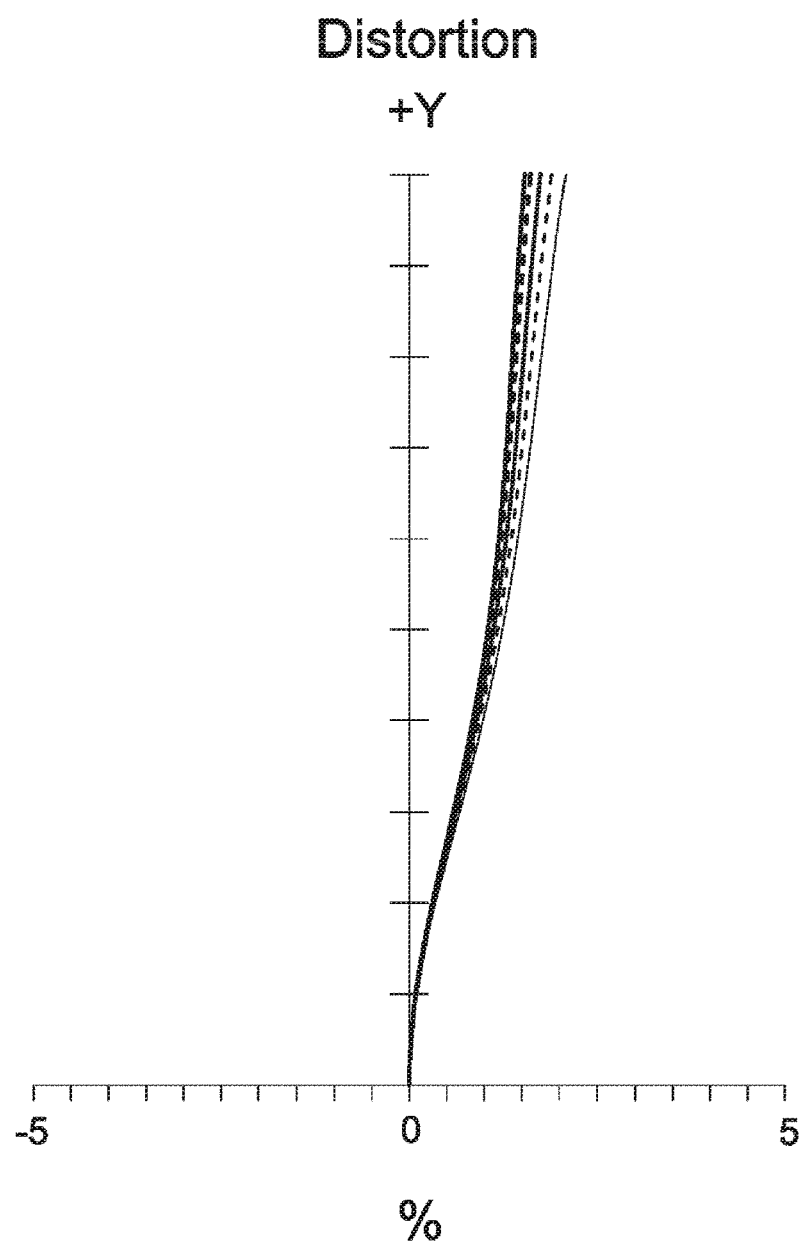
FIG. 4B is a distortion diagram of the lens assembly in accordance with the second embodiment of the invention.
Figure 4C:
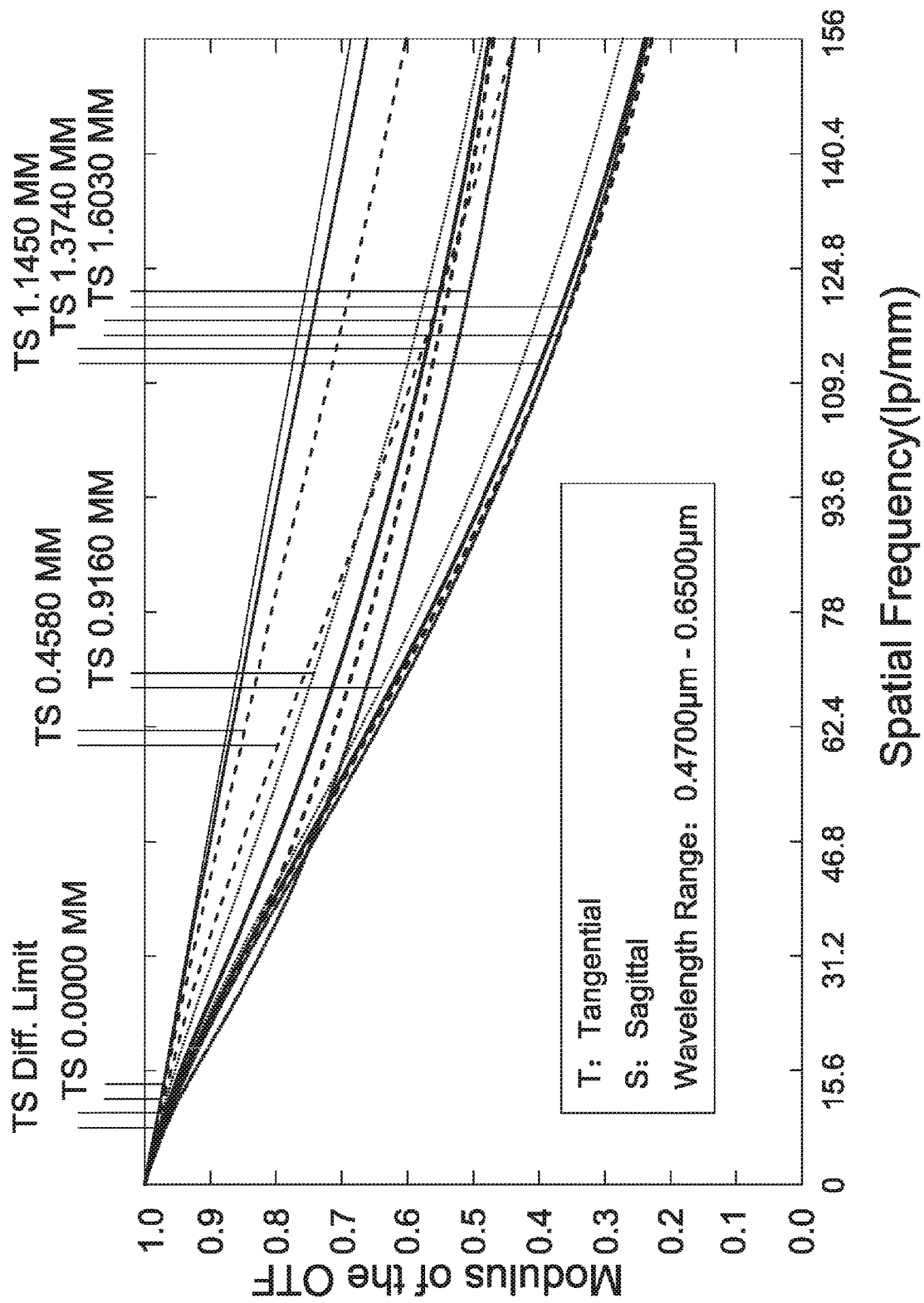
FIG. 4C is a modulation transfer function diagram of the lens assembly in accordance with the second embodiment of the invention.

By the above arrangements of the lenses, reflective element P2, and stop ST2, the lens assembly 2 of the second embodiment can meet the requirements of optical performance as seen in FIGS. 4A-4C.

It can be seen from FIG. 4A that the field curvature of tangential direction and sagittal direction in the lens assembly 2 of the second embodiment ranges from −0.09 mm to 0.04 mm. It can be seen from FIG. 4B that the distortion in the lens assembly 2 of the second embodiment ranges from 0% to 2%. It can be seen from FIG. 4C that the modulation transfer function of tangential direction and sagittal direction in the lens assembly 2 of the second embodiment ranges from 0.23 to 1.0.

It is obvious that the field curvature and the distortion of the lens assembly 2 of the second embodiment can be corrected effectively, and the resolution of the lens assembly 2 of the second embodiment can meet the requirement.

Therefore, the lens assembly 2 of the second embodiment is capable of good optical performance.

Figure 5:
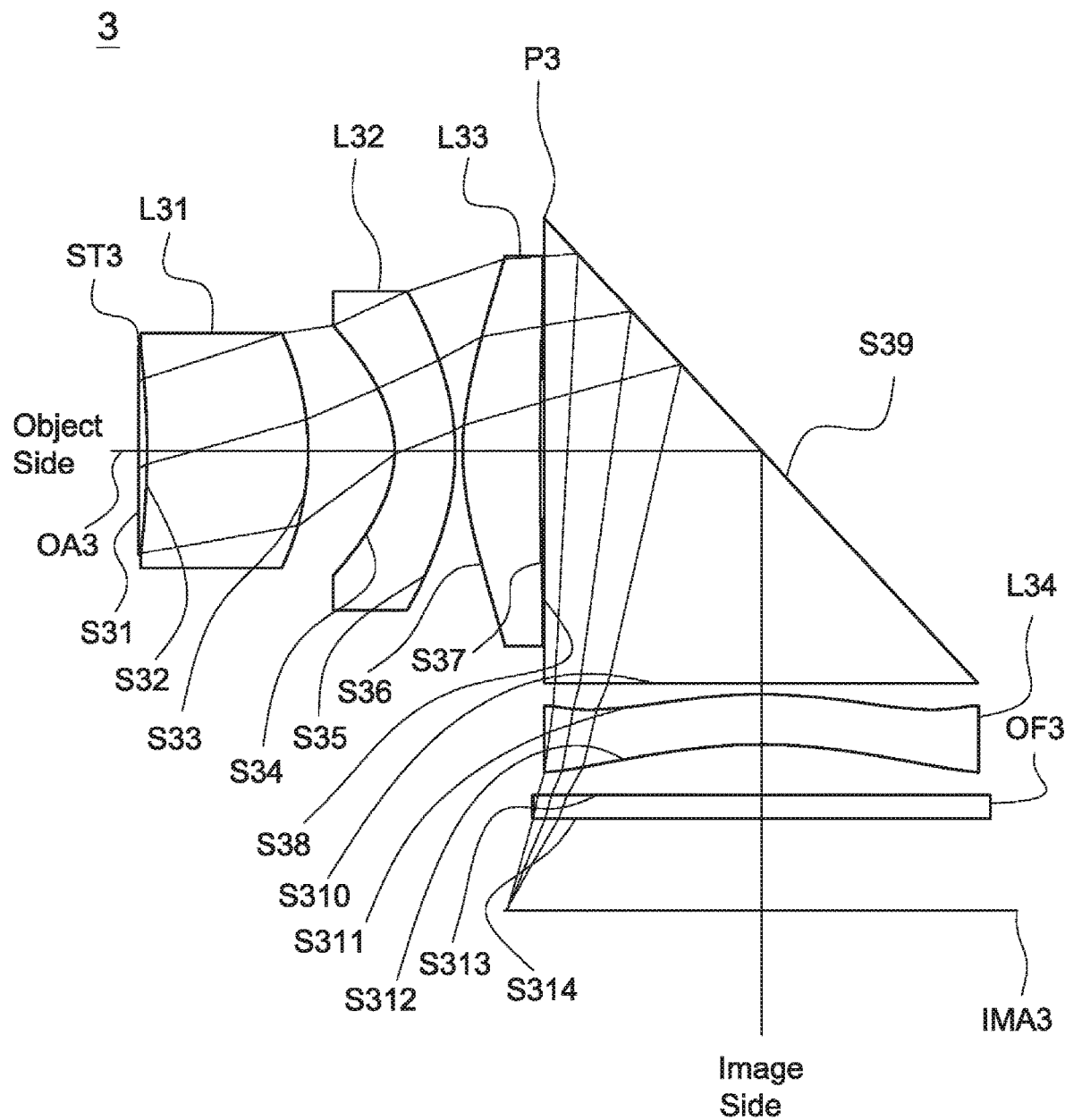
FIG. 5 is a lens layout and optical path diagram of a lens assembly in accordance with a third embodiment of the invention.

Referring to FIG. 5, the lens assembly 3 includes a stop ST3, a first lens L31, a second lens L32, a third lens L33, a reflective element P3, a fourth lens L34, and an optical filter OF3, all of which are arranged in order from an object side to an image side along an optical axis OA3. The reflective element P3 includes an incident surface S38, a reflective surface S39, and an exit surface S310, wherein the incident surface S38 and the exit surface S310 are perpendicular to each other. The reflective surface S39 may contains a metal layer, such as a metal thin film layer of aluminum (Al), silver (Ag), etc., and the reflective surface S39 can be made to include metal layer in any suitable ways, such as coating a metal thin film layer. In this way, the color shift phenomenon and the occurrence of halo during imaging can be avoided, so that the color shift can be effectively improved, the point light source can be effectively concentrated, and has a good image quality for the lens assembly 3. In operation, the light from the object side is reflected by the reflective surface S39 to change the propagation direction and imaged on an image plane IMA3. The image plane IMA3 and the exit surface S310 are parallel to each other. In the third embodiment, the reflective element takes a prism as an example but is not limited thereto. For example, the reflective element may be a reflective mirror which only includes a reflective surface.

According to the foregoing, wherein: the first lens L31 is a meniscus lens, wherein the object side surface S32 is a concave surface; the second lens L32 is a meniscus lens, wherein the image side surface S35 is a convex surface; the third lens L33 is a meniscus lens, wherein the image side surface S37 is a concave surface and both of the object side surface S36 and image side surface S37 are aspheric surfaces; the fourth lens L34 is a meniscus lens with negative refractive power and made of glass or plastic material, wherein the object side surface S311 is a convex surface and the object side surface S311 is an aspheric surface; and both of the object side surface S313 and image side surface S314 of the optical filter OF3 are plane surfaces.

With the above design of the lenses, reflective element P3, stop ST3, and at least any one of the conditions (1)-(20) satisfied, the lens assembly 3 can have an effective shortened total lens length, an effective increased resolution, an effective corrected aberration, and is capable of an effective corrected chromatic aberration.

Table 7 shows the optical specification of the lens assembly 3 in FIG. 5.

TABLE 7

Effective Focal Length = 3.07095 mm F-number = 2.48
Total Optical System Length = 6.737603 mm Field of View = 54.88 degrees

| Surface Number | Radius of Curvature (mm) | Thickness (mm) | Nd | Vd | Effective Focal Length (mm) | Remark |
|---|---|---|---|---|---|---|
| S31 | ∞ | 0.05 | | | | Stop ST3 |
| S32 | −8.27838 | 1.032199 | 1.802637 | 42.46164 | 2.557175 | The First Lens L31 |
| S33 | −1.74218 | 0.560109 | | | | |
| S34 | −0.59054 | 0.386854 | 1.671268 | 19.23837 | −2.03744 | The Second Lens L32 |
| S35 | −1.30509 | 0.047319 | | | | |
| S36 | 1.449244 | 0.498884 | 1.593194 | 67.0001 | 2.594658 | The Third Lens L33 |
| S37 | 20.71585 | 0.027937 | | | | |
| S38 | ∞ | 1.39 | 1.802 | 44.3 | | Reflective Element P3 Incident Surface |
| S39 | ∞ | 1.39 | 1.802 | 44.3 | | Reflective Element P3 Reflective Surface |
| S310 | ∞ | 0.063172 | | | | Reflective Element P3 Exit Surface |
| S311 | 3.484569 | 0.3 | 1.671 | 25.9586 | −41.9926 | The Fourth Lens L34 |
| S312 | 3.834537 | 0.3 | | | | |
| S313 | ∞ | 0.145 | 1.5 | 60 | | Optical Filter OF3 |
| S314 | ∞ | 0.54613 | | | | |

The definition of aspheric surface sag z of each aspheric lens in table 7 is the same as that of in Table 1, and is not described here again.

In the third embodiment, the conic constant k and the aspheric coefficients A, B, C, D, E, F, G of each aspheric lens are shown in Table 8.

TABLE 8

| Surface Number | k | A E | B F | C G | D |
|---|---|---|---|---|---|
| S32 | 1.85692 | −0.03283118 8.7153023 | −0.51476486 −7.7991946 | 2.357223 5.05023 | −6.3265202 |

TABLE 8-continued

| Surface Number | k | A<br>E | B<br>F | C<br>G | D |
|---|---|---|---|---|---|
| S33 | −2.19313 | −0.14408601<br>−2.42689 | 0.2533266<br>0.62311844 | −1.1187475<br>0.26997132 | 2.4235947 |
| S34 | −0.75595 | 0.68959987<br>0.57687114 | −0.86578972<br>−1.8244609 | 0.98166611<br>1.3934062 | −0.44154887 |
| S35 | −0.46648 | 0.12091949<br>0.071602666 | −0.06434362<br>−0.00895967 | 0.084589559<br>−0.00443879 | −0.1210699 |
| S36 | −10.8268 | 0.046370156<br>−0.00291462 | −0.03910288<br>0.000278475 | 0.012386566<br>3.96E−04 | −0.0003165 |
| S37 | 20.52489 | −0.00570729<br>−0.00048266 | 0.001837149<br>−0.00014138 | −0.00231611<br>0.000309606 | −0.00082079 |
| S311 | −5.24682 | −0.03786211<br>0.000320484 | −0.00555871<br>4.64E−05 | −0.0016182<br>−2.53E−05 | 0.000209891 |
| S312 | −8.05917 | 0.000424071<br>6.23E−06 | −0.00995192<br>−7.09E−06 | 0.001154838<br>−1.25E−06 | 3.45E−04 |

Table 9 shows the parameters and condition values for conditions (1)-(9), (12), and (18)-(19) in accordance with the third embodiment of the invention. It can be seen from Table 9 that the lens assembly 3 of the third embodiment satisfies the conditions (1)-(9), (12), and (18)-(19).

TABLE 9

| L | 3.9433 mm | $OD_1$ | 1.250318 mm | $ID_1$ | 1.4 mm |
|---|---|---|---|---|---|
| ALOD | 7.711868 mm | $f_{obj1}$ | 2.557175 mm | $f_{obj2}$ | −2.03744 mm |
| $f_{obj4}$ | −41.9926 mm | | | | |
| TTL/f | 2.19398 | $TTL/OD_1$ | 5.388711 | $ID_1/OD_1$ | 1.119715 |
| TTL/ALOD | 0.873667 | ALOD/f | 2.511232 | $(TTL + f)/f_{obj1}$ | 3.835699 |
| $|f_{obj1}| + |f_{obj2}|$ | 4.594618 mm | $FPD_{max}$ | 2.329588 mm | TTL/L | 1.70862 |
| L/f | 1.284065 | | | | |

Figure 6A:
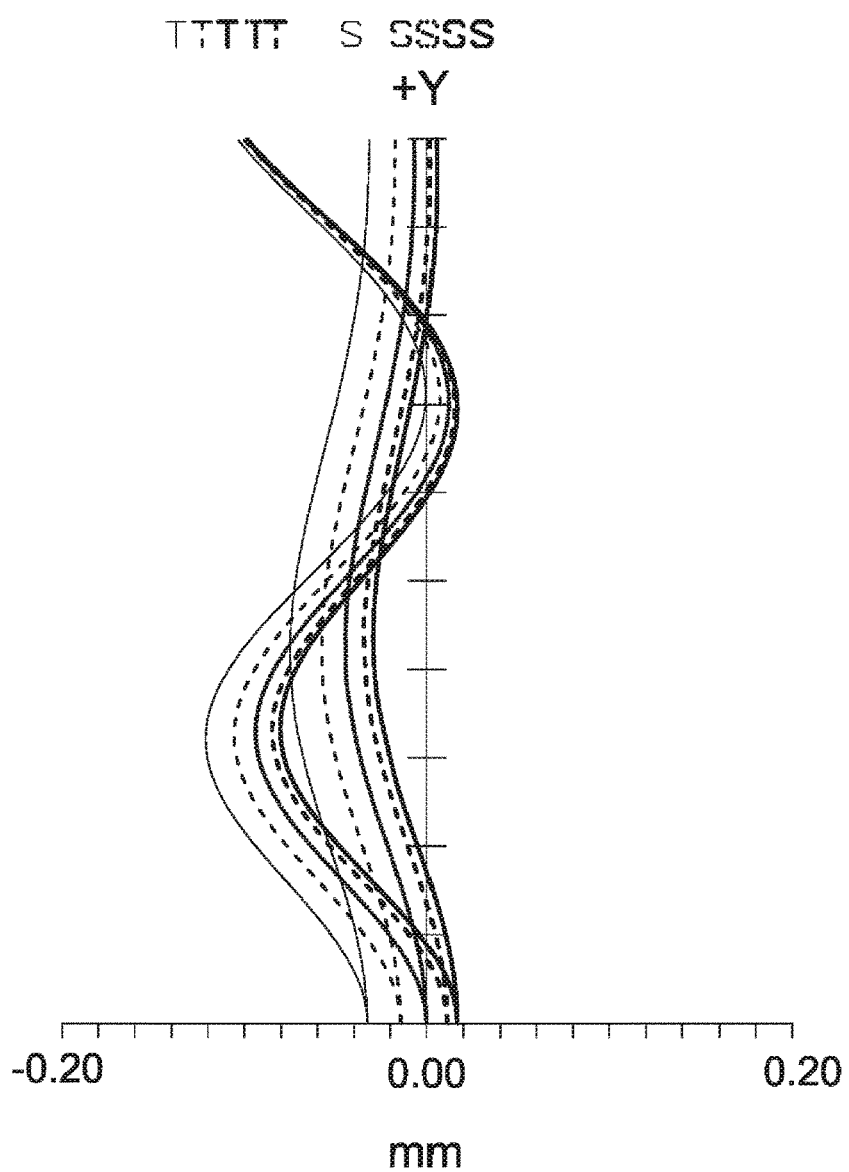
FIG. 6A depicts a field curvature diagram of the lens assembly in accordance with the third embodiment of the invention.
Figure 6B:
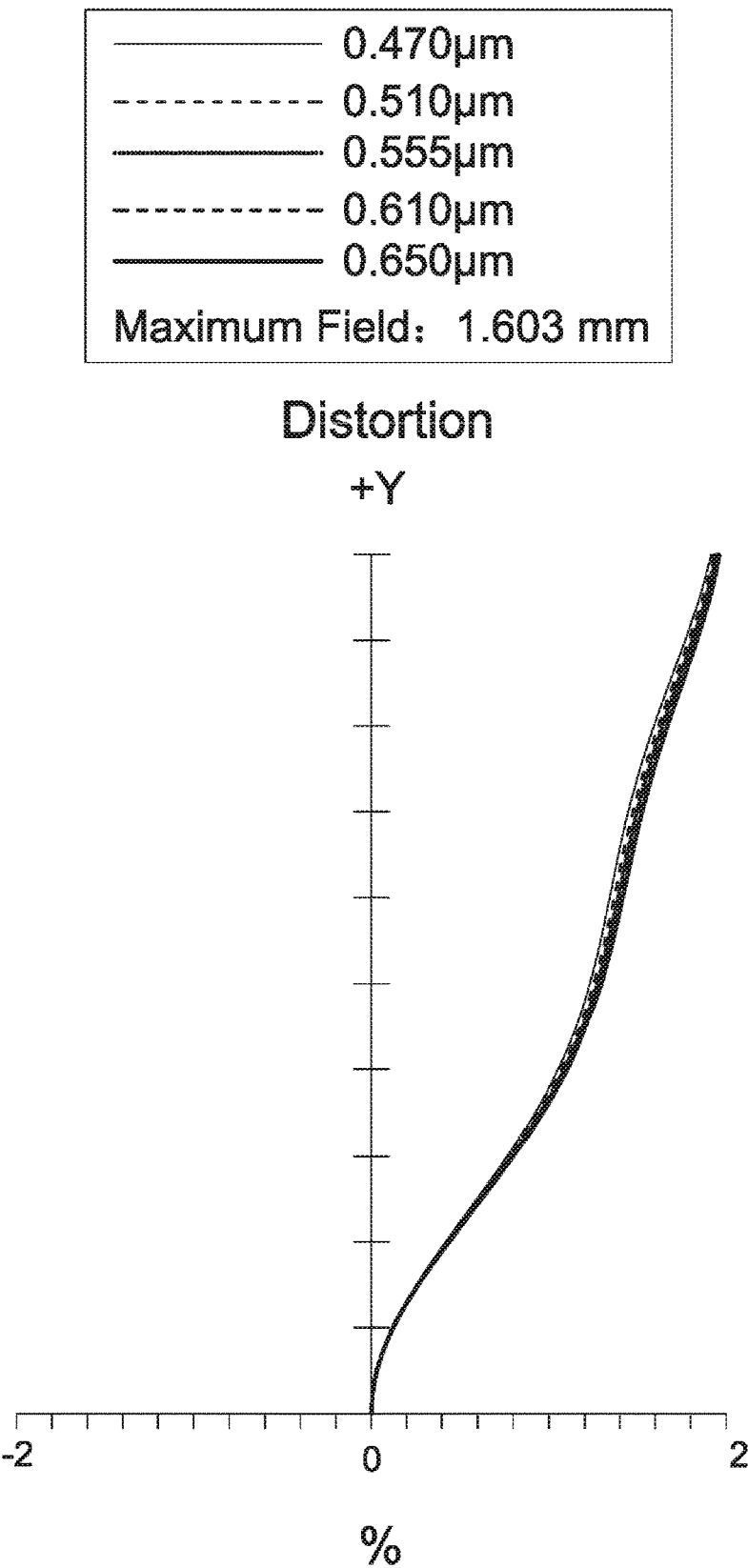
FIG. 6B is a distortion diagram of the lens assembly in accordance with the third embodiment of the invention.
Figure 6C:
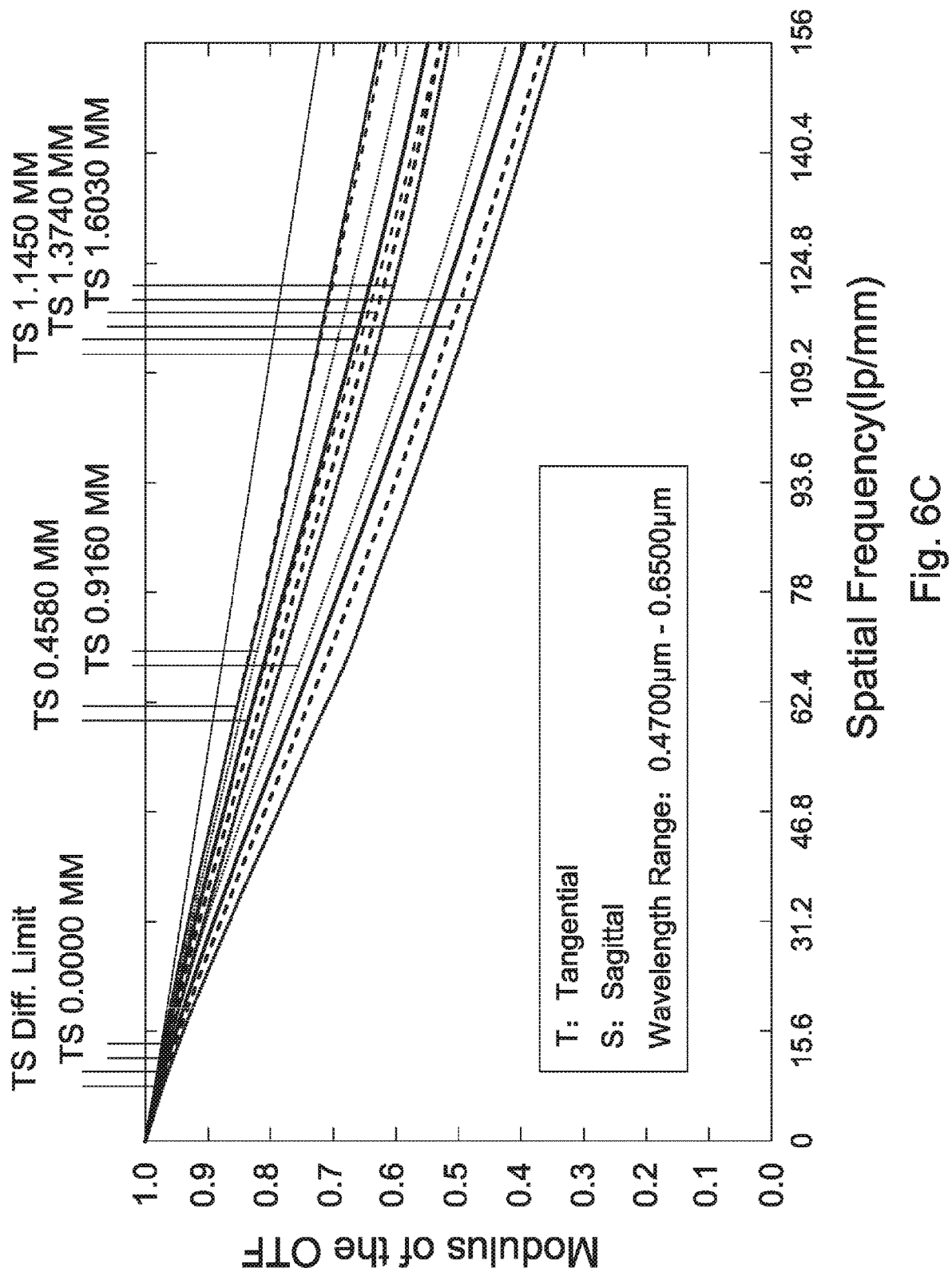
FIG. 6C is a modulation transfer function diagram of the lens assembly in accordance with the third embodiment of the invention.

By the above arrangements of the lenses, reflective element P3, and stop ST3, the lens assembly 3 of the third embodiment can meet the requirements of optical performance as seen in FIGS. 6A-6C.

It can be seen from FIG. 6A that the field curvature of tangential direction and sagittal direction in the lens assembly 3 of the third embodiment ranges from −0.12 mm to 0.02 mm. It can be seen from FIG. 6B that the distortion in the lens assembly 3 of the third embodiment ranges from 0% to 2%. It can be seen from FIG. 6C that the modulation transfer function of tangential direction and sagittal direction in the lens assembly 3 of the third embodiment ranges from 0.35 to 1.0.

It is obvious that the field curvature and the distortion of the lens assembly 3 of the third embodiment can be corrected effectively, and the resolution of the lens assembly 3 of the third embodiment can meet the requirement. Therefore, the lens assembly 3 of the third embodiment is capable of good optical performance.

Figure 7:
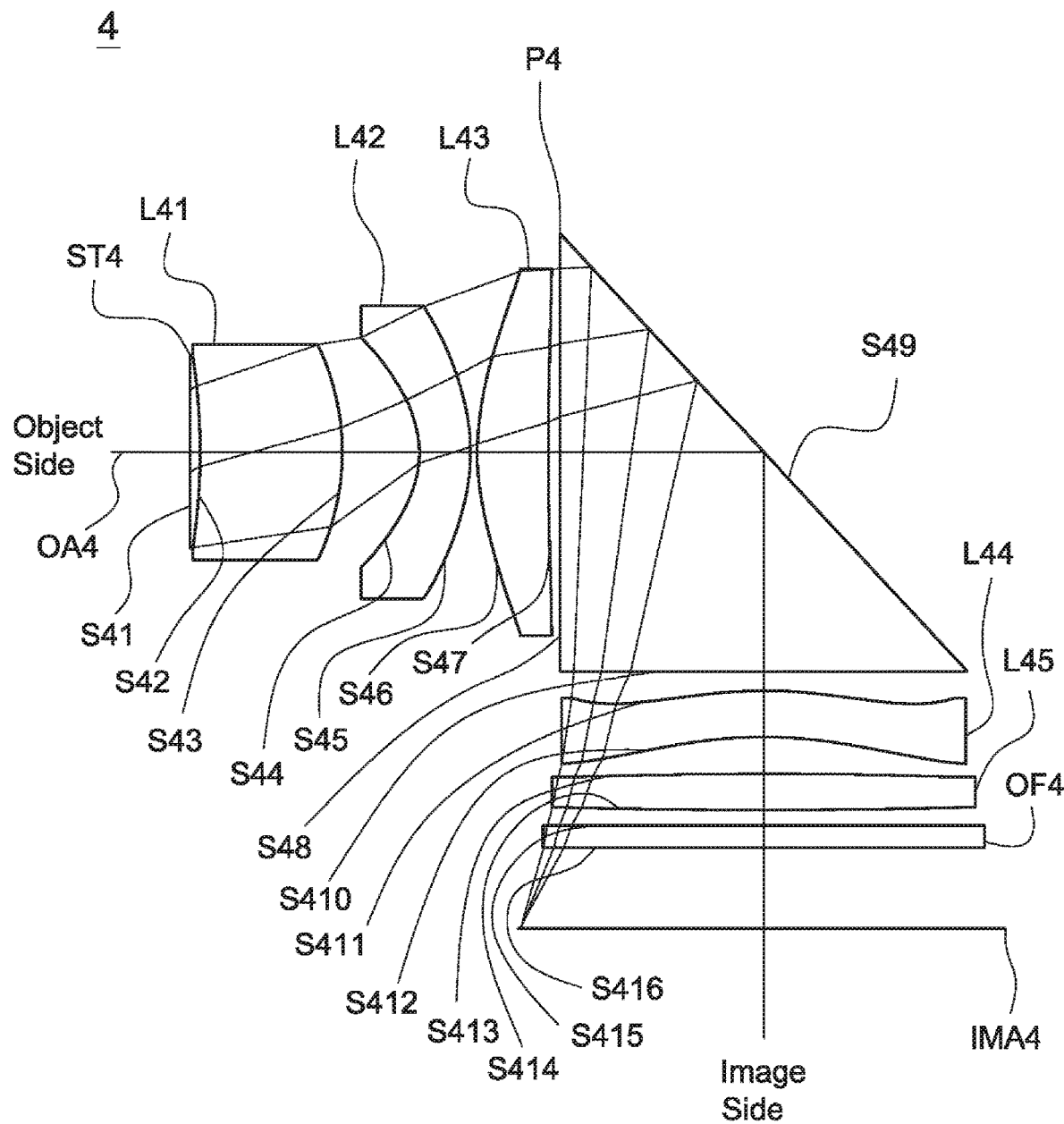
FIG. 7 is a lens layout and optical path diagram of a lens assembly in accordance with a fourth embodiment of the invention.

Referring to FIG. 7, the lens assembly 4 includes a stop ST4, a first lens L41, a second lens L42, a third lens L43, a reflective element P4, a fourth lens L44, a fifth lens L45, and an optical filter OF4, all of which are arranged in order from an object side to an image side along an optical axis OA4. The reflective element P4 includes an incident surface S48, a reflective surface S49, and an exit surface S410, wherein the incident surface S48 and the exit surface S410 are perpendicular to each other. The reflective surface S49 may contains a metal layer, such as a metal thin film layer of aluminum (Al), silver (Ag), etc., and the reflective surface S49 can be made to include metal layer in any suitable ways, such as coating a metal thin film layer. In this way, the color shift phenomenon and the occurrence of halo during imaging can be avoided, so that the color shift can be effectively improved, the point light source can be effectively concentrated, and has a good image quality for the lens assembly 4. In operation, the light from the object side is reflected by the reflective surface S49 to change the propagation direction and imaged on an image plane IMA4. The image plane IMA4 and the exit surface S410 are parallel to each other. In the fourth embodiment, the reflective element takes a prism as an example but is not limited thereto. For example, the reflective element may be a reflective mirror which only includes a reflective surface.

According to the foregoing, wherein: the first lens L41 is a meniscus lens, wherein the object side surface S42 is a concave surface; the second lens L42 is a meniscus lens, wherein the image side surface S45 is a convex surface; the third lens L43 is a meniscus lens, wherein the image side surface S47 is a concave surface and both of the object side surface S46 and image side surface S47 are aspheric surfaces; the fourth lens L44 is a meniscus lens with negative refractive power and made of glass or plastic material, wherein the object side surface S411 is a convex surface and the object side surface S411 is an aspheric surface; the fifth lens L45 is a biconvex lens with positive refractive and made of glass or plastic material, wherein the object side surface S413 is a convex surface, the image side surface S414 is a convex surface, and both of the object side surface S413 and image side surface S414 are aspheric surfaces; and both of the object side surface S415 and image side surface S416 of the optical filter OF4 are plane surfaces.

With the above design of the lenses, reflective element P4, stop ST4, and at least any one of the conditions (1)-(20) satisfied, the lens assembly 4 can have an effective shortened total lens length, an effective increased resolution, an effective corrected aberration, and is capable of an effective corrected chromatic aberration.

Table 10 shows the optical specification of the lens assembly 4 in FIG. 7.

TABLE 10

Effective Focal Length = 3.06825 mm F-number = 2.48
Total Optical System Length = 7.097378 mm Field of View = 55.00 degrees

| Surface Number | Radius of Curvature (mm) | Thickness (mm) | Nd | Vd | Effective Focal Length (mm) | Remark |
|---|---|---|---|---|---|---|
| S41 | ∞ | 0.07 | | | | Stop ST4 |
| S42 | −5.54134 | 0.989287 | 1.801505 | 39.99998 | 2.861517 | The First Lens L41 |
| S43 | −1.75691 | 0.542297 | | | | |
| S44 | −0.59747 | 0.354514 | 1.671268 | 19.23837 | −2.17272 | The Second Lens L42 |
| S45 | −1.2466 | 0.047319 | | | | |
| S46 | 1.463613 | 0.498884 | 1.592617 | 67.00001 | 2.631132 | The Third Lens L43 |
| S47 | 19.9944 | 0.081931 | | | | |
| S48 | ∞ | 1.42 | 1.802 | 44.3 | | Reflective Element P4 Incident Surface |
| S49 | ∞ | 1.42 | 1.802 | 44.3 | | Reflective Element P4 Reflective Surface |
| S410 | ∞ | 0.130012 | | | | Reflective Element P4 Exit Surface |
| S411 | 3.350262 | 0.3 | 1.671 | 19.23999 | −136.303 | The Fourth Lens L44 |
| S412 | 3.350728 | 0.239519 | | | | |
| S413 | 124.3329 | 0.232795 | 1.5352 | 56.11 | 11.16685 | The Fifth Lens L45 |
| S414 | −6.29564 | 0.1 | | | | |
| S415 | ∞ | 0.145 | 1.5 | 60 | | Optical Filter OF4 |
| S416 | ∞ | 0.525821 | | | | |

The definition of aspheric surface sag z of each asp lens in table 10 is the same as that of in Table 1, and is not described here again.

In the fourth embodiment, the conic constant k and the aspheric coefficients A, B, C, D, E, F, G of each aspheric lens are shown in Table 11.

TABLE 11

| Surface Number | k | A E | B F | C G | D |
|---|---|---|---|---|---|
| S42 | 1.219274 | −0.03602155 | −0.4856594 | 2.2884042 | −6.4411208 |
| | | 9.0615729 | −7.1735785 | 3.2656249 | |
| S43 | −1.999641 | −0.15262273 | 0.24937921 | −1.0908768 | 2.404109 |
| | | −2.5037565 | 0.53624724 | 0.53232278 | |
| S44 | −0.7158636 | 0.65344018 | −0.87515526 | 1.0760046 | −0.45984854 |
| | | 0.3591053 | −1.9976787 | 1.9645166 | |
| S45 | −0.5362424 | 0.13140721 | −0.07993976 | 0.074686371 | −0.11486832 |
| | | 0.076430574 | −0.01043467 | −0.00370993 | |
| S46 | −9.851534 | 0.054265844 | −0.03613012 | 0.011437864 | −0.00064248 |
| | | −0.00257327 | 0.000552514 | 0.000189864 | |
| S47 | 100.2754 | −0.0024418 | 0.001481947 | −0.00150654 | −0.00053277 |
| | | −0.00073606 | −0.00035132 | 0.00035109 | |
| S411 | −6.801962 | −0.04175006 | −0.00681522 | −0.00180852 | 0.000357034 |
| | | 0.000347889 | 4.17E−05 | −3.38E−05 | |
| S412 | −8.924384 | −0.00026158 | −0.0102123 | 0.001078722 | 0.000247299 |
| | | −1.73E−05 | −1.02E−05 | −5.86E−08 | |
| S413 | 4322.146 | 0.008810033 | −0.00177261 | −0.00050394 | −5.76E−05 |
| | | 1.88E−06 | 1.60E−06 | 2.04E−07 | |
| S414 | −3.81E+15 | −0.00550205 | 0.000286846 | 0.000182882 | 3.11E−05 |
| | | 2.84E−06 | −6.89E−07 | −1.28E−07 | |

Table 12 shows the parameters and condition values for conditions (1)-(9), (12), and (18)-(19) in accordance with the fourth embodiment of the invention. It can be seen from Table 12 that the lens assembly 4 of the fourth embodiment satisfies the conditions (1)-(9), (12), and (18)-(19).

TABLE 12

| L | 3.934231 mm | $OD_1$ | 1.237022 mm | $ID_1$ | 1.4 mm |
|---|---|---|---|---|---|
| ALOD | 10.64337 mm | $f_{obj1}$ | 2.861517 mm | $f_{obj2}$ | −2.17272 mm |
| $f_{obj4}$ | −136.303 mm | | | | |
| TTL/f | 2.313168 | $TTL/OD_1$ | 5.737471 | $ID_1/OD_1$ | 1.13175 |
| TTL/ALOD | 0.666836 | ALOD/f | 3.468872 | $(TTL + f)/f_{obj1}$ | 3.552531 |
| $|f_{obj1}| + |f_{obj2}|$ | 5.034233 mm | $FPD_{max}$ | 2.377948 mm | TTL/L | 1.804006 |
| L/f | 1.282239 | | | | |

Figure 8A:
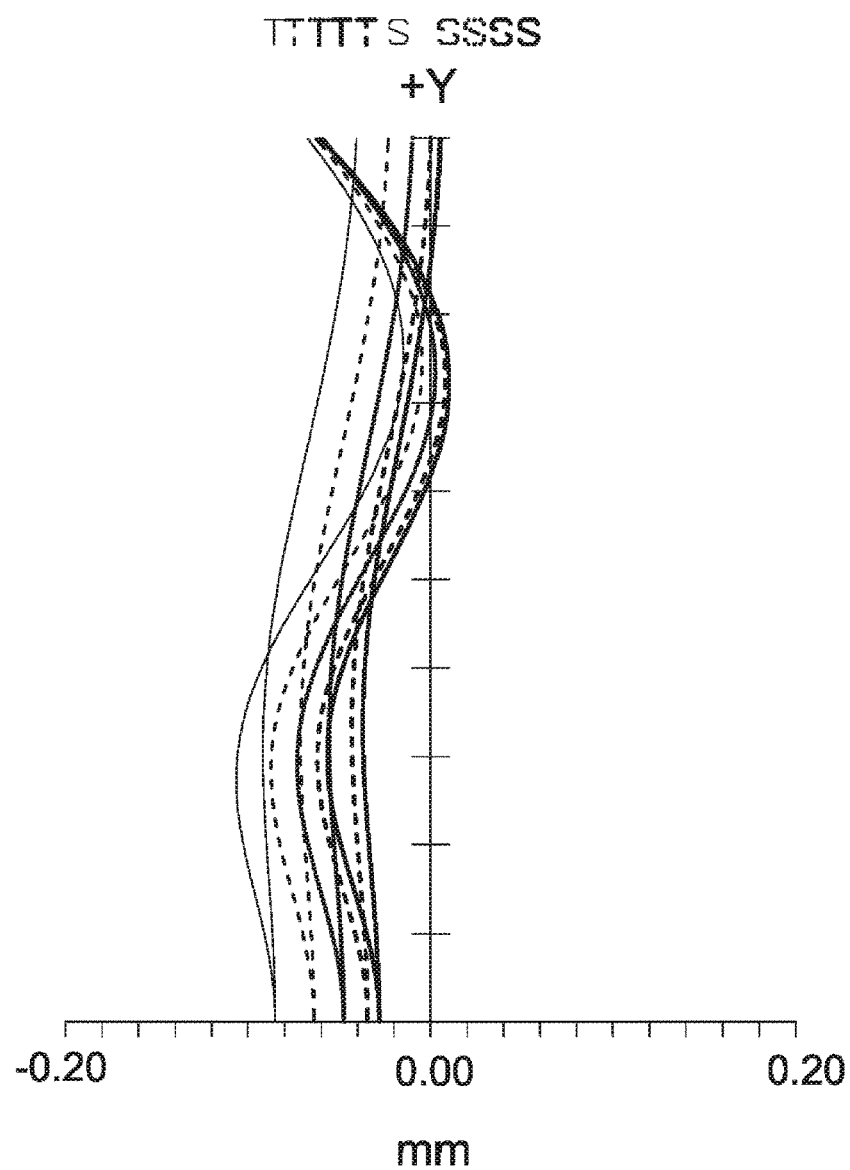
FIG. 8A depicts a field curvature diagram of the lens assembly in accordance with the fourth embodiment of the invention.
Figure 8B:
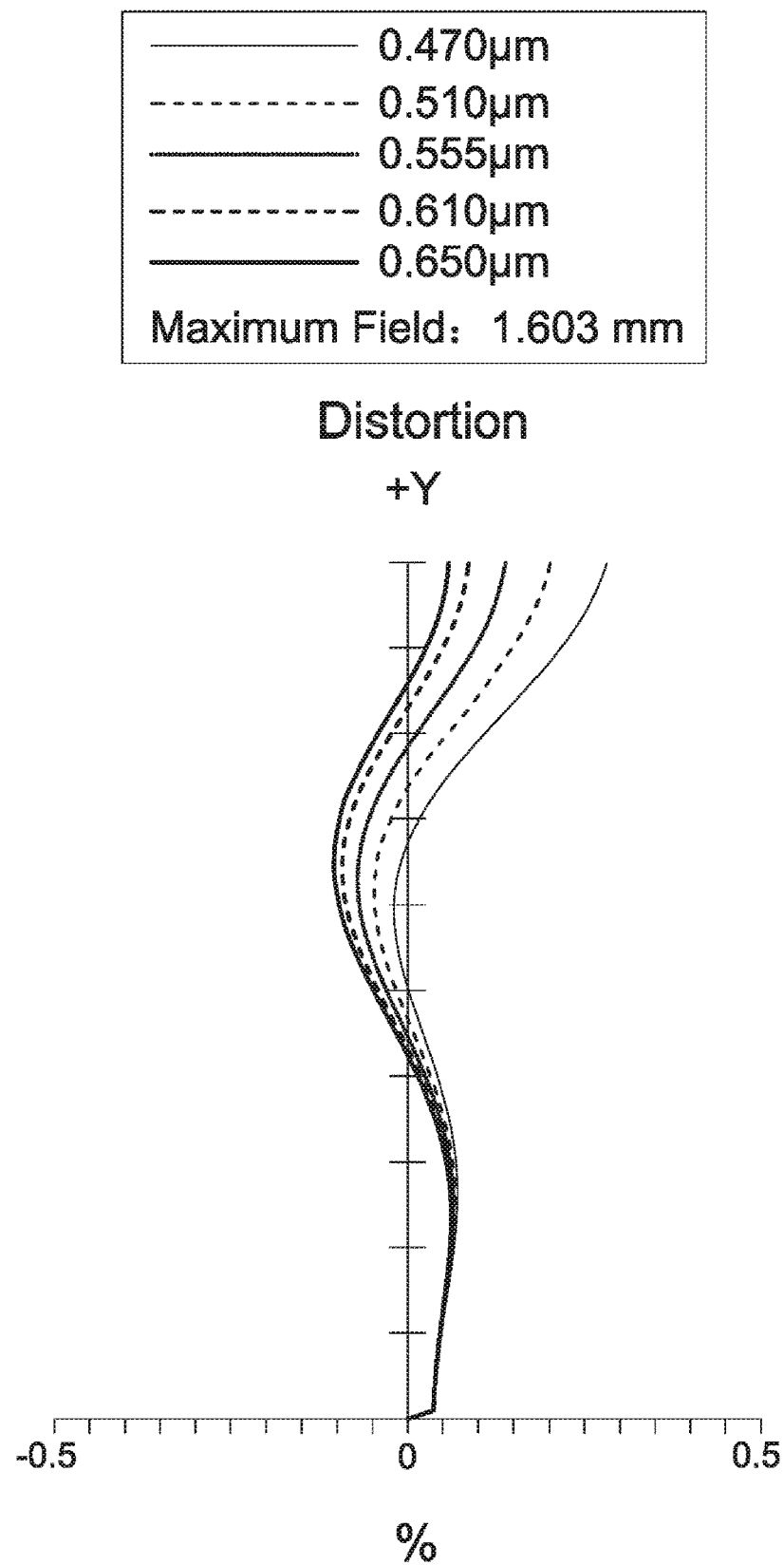
FIG. 8B is a distortion diagram of the lens assembly in accordance with the fourth embodiment of the invention.
Figure 8C:
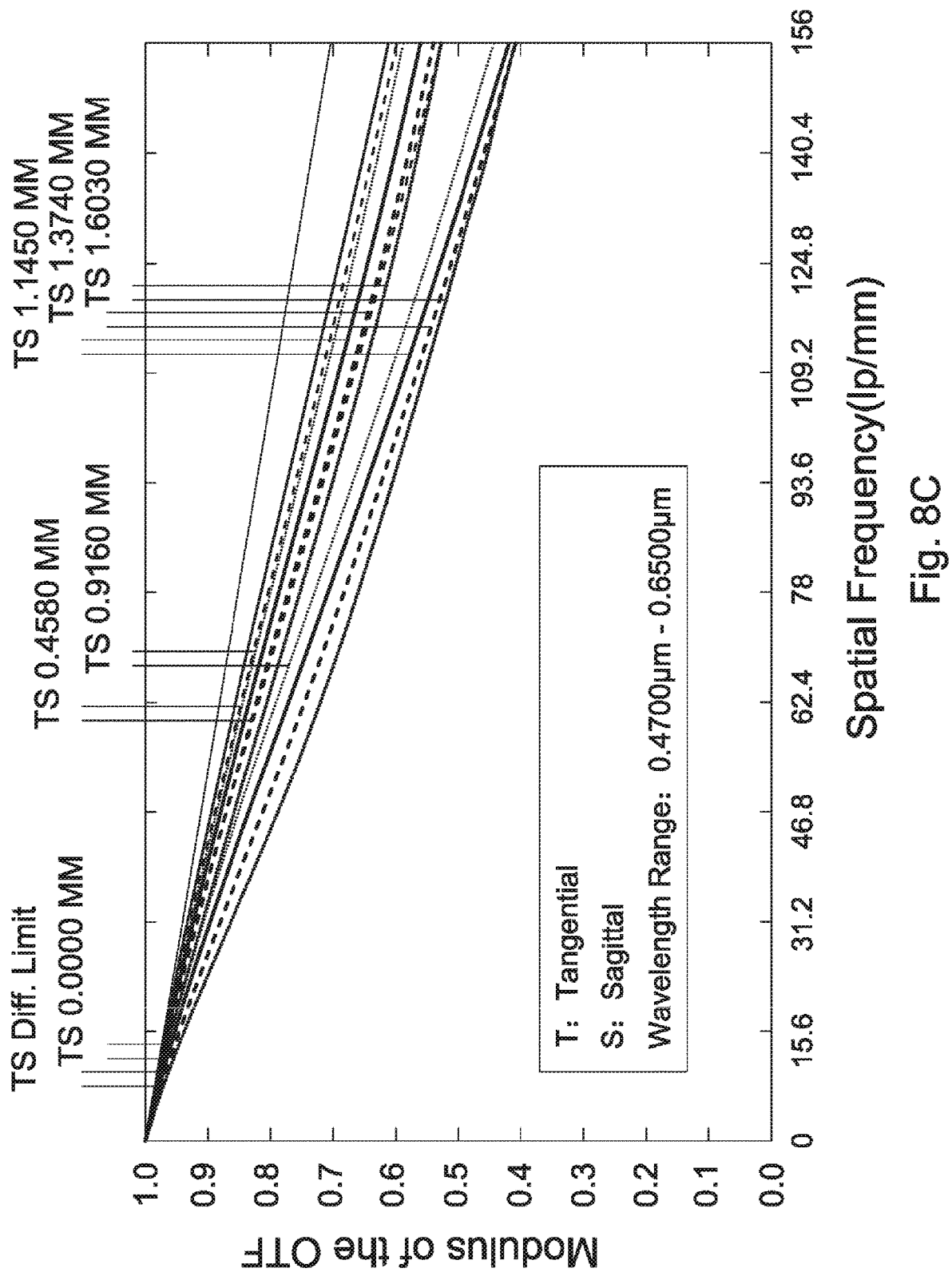
FIG. 8C is a modulation transfer function diagram of the lens assembly in accordance with the fourth embodiment of the invention.

By the above arrangements of the lenses, reflective element P4, and stop ST4, the lens assembly 4 of the fourth embodiment can meet the requirements of optical performance as seen in FIGS. 8A-8C.

It can be seen from FIG. 8A that the field curvature of tangential direction and sagittal direction in the lens assembly 4 of the fourth embodiment ranges from −0.12 mm to 0.02 mm. It can be seen from FIG. 8B that the distortion in the lens assembly 4 of the fourth embodiment ranges from −0.15% to 0.3%. It can be seen from FIG. 8C that the modulation transfer function of tangential direction and sagittal direction in the lens assembly 4 of the fourth embodiment ranges from 0.41 to 1.0.

It is obvious that the field curvature and the distortion of the lens assembly 4 of the fourth embodiment can be corrected effectively, and the resolution of the lens assembly 4 of the fourth embodiment can meet the requirement. Therefore, the lens assembly 4 of the fourth embodiment is capable of good optical performance.

Figure 9:
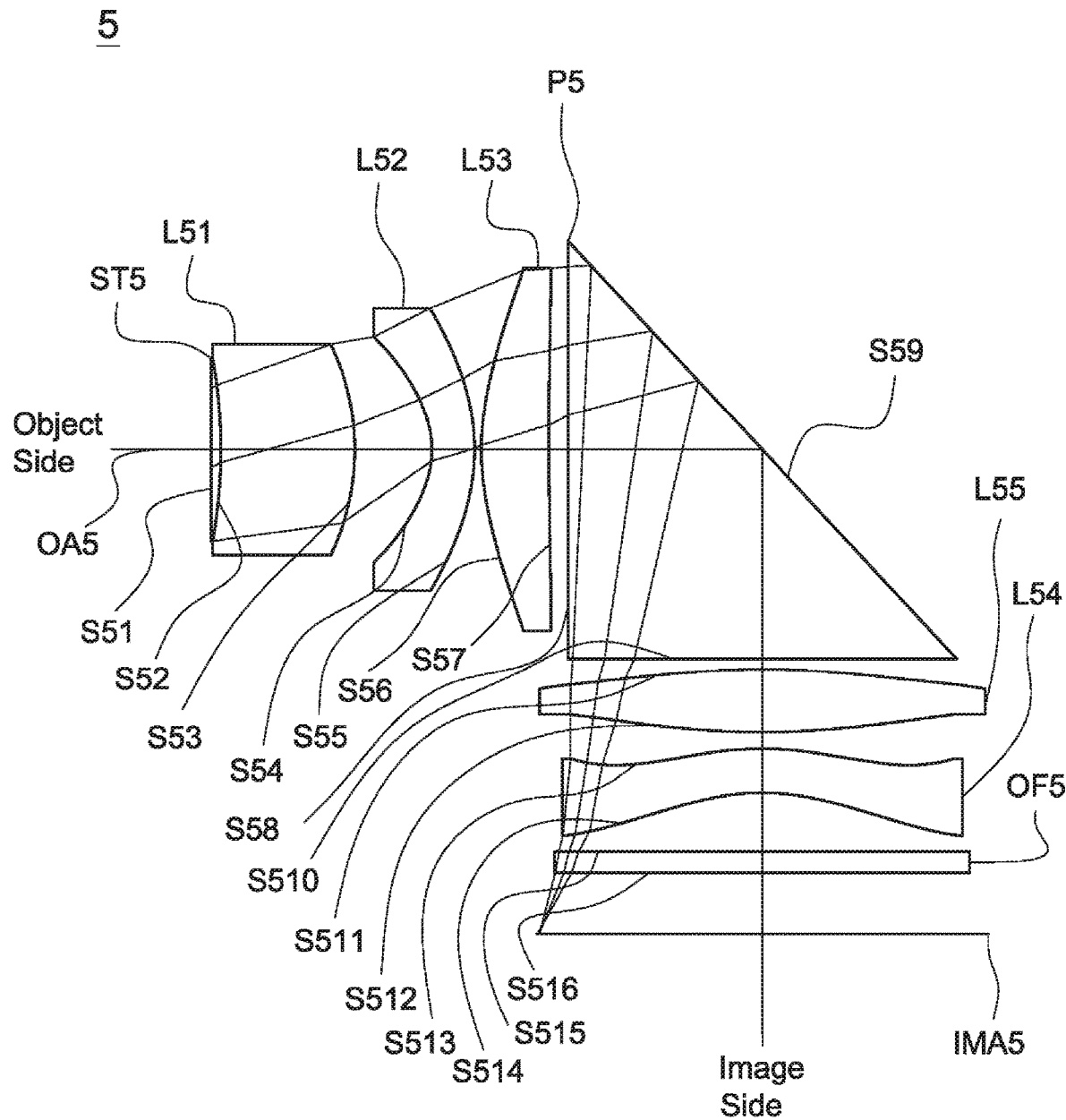
FIG. 9 is a lens layout and optical path diagram of a lens assembly in accordance with a fifth embodiment of the invention.

Referring to FIG. 9, the lens assembly 5 includes a stop ST5, a first lens L51, a second lens L52, a third lens L53, a reflective element P5, a fifth lens L55, a fourth lens L54, and an optical filter OF5, all of which are arranged in order from an object side to an image side along an optical axis OA5. The reflective element P5 includes an incident surface S58, a reflective surface S59, and an exit surface S510, wherein the incident surface S58 and the exit surface S510 are perpendicular to each other. The reflective surface S59 may contains a metal layer, such as a metal thin film layer of aluminum (Al), silver (Ag), etc., and the reflective surface S59 can be made to include metal layer in any suitable ways, such as coating a metal thin film layer. In this way, the color shift phenomenon and the occurrence of halo during imaging can be avoided, so that the color shift can be effectively improved, the point light source can be effectively concentrated, and has a good image quality for the lens assembly 5. In operation, the light from the object side is reflected by the reflective surface S59 to change the propagation direction and imaged on an image plane IMA5. The image plane IMA5 and the exit surface S510 are parallel to each other. In the fifth embodiment, the reflective element takes a prism as an example but is not limited thereto. For example, the reflective element may be a reflective mirror which only includes a reflective surface.

According to the foregoing, wherein: the first lens L51 is a meniscus lens, wherein the object side surface S52 is a concave surface; the second lens L52 is a meniscus lens, wherein the image side surface S55 is a convex surface; the third lens L53 is a meniscus lens, wherein the image side surface S57 is a concave surface and both of the object side surface S56 and image side surface S57 are aspheric surfaces; the fifth lens L55 is a biconvex lens with positive refractive power and made of glass or plastic material, wherein the object side surface S511 is a convex surface, the image side surface S512 is a convex surface, and both of the object side surface S511 and image side surface S512 are aspheric surfaces; the fourth lens L54 is a meniscus lens with negative refractive power and made of glass or plastic material, wherein the object side surface S513 is a convex surface and the object side surface S513 is an aspheric surface; and both of the object side surface S515 and image side surface S516 of the optical filter OF5 are plane surfaces.

With the above design of the lenses, reflective element P5, stop ST5, and at least any one of the conditions (1)-(20) satisfied, the lens assembly 5 can have an effective shortened total lens length, an effective increased resolution, an effective corrected aberration, and is capable of an effective corrected chromatic aberration.

Table 13 shows the optical specification of the lens assembly 5 in FIG. 9.

TABLE 13

Effective Focal Length = 3.06826 mm F-number = 2.6
Total Optical System Length = 7.341773 mm Field of View = 54.96 degrees

| Surface Number | Radius of Curvature (mm) | Thickness (mm) | Nd | Vd | Effective Focal Length (mm) | Remark |
|---|---|---|---|---|---|---|
| S51 | ∞ | 0.07 | | | | Stop ST5 |
| S52 | −4.39042 | 0.983474 | 1.801502 | 39.99999 | 3.061721 | The First Lens L51 |
| S53 | −1.73644 | 0.563924 | | | | |
| S54 | −0.60926 | 0.312458 | 1.671268 | 19.23837 | −2.17488 | The Second Lens L52 |
| S55 | −1.2539 | 0.047319 | | | | |
| S56 | 1.490571 | 0.498884 | 1.59183 | 67.00004 | 2.268636 | The Third Lens L53 |
| S57 | 20.06779 | 0.139272 | | | | |
| S58 | ∞ | 1.4231 | 1.802 | 44.3 | | Reflective Element P5 Incident Surface |

TABLE 13-continued

Effective Focal Length = 3.06826 mm F-number = 2.6
Total Optical System Length = 7.341773 mm Field of View = 54.96 degrees

| Surface Number | Radius of Curvature (mm) | Thickness (mm) | Nd | Vd | Effective Focal Length (mm) | Remark |
|---|---|---|---|---|---|---|
| S59 | ∞ | 1.4231 | 1.802 | 44.3 | | Reflective Element P5 Reflective Surface |
| S510 | ∞ | 0.074659 | | | | Reflective Element P5 Exit Surface |
| S511 | 7.081442 | 0.428229 | 1.5352 | 56.11 | 6.312641 | The Fifth Lens L55 |
| S512 | −6.36407 | 0.111748 | | | | |
| S513 | 2.396352 | 0.3 | 1.671 | 19.23996 | −11.8433 | The Fourth Lens L54 |
| S514 | 1.751843 | 0.4 | | | | |
| S515 | ∞ | 0.145 | 1.5 | 60 | | Optical Filter OF5 |
| S516 | ∞ | 0.420607 | | | | |

The definition of aspheric surface sag z of each aspheric lens in table 13 is the same as that of in Table 1, and is not described here again.

In the fifth embodiment, the conic constant k and the aspheric coefficients A, B, C, D, E, F, G of each aspheric lens are shown in Table 14.

TABLE 14

| Surface Number | k | A<br>E | B<br>F | C<br>G | D |
|---|---|---|---|---|---|
| S52 | 0.352.453 | −0.03422112<br>9.046813 | −0.45802357<br>−6.9516731 | 2.2693686<br>3.2895086 | −6.4909192 |
| S53 | −2.40009 | −0.14450985<br>−2.5465537 | 0.21758413<br>0.35927899 | −1.0525346<br>0.77433394 | 2.4379204 |
| S54 | −0.71996 | 0.64455126<br>0.45189718 | −0.91019912<br>−1.8985688 | 1.0470208<br>1.7996989 | −0.41689718 |
| S55 | −0.55955 | 0.13370732<br>0.086059915 | −0.07924532<br>−0.00541713 | 0.071852647<br>−0.00829265 | −0.11445011 |
| S56 | −11.8096 | 0.053502886<br>−0.00237709 | −0.03530097<br>0.000397931 | 0.012714455<br>0.000120715 | 0.00016147 |
| S57 | −99.9462 | −0.00815003<br>−0.00065772 | 0.002534206<br>−0.00045445 | 0.000202537<br>0.000285441 | 1.66E−05 |
| S511 | −12.3666 | −0.00360962<br>4.28E−05 | −0.0020524<br>4.33E−06 | 7.16E−06<br>−2.58E−06 | 0.000127816 |
| S512 | −16.6528 | −0.00027334<br>2.97E−05 | 0.000661254<br>1.43E−05 | 0.000162137<br>3.51E−06 | 6.74E−05 |
| S513 | −10.8915 | −0.04134912<br>0.000332458 | −0.00522074<br>4.75E−05 | −0.00145687<br>−2.70E−05 | 0.000258147 |
| S514 | −6.6787 | −0.00560482<br>4.80E−06 | −0.01002556<br>−7.74E−06 | 0.001256401<br>−1.34E−06 | 0.000350737 |

Table 15 shows the parameters and condition values for conditions (1)-(9), (12), and (18)-(19) in accordance with the fifth embodiment of the invention. It can be seen from Table 15 that the lens assembly 5 of the fifth embodiment satisfies the conditions (1)-(9), (12), and (18)-(19).

TABLE 15

| | | | | | |
|---|---|---|---|---|---|
| L | 3.96843 mm | $OD_1$ | 1.248812 mm | $ID_1$ | 1.44 mm |
| ALOD | 11.30868 mm | $f_{obj1}$ | 3.061721 mm | $f_{obj2}$ | −2.17488 mm |
| $f_{obj4}$ | 6.312641 mm | | | | |
| TTL/f | 2.392813 | TTL/$OD_1$ | 5.879006 | $ID_1$/$OD_1$ | 1.153096 |
| TTL/ALOD | 0.649216 | ALOD/f | 3.685698 | (TTL + f)/$f_{obj1}$ | 3.400059 |
| $|f_{obj1}| + |f_{obj2}|$ | 5.236605 mm | $FPD_{max}$ | 2.469688 mm | TTL/L | 1.850045 |
| L/f | 1.293381 | | | | |

Figure 10A:
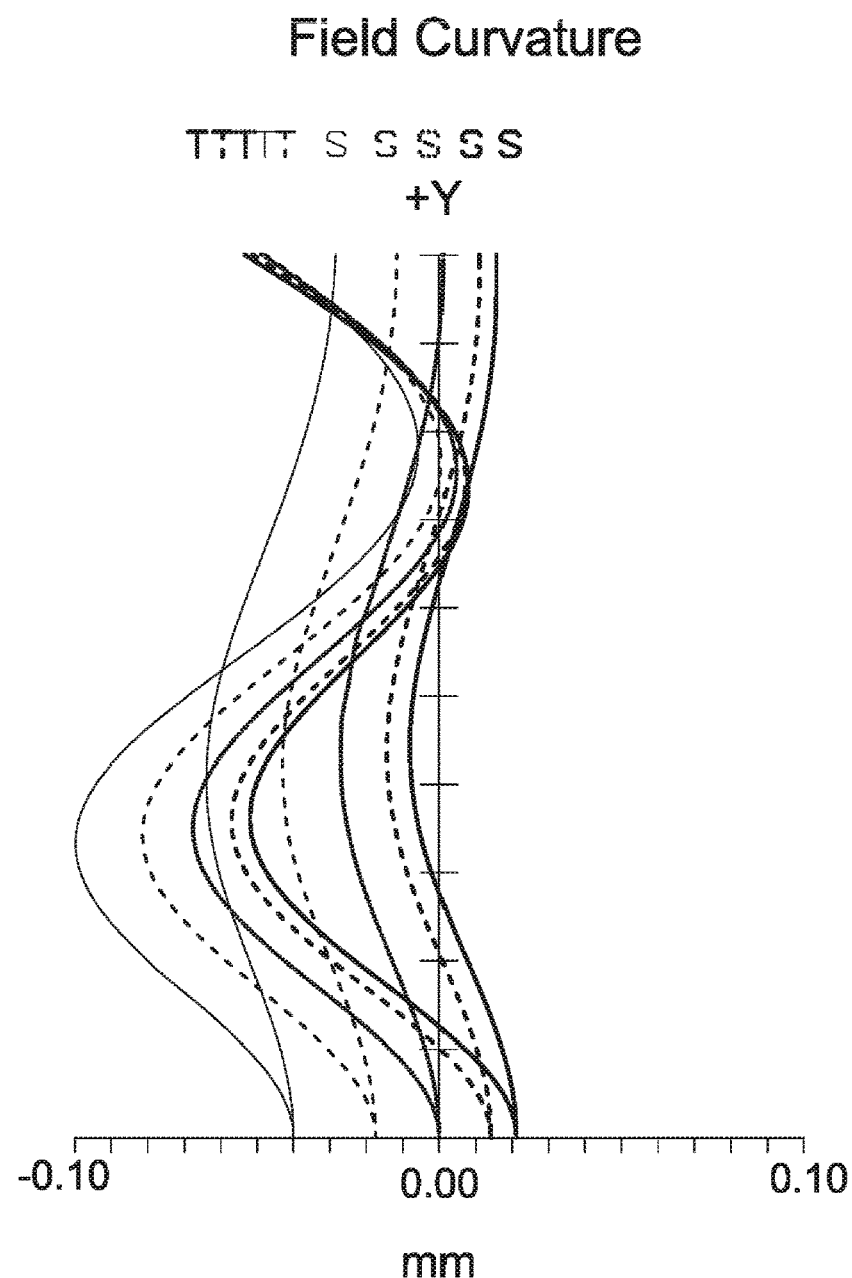
FIG. 10A depicts a field curvature diagram of the lens assembly in accordance with the fifth embodiment of the invention.
Figure 10B:
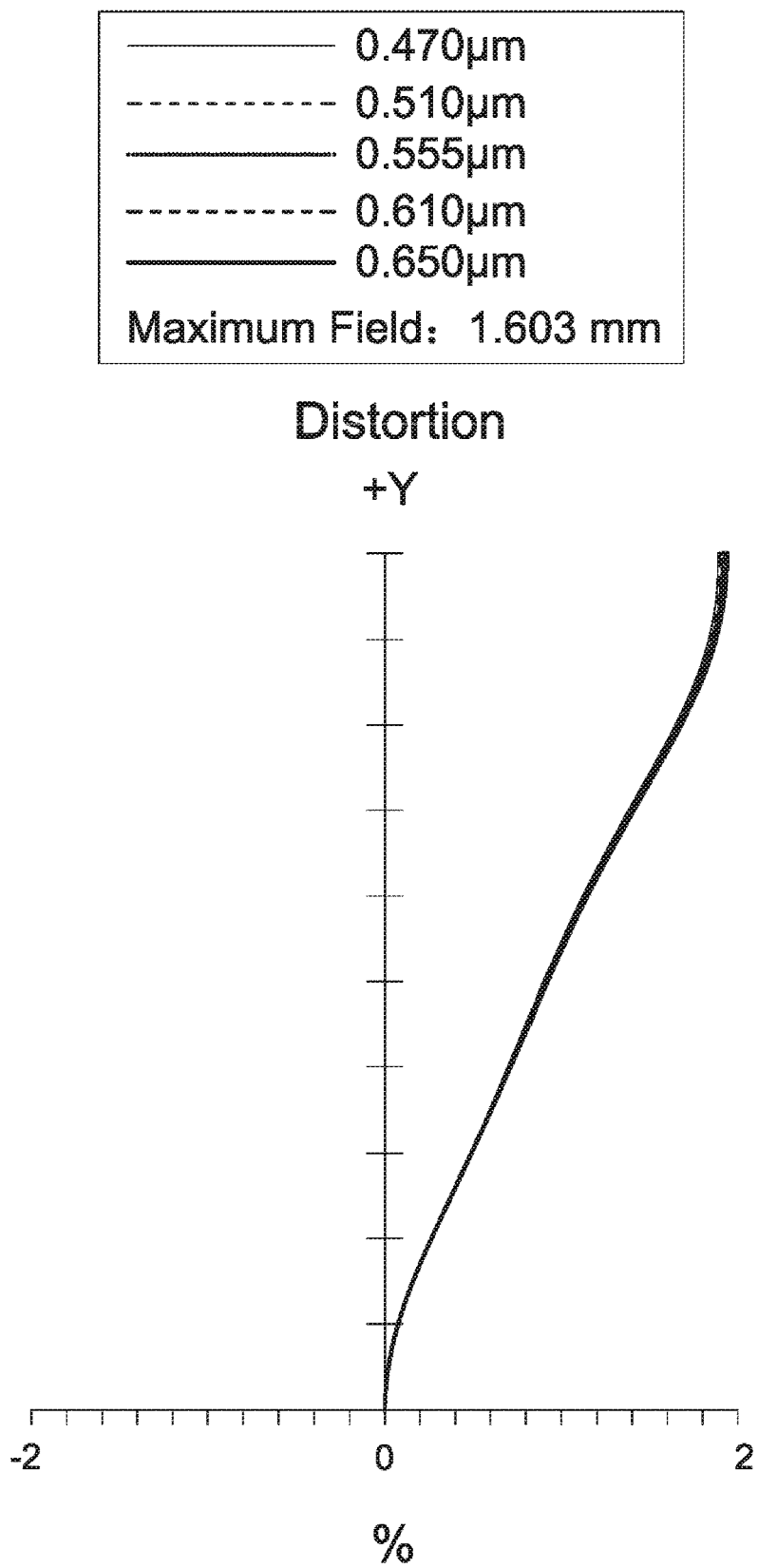
FIG. 10B is a distortion diagram of the lens assembly in accordance with the fifth embodiment of the invention.
Figure 10C:
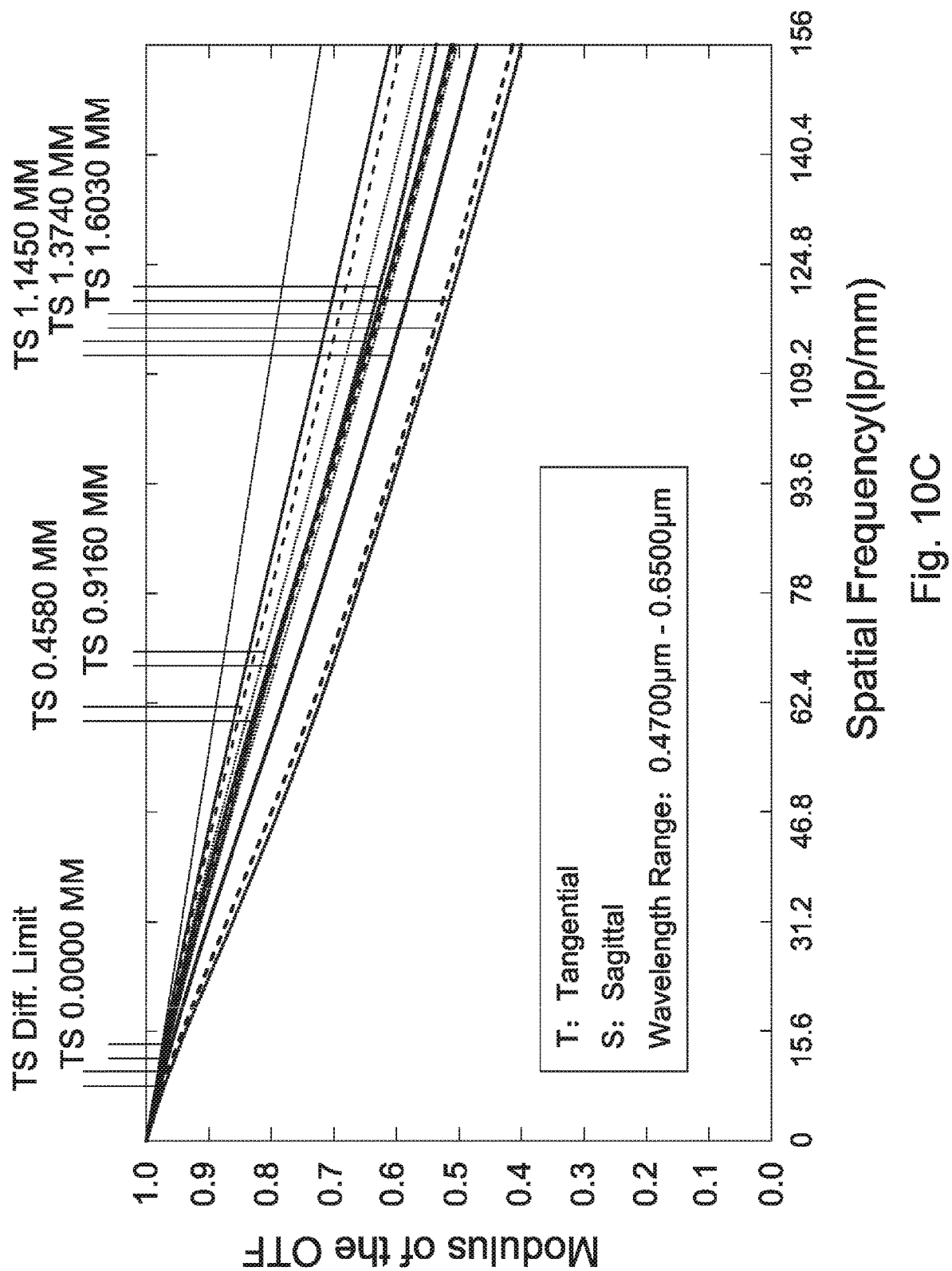
FIG. 10C is a modulation transfer function diagram of the lens assembly in accordance with the fifth embodiment of the invention.

By the above arrangements of the lenses, reflective element P5, and stop ST5, the lens assembly 5 of the fifth embodiment can meet the requirements of optical performance as seen in FIGS. 10A-10C.

It can be seen from FIG. 10A that the field curvature of tangential direction and sagittal direction in the lens assembly 5 of the fifth embodiment ranges from −0.10 mm to 0.025 mm. It can be seen from FIG. 10B that the distortion in the lens assembly 5 of the fifth embodiment ranges from 0% to 2%. It can be seen from FIG. 10C that the modulation transfer function of tangential direction and sagittal direction in the lens assembly 5 of the fifth embodiment ranges from 0.40 to 1.0.

It is obvious that the field curvature and the distortion of the lens assembly 5 of the fifth embodiment can be corrected effectively, and the resolution of the lens assembly 5 of the fifth embodiment can meet the requirement. Therefore, the lens assembly 5 of the fifth embodiment is capable of good optical performance.

Figure 11:
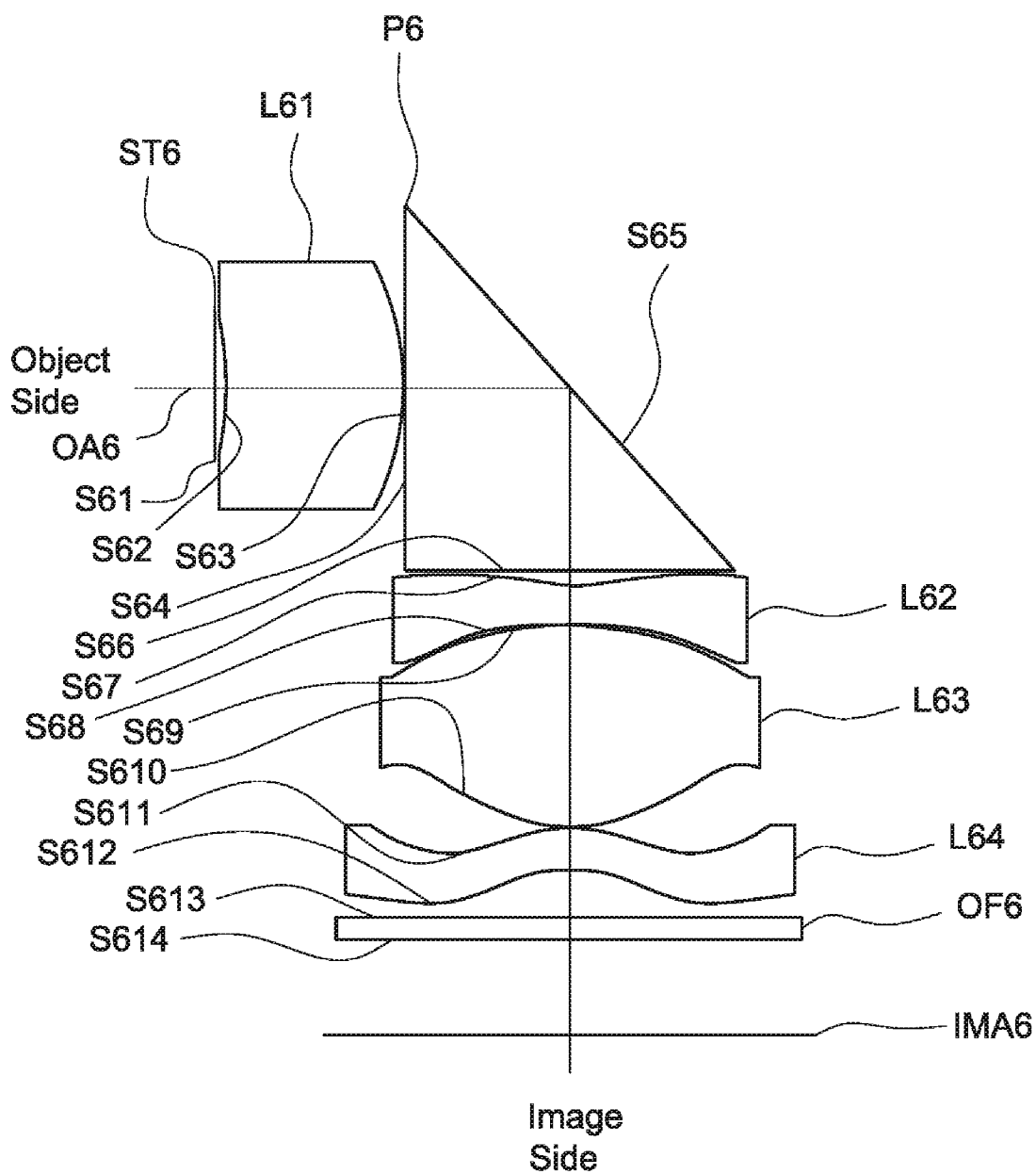
FIG. 11 is a lens layout and optical path diagram of a lens assembly in accordance with a sixth embodiment of the invention.

Referring to FIG. 11, the lens assembly 6 includes a stop ST6, a first lens L61, a reflective element P6, a second lens L62, a third lens L63, a fourth lens L64, and an optical filter OF6, all of which are arranged in order from an object side to an image side along an optical axis OA6. The reflective element P6 includes an incident surface S64, a reflective surface S65, and an exit surface S66, wherein the incident surface S64 and the exit surface S66 are perpendicular to each other. The reflective surface S65 may contains a metal layer, such as a metal thin film layer of aluminum (Al), silver (Ag), etc., and the reflective surface S65 can be made to include metal layer in any suitable ways, such as coating a metal thin film layer. In this way, the color shift phenomenon and the occurrence of halo during imaging can be avoided, so that the color shift can be effectively improved, the point light source can be effectively concentrated, and has a good image quality for the lens assembly 6. In operation, the light from the object side is reflected by the reflective surface S65 to change the propagation direction and imaged on an image plane IMA6. The image plane IMA6 and the exit surface S66 are parallel to each other. In the sixth embodiment, the reflective element takes a prism as an example but is not limited thereto. For example, the reflective element may be a reflective mirror which only includes a reflective surface.

According to the foregoing, wherein: the first lens L61 is a meniscus lens, wherein the object side surface S62 is a concave surface; the second lens L62 is a biconcave lens, wherein the image side surface S68 is a concave surface; the third lens L63 is a biconvex lens, wherein the image side surface S610 is a convex surface and both of the object side surface S609 and image side surface S610 are aspheric surfaces; the fourth lens L64 is a meniscus lens with negative refractive power and made of glass or plastic material, wherein the object side surface S611 is a convex surface and the object side surface S611 is an aspheric surface; and both of the object side surface S613 and image side surface S614 of the optical filter OF6 are plane surfaces.

With the above design of the lenses, reflective element P6, stop ST6, and at least any one of the conditions (1)-(20) satisfied, the lens assembly 6 can have an effective shortened total lens length, an effective increased resolution, an effective corrected aberration, and is capable of an effective corrected chromatic aberration.

Table 16 shows the optical specification of the lens assembly 6 in FIG. 11.

TABLE 16

Effective Focal Length = 2.4918 mm F-number = 2.48
Total Optical System Length = 7.254615 mm Field of View = 38.78 degrees

| Surface Number | Radius of Curvature (mm) | Thickness (mm) | Nd | Vd | Effective Focal Length (mm) | Remark |
|---|---|---|---|---|---|---|
| S61 | ∞ | 0.08432 | | | | Stop ST6 |
| S62 | −2.54656 | 1.430805 | 1.85605 | 40.28218 | 2.574553 | The First Lens L61 |
| S63 | −1.49194 | 0.011211 | | | | |
| S64 | ∞ | 1.303 | 2.0033 | 28.32 | | Reflective Element P6 Incident Surface |
| S65 | ∞ | 1.303 | 2.0033 | 28.32 | | Reflective Element P6 Reflective Surface |
| S66 | ∞ | 0.09988 | | | | Reflective Element P6 Exit Surface |
| S67 | −2.50592 | 0.281861 | 1.651 | 19.24 | −2.513553 | The Second Lens L62 |
| S68 | 5.060772 | 0.023067 | | | | |
| S69 | 4.41957 | 1.42177 | 1.5352 | 56.11 | 1.960286 | The Third Lens L63 |
| S610 | −1.22633 | 0.012178 | | | | |
| S611 | 1.320806 | 0.291233 | 1.671 | 19.23991 | −8.025317 | The Fourth Lens L64 |
| S612 | 0.967984 | 0.35 | | | | |
| S613 | ∞ | 0.145 | 1.5 | 60 | | Optical Filter OF6 |
| S614 | ∞ | 0.49729 | | | | |

The aspheric surface sag z of each aspheric lens in table 16 can be calculated by the following formula:

$$z = ch^2/\{1+[1-(k+1)c^2h^2]^{1/2}\} + Ah^4 + Bh^6 + Ch^8 + Dh^{10} + Eh^{12} + Fh^{14} + Gh^{16} + Hh^{18} + Ih^{20}$$

where c is curvature, h is the vertical distance from the lens surface to the optical axis, k is conic constant and A, B, C, D, G, H and I are aspheric coefficients.

In the sixth embodiment, the conic constant k and the aspheric coefficients A, B, C, D, E, G, H, I of each aspheric lens are shown in Table 17.

TABLE 17

| Surface Number | k | A F | B G | C H | D I | E |
|---|---|---|---|---|---|---|
| S62 | 13.75142 | 0.059633072 | 0.197975902 | −1.353695553 | 6.011150013 | 32.00738145 |
| | | −197.1765565 | −516.6148698 | 4973.695118 | −8072.082431 | |
| S63 | 0.844515 | 0.075082368 | 0.025370142 | −0.078201244 | 0.373403036 | −0.286249347 |
| | | −0.896557483 | 2.03681989 | −1.42041644 | 0.297002462 | |
| S67 | 0.315678 | −0.19884293 | 0.03114807 | 0.03883311 | −0.0023693 | −0.01358974 |
| | | −0.0041441 | 0.003413 | 0.002526 | −0.0011816 | |
| S68 | 11.50862 | −0.04801084 | −0.01774108 | 0.01732643 | 0.009153 | −0.0014184 |
| | | −0.001882 | −0.00062629 | 0.0002499 | 0.0001749 | |
| S69 | −7.72515 | −0.05136858 | 0.02018952 | −0.01897868 | −0.006259 | 0.006072 |
| | | 0.005693 | −0.0016121 | −0.0024039 | 0.0008936 | |
| S610 | −3.31646 | −0.02385783 | 0.02126333 | −0.00022589 | −0.0031994 | −0.00056687 |
| | | −0.000065107 | −0.00032328 | −0.00011925 | 0.0001142 | |
| S611 | −1.10491 | 0.19171951 | 0.02421953 | −0.01275306 | −0.0037512 | −0.00054874 |
| | | 0.0002613 | 0.0001886 | 0.00002875 | −0.000021294 | |
| S612 | −2.37611 | 0.20702235 | −0.03961328 | −0.0069432 | 0.001398 | 0.0005286 |
| | | −0.00002298 | −0.000038561 | −4.8794E−06 | 0.000003042 | |

Table 18 shows the parameters and condition values for conditions (1)-(2), (5)-(6), (8), and (13)-(19) in accordance with the sixth embodiment of the invention. It can be seen from Table 18 that the lens assembly 6 of the sixth embodiment satisfies the conditions (1)-(2), (5)-(6), (8), and (13)-(19).

TABLE 18

| L | 2.745337 mm | ALOD | 9.774 mm | $f_{obj1}$ | 2.574553 mm |
|---|---|---|---|---|---|
| $f_{obj3}$ | 1.960286 mm | $f_{obj4}$ | −8.025317 mm | L1T | 1.430805 mm |
| L1SD | 0.877 mm | $R_{11}$ | −2.54656 mm | M1T | 1.31421124 mm |
| TTL/f | 3.294779 | TTL/ALOD | 0.83937 | (TTL + f)/$f_{obj1}$ | 4.154623 |
| $f_{obj3}/f_{obj4}$ | −0.2443 | L1T × L1SD | 1.25411 mm² | L1T × $R_{11}$ | −3.64158 mm² |
| $f_{obj1}$/L1T | 1.8 mm | M1T/L1T | 0.91902 | TTL/L | 2.98834 |
| L/f | 1.102545 | | | | |

Figure 12A:
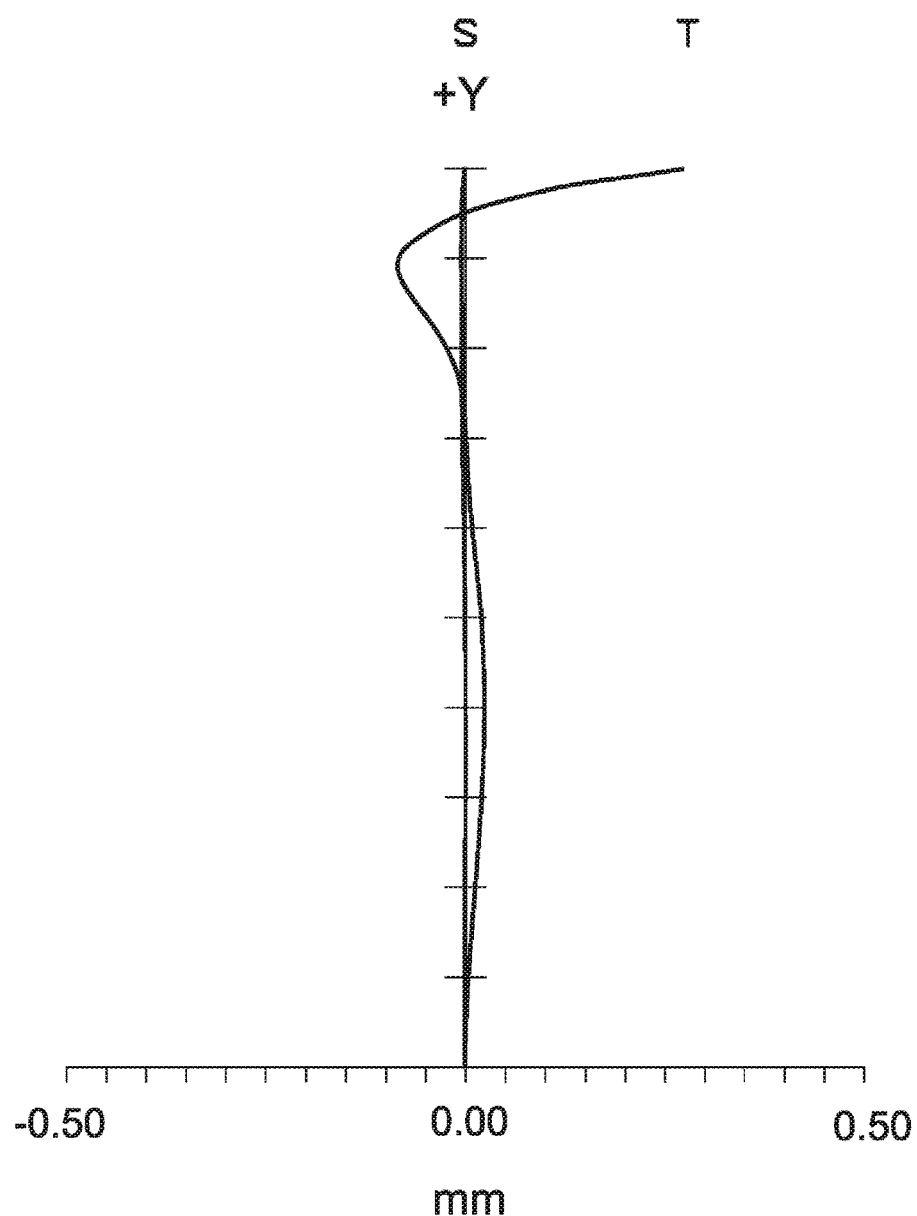
FIG. 12A depicts a field curvature diagram of the lens assembly in accordance with the sixth embodiment of the invention.
Figure 12B:
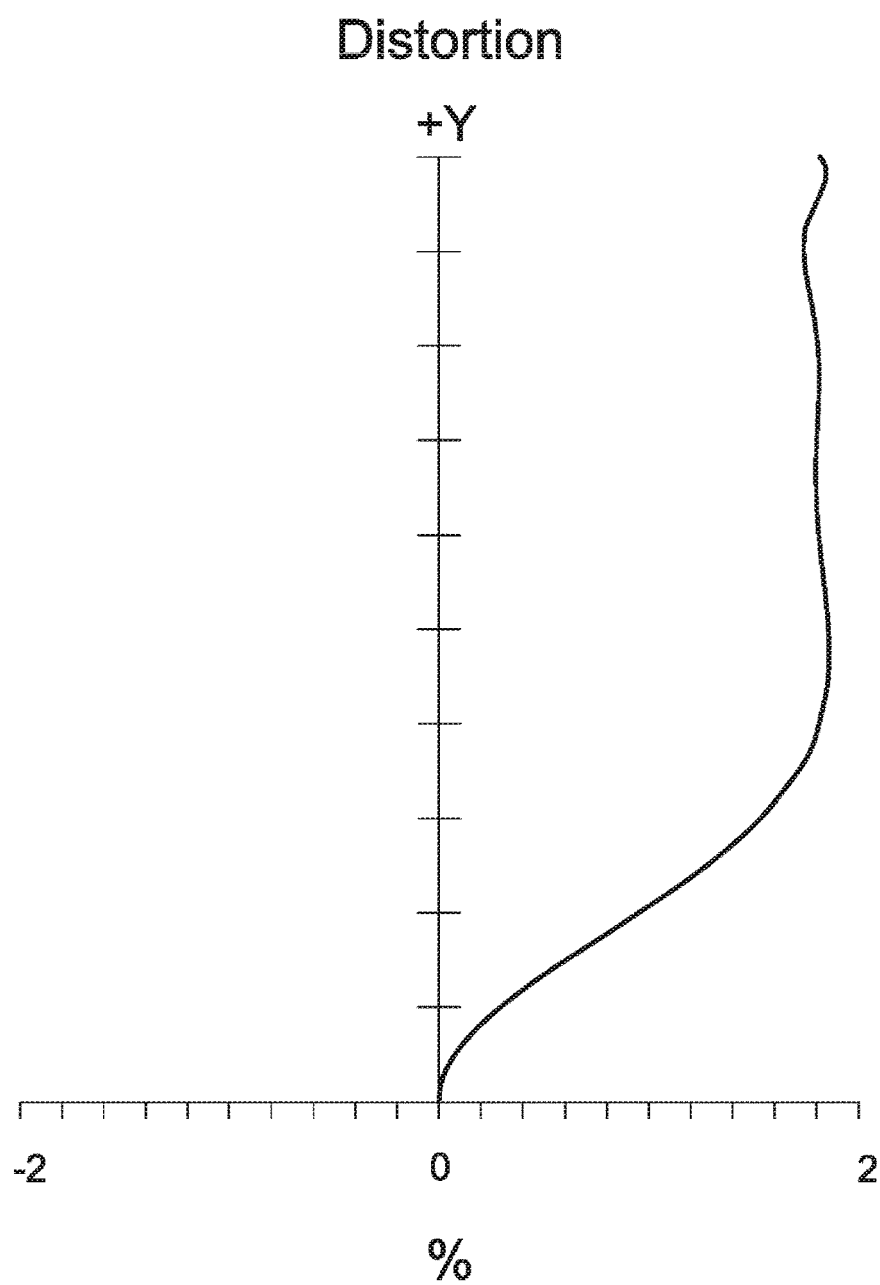
FIG. 12B is a distortion diagram of the lens assembly in accordance with the sixth embodiment of the invention.
Figure 12C:
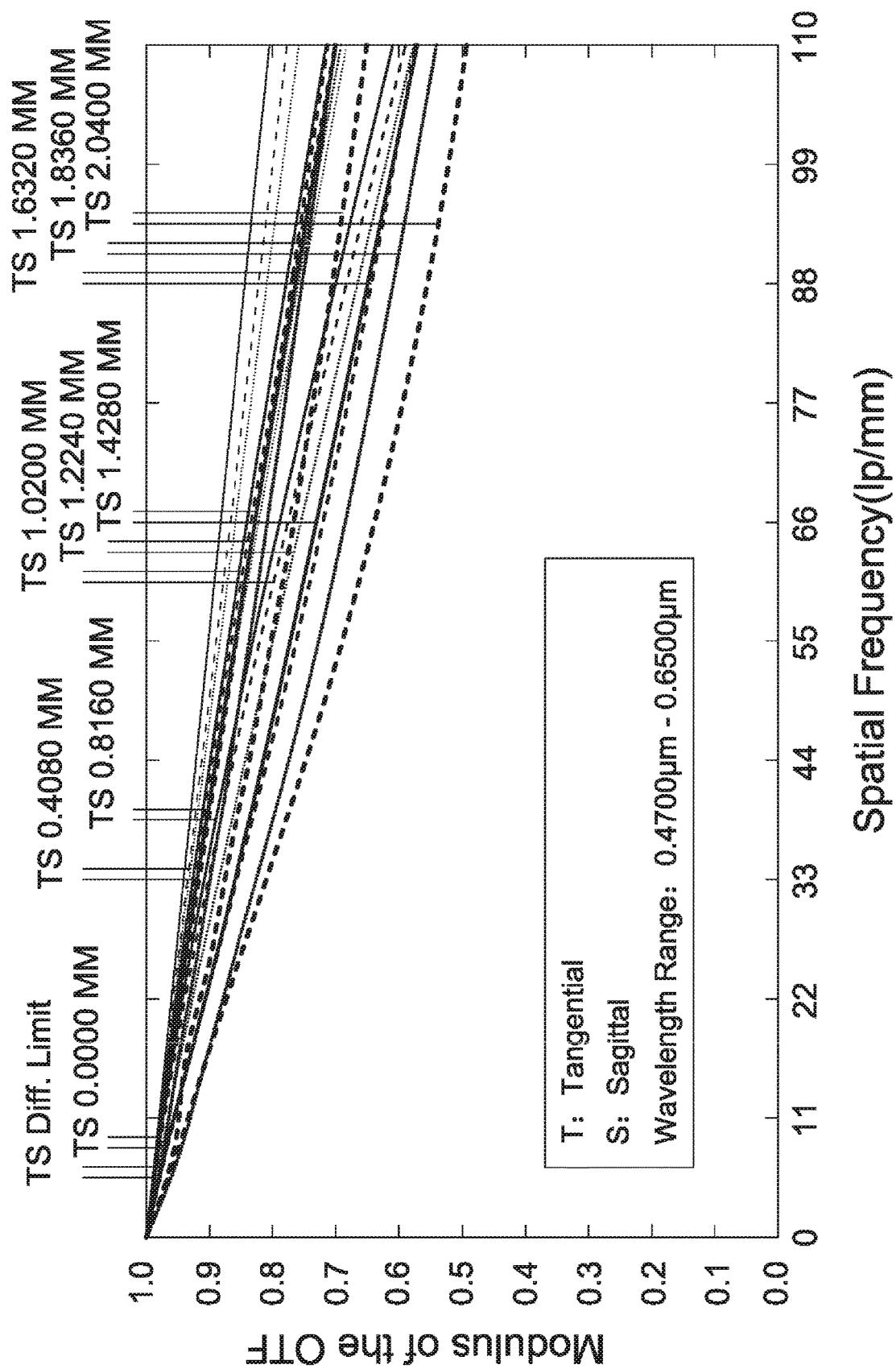
FIG. 12C is a modulation transfer function diagram of the lens assembly in accordance with the sixth embodiment of the invention.

By the above arrangements of the lenses, reflective element P6, and stop ST6, the lens assembly 6 of the sixth embodiment can meet the requirements of optical performance as seen in FIGS. 12A-12C.

It can be seen from FIG. 12A that the field curvature of tangential direction and sagittal direction in the lens assembly 6 of the sixth embodiment ranges from −0.1 mm to 0.3 mm. It can be seen from FIG. 12B that the distortion in the lens assembly 6 of the sixth embodiment ranges from 0% to 2%. It can be seen from FIG. 12C that the modulation transfer function of tangential direction and sagittal direction in the lens assembly 6 of the sixth embodiment ranges from 0.49 to 1.0.

It is obvious that the field curvature and the distortion of the lens assembly 6 of the sixth embodiment can be corrected effectively, and the resolution of the lens assembly 6 of the sixth embodiment can meet the requirement. Therefore, the lens assembly 6 of the sixth embodiment is capable of good optical performance.

Figure 13:
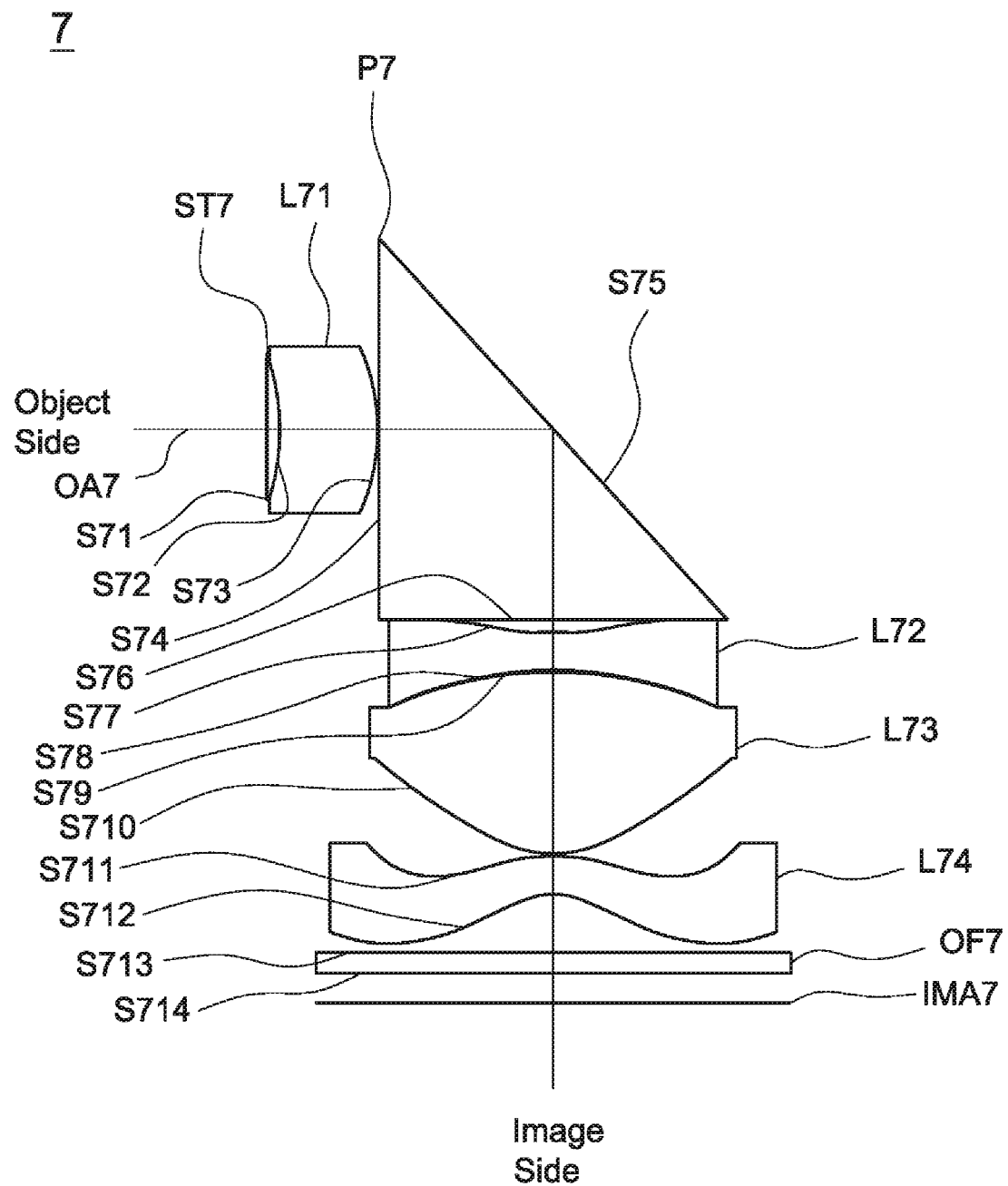
FIG. 13 is a lens layout and optical path diagram of a lens assembly in accordance with a seventh embodiment of the invention.

Referring to FIG. 13, the lens assembly 7 includes a stop ST7, a first lens L71, a reflective element P7, a second lens L72, a third lens L73, a fourth lens L74, and an optical filter OF7, all of which are arranged in order from an object side to an image side along an optical axis OA7. The reflective element P7 includes an incident surface S74, a reflective surface S75, and an exit surface S76, wherein the incident surface S74 and the exit surface S76 are perpendicular to each other. The reflective surface S75 may contains a metal layer, such as a metal thin film layer of aluminum (Al), silver (Ag), etc., and the reflective surface S75 can be made to include metal layer in any suitable ways, s as coating a metal thin film layer. In this way, the color shift phenomenon and the occurrence of halo during imaging can be avoided, so that the color shift can be effectively improved, the point light source can be effectively concentrated, and has a good image quality for the lens assembly 7. In operation, the light from the object side is reflected by the reflective surface S75 to change the propagation direction and imaged on an image plane IMA7. The image plane IMA7 and the exit surface S76 are parallel to each other. In the seventh embodiment, the reflective element takes a prism as an example but is not limited thereto. For example, the reflective element may be a reflective mirror which only includes a reflective surface.

According to the foregoing, wherein: the first lens L71 is a meniscus lens, wherein the object side surface S72 is a concave surface; the second lens L72 is a biconcave lens, wherein the image side surface S78 is a concave surface; the third lens L73 is a biconvex lens, wherein the image side surface S710 is a convex surface and both of the object side surface S709 and image side surface S710 are aspheric surfaces; the fourth lens L74 is a meniscus lens with negative refractive power and made of glass or plastic material, wherein the object side surface S711 is a convex surface and the object side surface S711 is an aspheric surface; and both of the object side surface S713 and image side surface S714 of the optical filter OF7 are plane surfaces.

With the above design of the lenses, reflective element P7, stop ST7, and at least any one of the conditions (1)-(20) satisfied, the lens assembly 7 can have an effective shortened total lens length, an effective increased resolution, an effective corrected aberration, and is capable of an effective corrected chromatic aberration.

Table 19 shows the optical specification of the lens assembly 7 in FIG. 13.

TABLE 19

Effective Focal Length = 2.688 mm F-number = 2.48
Total Optical System Length = 6.990387 mm Field of View = 37.15 degrees

| Surface Number | Radius of Curvature (mm) | Thickness (mm) | Nd | Vd | Effective Focal Length (mm) | Remark |
|---|---|---|---|---|---|---|
| S71 | ∞ | 0.11165 | | | | Stop ST7 |
| S72 | −2.17683 | 0.861726 | 1.85605 | 40.2822 | 2.936058 | The First Lens L71 |
| S73 | −1.3829 | 0.011817 | | | | |
| S74 | ∞ | 1.511484 | 2.003303 | 28.31998 | | Reflective Element P7 Incident Surface |
| S75 | ∞ | 1.511484 | 2.003303 | 28.31998 | | Reflective Element P7 Reflective Surface |
| S76 | ∞ | 0.1053 | | | | Reflective Element P7 Exit Surface |
| S77 | −3.3371 | 0.2971 | 1.651 | 19.24 | −2.580873 | The Second Lens L72 |
| S78 | 3.5698 | 0.0243 | | | | |
| S79 | 3.2047 | 1.4424 | 1.5352 | 56.11 | 1.537502 | The Third Lens L73 |
| S710 | −0.9372 | 0.0128 | | | | |
| S711 | 1.2686 | 0.307 | 1.671 | 19.23991 | −2.804457 | The Fourth Lens L74 |
| S712 | 0.6863 | 0.4689 | | | | |
| S713 | ∞ | 0.145 | 1.5 | 60 | | Optical Filter OF7 |
| S714 | ∞ | 0.179424 | | | | |

The definition of aspheric surface sag z of each aspheric lens in table 19 is the same as that of in Table 16, and is not described here again.

In the seventh embodiment, the conic constant k and the aspheric coefficients A, B, C, D, E, F, G, H, I of each aspheric lens are shown in Table 20.

TABLE 20

| Surface Number | k | A F | B G | C H | D I | E |
|---|---|---|---|---|---|---|
| S72 | 12.37051 | 0.048262563 −78.86702201 | 0.389555332 −873.1214579 | −1.145030981 3076.709194 | −3.704327987 −2494.305293 | 69.06398288 |
| S73 | 0.997786 | 0.04991879 −0.897002003 | 0.080225825 2.39169789 | −0.189381455 −0.957068478 | 0.391873143 −2.717302478 | −0.055996169 |
| S77 | 2.316024 | −0.0685 −0.0057684 | −0.0332 0.00085384 | 0.0216 0.0019887 | 0.0136 −0.00058658 | −0.0064636 |
| S78 | −0.65583 | 0.0424 −0.000059262 | −0.0359 −0.00091777 | −0.006035 −0.00026251 | 0.0073692 0.00017107 | 0.0029372 |
| S79 | −23.3047 | −0.0221 0.0056237 | 0.027 −0.00037447 | −0.0186 −0.001833 | −0.0087938 0.00048667 | 0.0030024 |
| S710 | −3.44257 | −0.0236 −0.00062128 | 0.0207 0.00048696 | −0.00061085 0.0002905 | −0.0038854 −0.00010395 | −0.0038854 |
| S711 | −8.14832 | 0.0877 0.00028164 | −0.00088187 0.00019802 | −0.0078454 0.000021087 | 0.00092888 −0.000020786 | −0.00090514 |
| S712 | −3.68024 | 0.0877 −0.000055828 | −0.00088187 −0.000010893 | −0.0078454 2.2467E−06 | 0.00092888 −1.005E−07 | 0.00038536 |

Table 21 shows the parameters and condition values for conditions (1)-(2), (5)-(6), (8), and (13)-(19) in accordance with the seventh embodiment of the invention. It can be seen from Table 21 that the lens assembly 7 of the seventh embodiment satisfies the conditions (1)-(2), (5)-(6), (8), and (13)-(19).

TABLE 21

| | | | | | |
|---|---|---|---|---|---|
| L | 2.385027 mm | ALOD | 9.74 mm | $f_{obj1}$ | 2.936058 mm |
| $f_{obj3}$ | 1.537502 mm | $f_{obj4}$ | −2.804457 mm | L1T | 0.861726 mm |
| L1SD | 0.67 mm | $R_{11}$ | −2.17683 mm | M1T | 1.52330112 mm |
| TTL/f | 2.955357 | TTL/ALOD | 0.815606 | $(TTL + f)/f_{obj1}$ | 3.621253 |
| $f_{obj3}/f_{obj4}$ | −0.54807 | L1T × L1SD | 0.577356 mm² | L1T × $R_{11}$ | −1.87583 mm² |
| $f_{obj1}$/L1T | 3.407116 mm | M1T/L1T | 1.76773 | TTL/L | 3.33078 |
| L/f | 0.887287 | | | | |

Figure 14A:
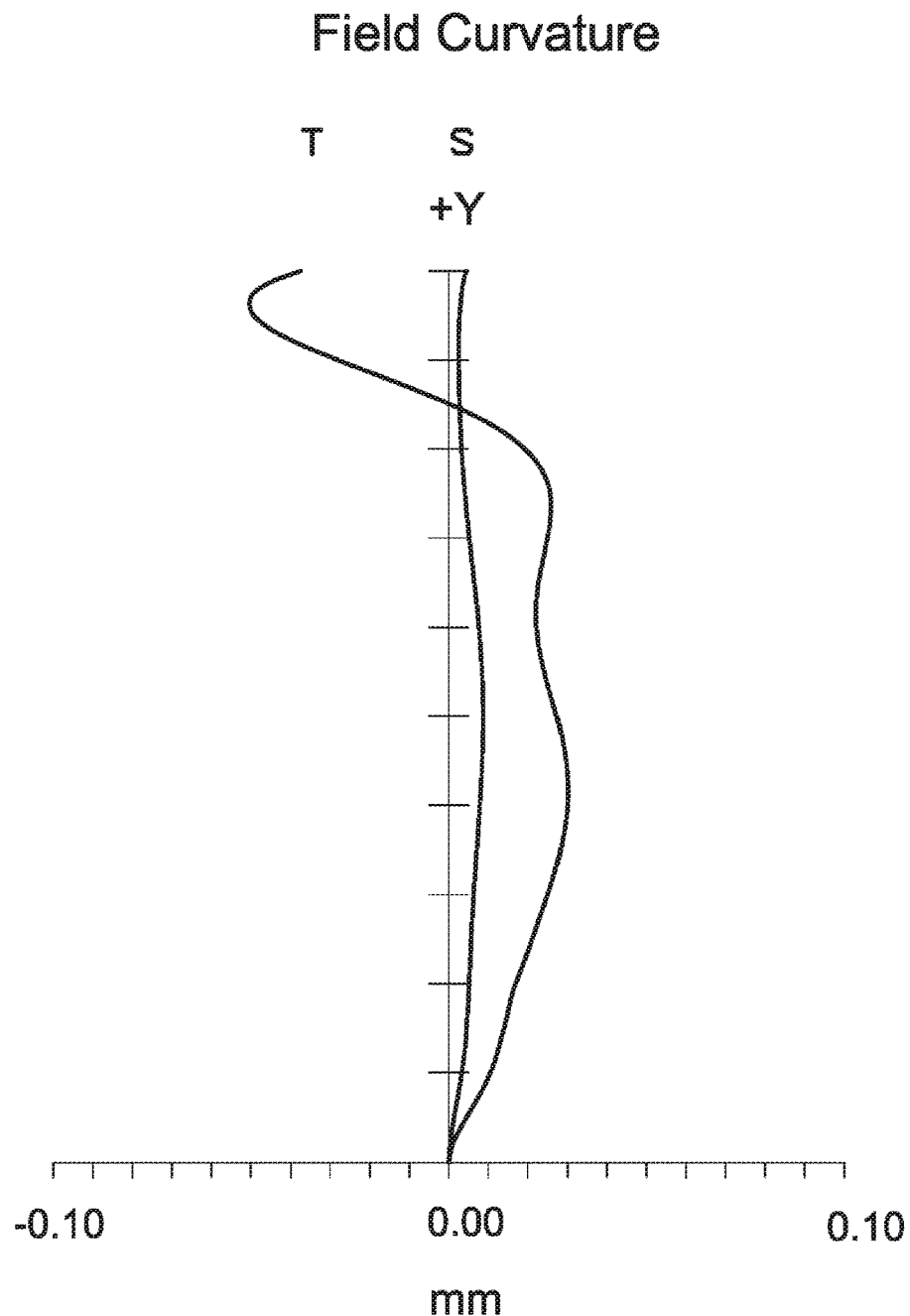
FIG. 14A depicts a field curvature diagram of the lens assembly in accordance with the seventh embodiment of the invention.
Figure 14B:
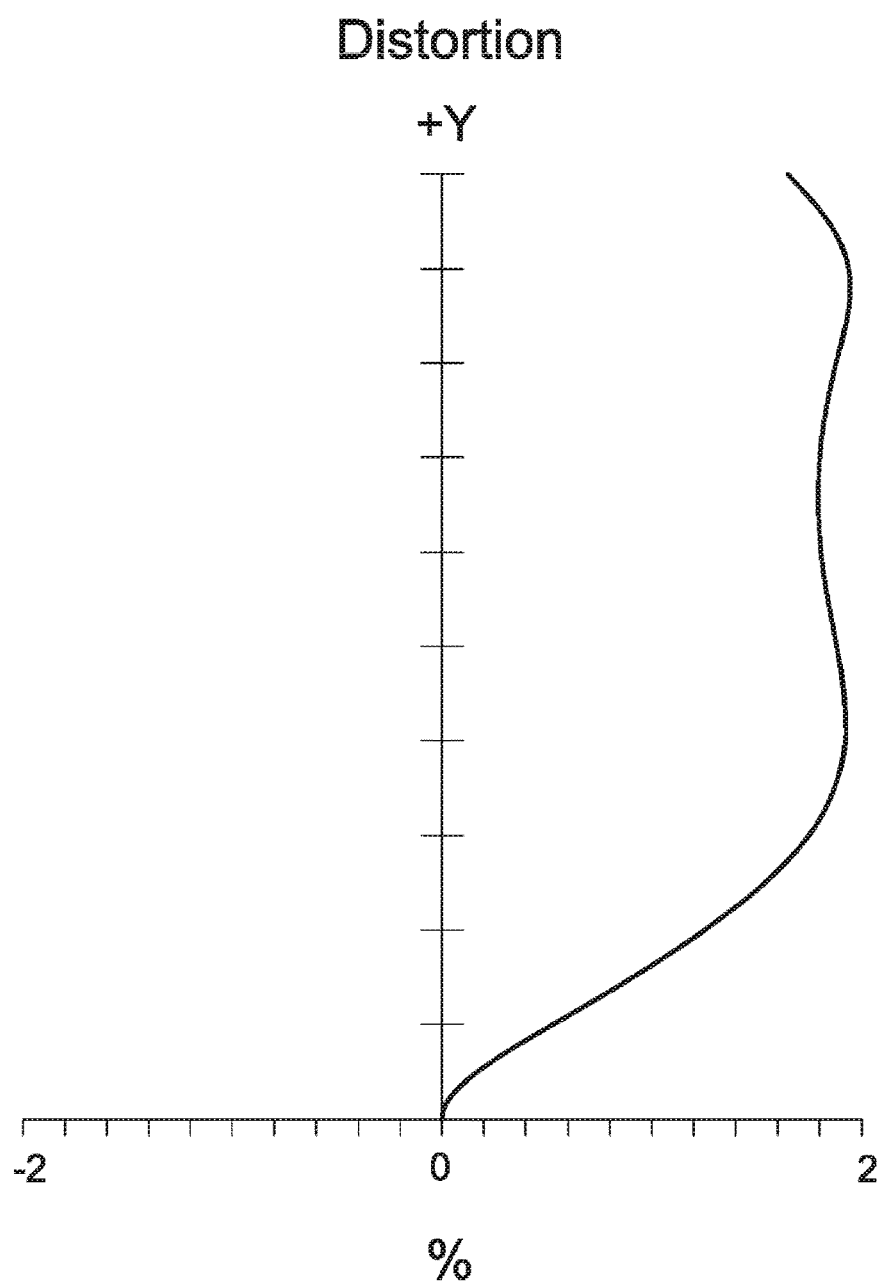
FIG. 14B is a distortion diagram of the lens assembly in accordance with the seventh embodiment of the invention.
Figure 14C:
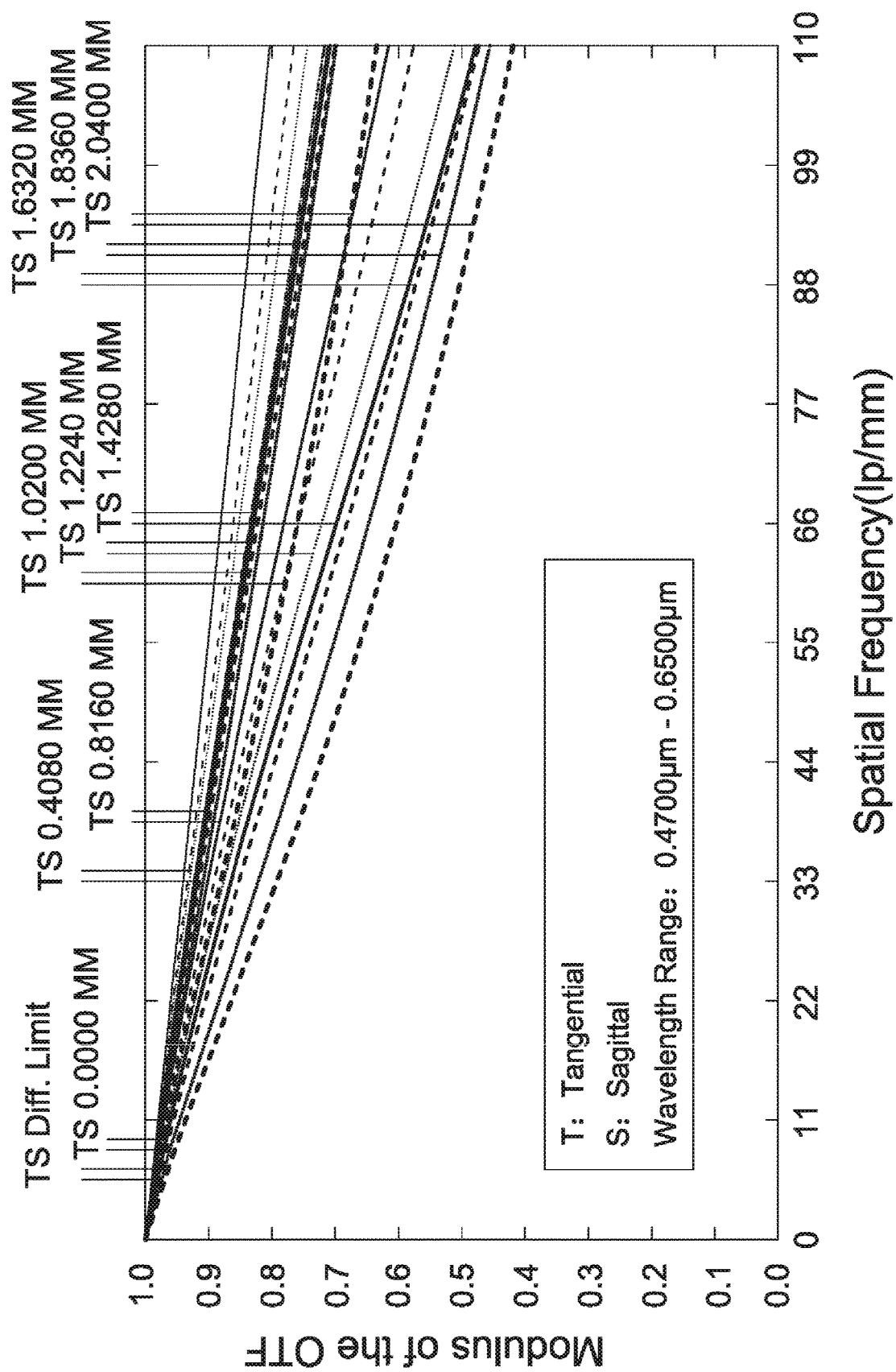
FIG. 14C is a modulation transfer function diagram of the lens assembly in accordance with the seventh embodiment of the invention.

By the above arrangements of the lenses, reflective element P7, and stop ST7, the lens assembly 7 of the seventh embodiment can meet the requirements of optical performance as seen in FIGS. 14A-14C.

It can be seen from FIG. 14A that the field curvature of tangential direction and sagittal direction in the lens assembly 7 of the seventh embodiment ranges from −0.05 mm to 0.03 mm. It can be seen from FIG. 14B that the distortion in the lens assembly 7 of the seventh embodiment ranges from 0% to 2%. It can be seen from FIG. 14C that the modulation transfer function of tangential direction and sagittal direction in the lens assembly 7 of the seventh embodiment ranges from 0.42 to 1.0.

It is obvious that the field curvature and the distortion of the lens assembly 7 of the seventh embodiment can be corrected effectively, and the resolution of the lens assembly 7 of the seventh embodiment can meet the requirement. Therefore, the lens assembly 7 of the seventh embodiment is capable of good optical performance.

Figure 15:
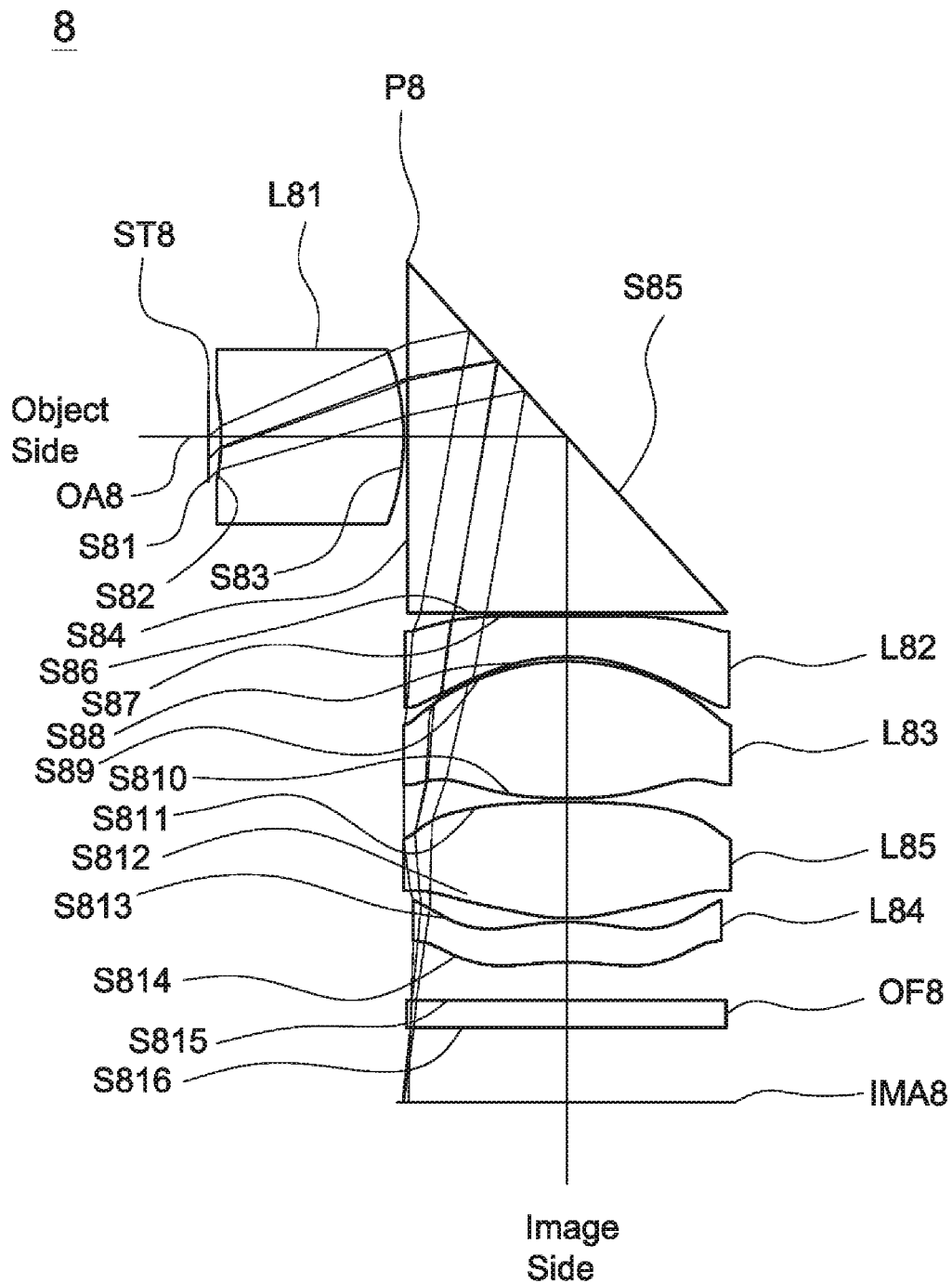
FIG. 15 is a lens layout and optical path diagram of a lens assembly in accordance with an eighth embodiment of the invention.

Referring to FIG. 15, the lens assembly 8 includes a stop ST8, a first lens L81, a reflective element P8, a second lens L82, a third lens L83, a fifth lens L85, a fourth lens L84, and an optical filter OF8, all of which are arranged in order from an object side to an image side along an optical axis OA8. The reflective element P8 includes an incident surface S84, a reflective surface S85, and an exit surface S86, wherein the incident surface S84 and the exit surface S86 are perpendicular to each other. The reflective surface S85 may contains a metal layer, such as a metal thin film layer of aluminum (Al), silver (Ag), etc., and the reflective surface S85 can be made to include metal layer in any suitable ways, such as coating a metal thin film layer. In this way, the color shift phenomenon and the occurrence of halo during imaging can be avoided, so that the color shift can be effectively improved, the point light source can be effectively concentrated, and has a good image quality for the lens assembly 8. In operation, the light from the object side is reflected by the reflective surface S85 to change the propagation direction and imaged on an image plane IMA8. The image plane IMA8 and the exit surface S86 are parallel to each other. In the eighth embodiment, the reflective element takes a prism as an example but is not limited thereto. For example, the reflective element may be a reflective mirror which only includes a reflective surface.

According to the foregoing, wherein: the first lens L81 is a meniscus lens, wherein the object side surface S82 is a concave surface; the second lens L82 is a biconcave lens, wherein the image side surface S88 is a concave surface; the third lens L83 is a biconvex lens, wherein the image side surface S810 is a convex surface and both of the object side surface S809 and image side surface S810 are aspheric surfaces; the fifth lens L85 is a biconvex lens with positive refractive power and made of glass or plastic material, wherein the object side surface S811 is a convex surface, the image side surface S812 is a convex surface, and both of the object side surface S811 and image side surface S812 are aspheric surfaces; the fourth lens L84 is a meniscus lens with positive refractive power and made of glass or plastic material, wherein the object side surface S813 is a convex surface and the object side surface S813 is an aspheric surface; and both of the object side surface S815 and image side surface S816 of the optical filter OF8 are plane surfaces.

With the above design of the lenses, reflective element P8, stop ST8, and at least any one of the conditions (1)-(20) satisfied, the lens assembly 8 can have an effective shortened total lens length, an effective increased resolution, an effective corrected aberration, and is capable of an effective corrected chromatic aberration.

Table 22 shows the optical specification of the lens assembly 8 in FIG. 15.

TABLE 22

Effective Focal Length = 1.118 mm F-number = 2.48
Total Optical System Length = 5.572 mm Field of View = 36.473 degrees

| Surface Number | Radius of Curvature (mm) | Thickness (mm) | Nd | Vd | Effective Focal Length (mm) | Remark |
|---|---|---|---|---|---|---|
| S81 | ∞ | 0.076 | | | | Stop ST8 |
| S82 | −1.061 | 1.056 | 1.86 | 40.3 | 2.398 | The First Lens L81 |
| S83 | −1.025 | 0.020 | | | | |
| S84 | ∞ | 0.925 | 2.00 | 28.3 | | Reflective Element P8 Incident Surface |
| S85 | ∞ | 0.925 | 2.00 | 28.3 | | Reflective Element P8 Reflective Surface |
| S86 | ∞ | 0.020 | | | | Reflective Element P8 Exit Surface |

TABLE 22-continued

Effective Focal Length = 1.118 mm F-number = 2.48
Total Optical System Length = 5.572 mm Field of View = 36.473 degrees

| Surface Number | Radius of Curvature (mm) | Thickness (mm) | Nd | Vd | Effective Focal Length (mm) | Remark |
|---|---|---|---|---|---|---|
| S87 | −6.728 | 0.210 | 1.67 | 19.2 | −1.573 | The Second Lens L82 |
| S88 | 1.283 | 0.024 | | | | |
| S89 | 1.426 | 0.718 | 1.54 | 56.1 | 1.898 | The Third Lens L83 |
| S810 | −2.941 | 0.020 | | | | |
| S811 | 6.313 | 0.610 | 1.54 | 56.1 | 1.815 | The Fifth Lens L85 |
| S812 | −1.114 | 0.020 | | | | |
| S813 | 1.501 | 0.210 | 1.67 | 19.200 | 11.588 | The Fourth Lens L84 |
| S814 | 1.751 | 0.200 | | | | |
| S815 | ∞ | 0.145 | 1.5 | 64.2 | | Optical Filter OF8 |
| S816 | ∞ | 0.393 | | | | |

The definition of aspheric surface sag z of each aspheric lens in table 22 is the same as that of in Table 16, and is not described here again.

In the eighth embodiment, the conic constant k and the aspheric coefficients A, B, C, D, E, F, G, H, I of each aspheric lens are shown in Table 23.

TABLE 23

| Surface Number | k | A | B | C | D | E |
|---|---|---|---|---|---|---|
| | | F | G | H | I | |
| S82 | 1.14E+01 | 2.00E+00 | −6.32E+01 | 3.22E+03 | −5.78E+04 | −9.53E+04 |
| | | 1.30E+07 | 1.19E+08 | −6.22E+09 | 4.68E+10 | |
| S83 | 1.12E+00 | 1.18E−01 | 6.40E+00 | −5.46E+01 | 5.95E+01 | 1.85E+03 |
| | | −3.45E+03 | −7.98E+04 | 4.66E+05 | −7.63E+05 | |
| S87 | −6.04E+01 | −3.87E−01 | 2.54E−01 | 3.38E−01 | −2.42E−01 | −8.21E−01 |
| | | −1.34E−01 | 1.55E+00 | −1.36E−01 | −6.10E−01 | |
| S88 | 2.89E−01 | 2.86E−02 | 1.67E−01 | 2.98E−01 | −1 18E−01 | −7.13E−01 |
| | | −4.53E−02 | 7.81E−01 | 5.01E−01 | −6.02E−01 | |
| S89 | −8.71E−01 | −1.15E−02 | 9.54E−02 | −2.77E−01 | −1.75E−02 | 6.66E−02 |
| | | 2.65E−02 | 1.43E+00 | −2.90E+00 | 1.65E+00 | |
| S810 | 0.00E+00 | 3.77E−01 | −5.98E−01 | −1.89E−01 | 2.21E−01 | −3.70E−01 |
| | | −1.54E−02 | −7.37E−01 | 3.66E+00 | −2.47E+00 | |
| S811 | 4.00E+01 | −1.03E−01 | 1.36E−01 | −1.72E−01 | −2.12E−01 | −1.01E−01 |
| | | 6.34E−01 | 1.30E−01 | −1.21E+00 | 8.56E−01 | |
| S812 | −5.24E+00 | −4.70E−01 | 3.61E−01 | 6.64E−01 | 9.76E−02 | −1.17E+00 |
| | | −2.16E+00 | 2.99E+00 | 5.85E−01 | −9.94E−01 | |
| S813 | 9.42E−01 | 8.21E−01 | 4.03E−01 | −3.52E−01 | −4.16E−01 | −5.14E−01 |
| | | −1.60E−01 | 1.02E+00 | 1.24E+00 | −1.49E+00 | |
| S814 | 2.50E−00 | 1.33E+00 | −6.98E−01 | −4.07E−01 | 2.21E−01 | 3.53E−01 |
| | | 8.33E−01 | −1.36E+00 | −1.43E+00 | 2.04E+00 | |

Table 24 shows the parameters and condition values for conditions (1)-(2), (5)-(6), (8), and (13)-(20) in accordance with the eighth embodiment of the invention. It can be seen from Table 24 that the lens assembly 8 of the eighth embodiment satisfies the conditions (1)-(2), (5)-(6), (8), and (13)-(20).

TABLE 24

| L | 2.001 mm | ALOD | 7.832 mm | $f_{obj1}$ | 2.398 mm |
|---|---|---|---|---|---|
| $f_{obj3}$ | 1.898 mm | $f_{obj4}$ | 1.815 mm | L1T | 1.056 mm |
| L1SD | 0.457 mm | $R_{11}$ | −1.061 mm | M1T | 0.945 mm |
| $OD_2$ | 1.79 mm | $OD_3$ | 1.89 mm | $OD_4$ | 1.89 mm |
| $OD_5$ | 1.78 mm | | | | |

TABLE 24-continued

| TTL/f | 5.832737 | TTL/ALOD | 0.83261 | (TTL + f)/$f_{obj1}$ | 3.185571 |
|---|---|---|---|---|---|
| $f_{obj3}/f_{obj4}$ | 1.04573 | L1T × L1SD | 0.482592 mm² | L1T × $R_{11}$ | −1.12042 mm² |
| $f_{obj1}$/L1T | 2.270833 mm | M1T/L1T | 0.89489 | TTL/L | 3.258871 |
| L/f | 1.789803 | 8 × M1T − (OD$_2$ + OD$_3$ + OD$_4$ + OD$_5$) | 0.05 mm | | |

Figure 16A:
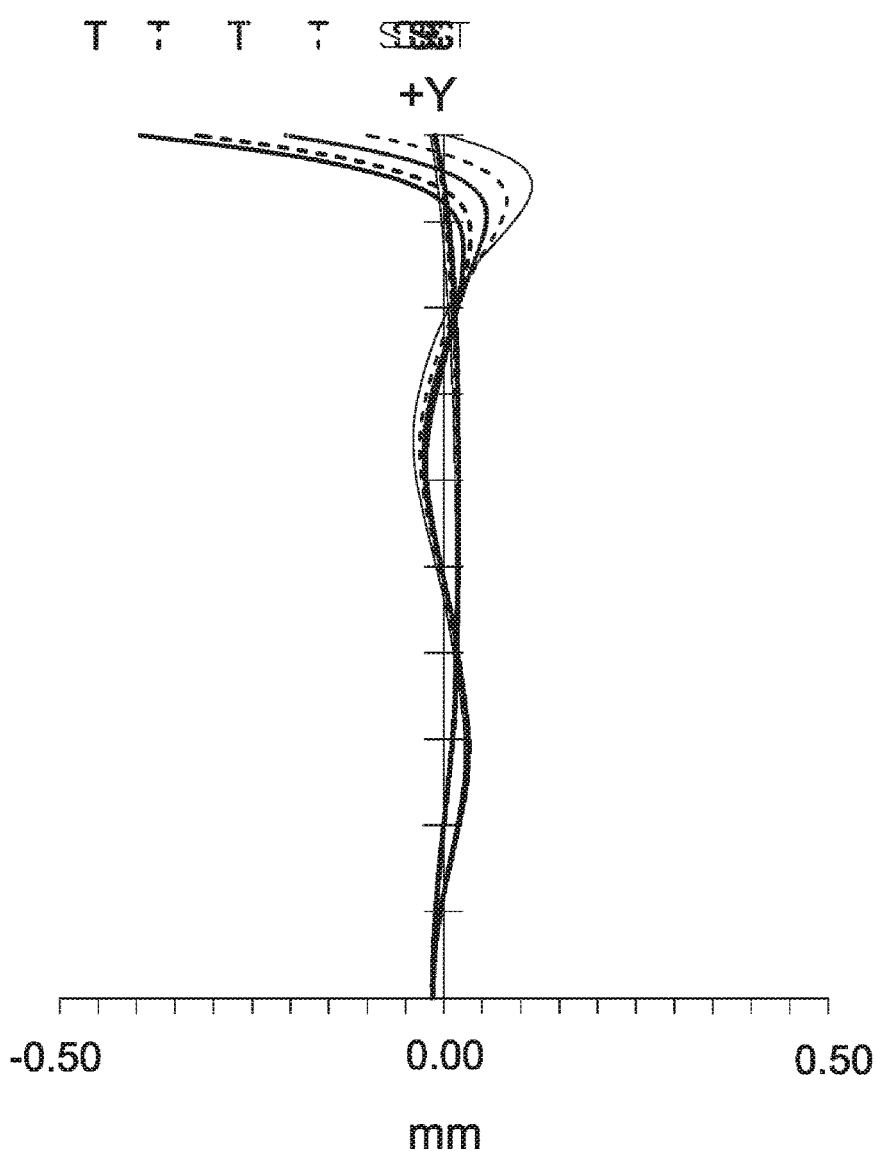
FIG. 16A depicts a field curvature diagram of the lens assembly in accordance with the eighth embodiment of the invention.
Figure 16B:
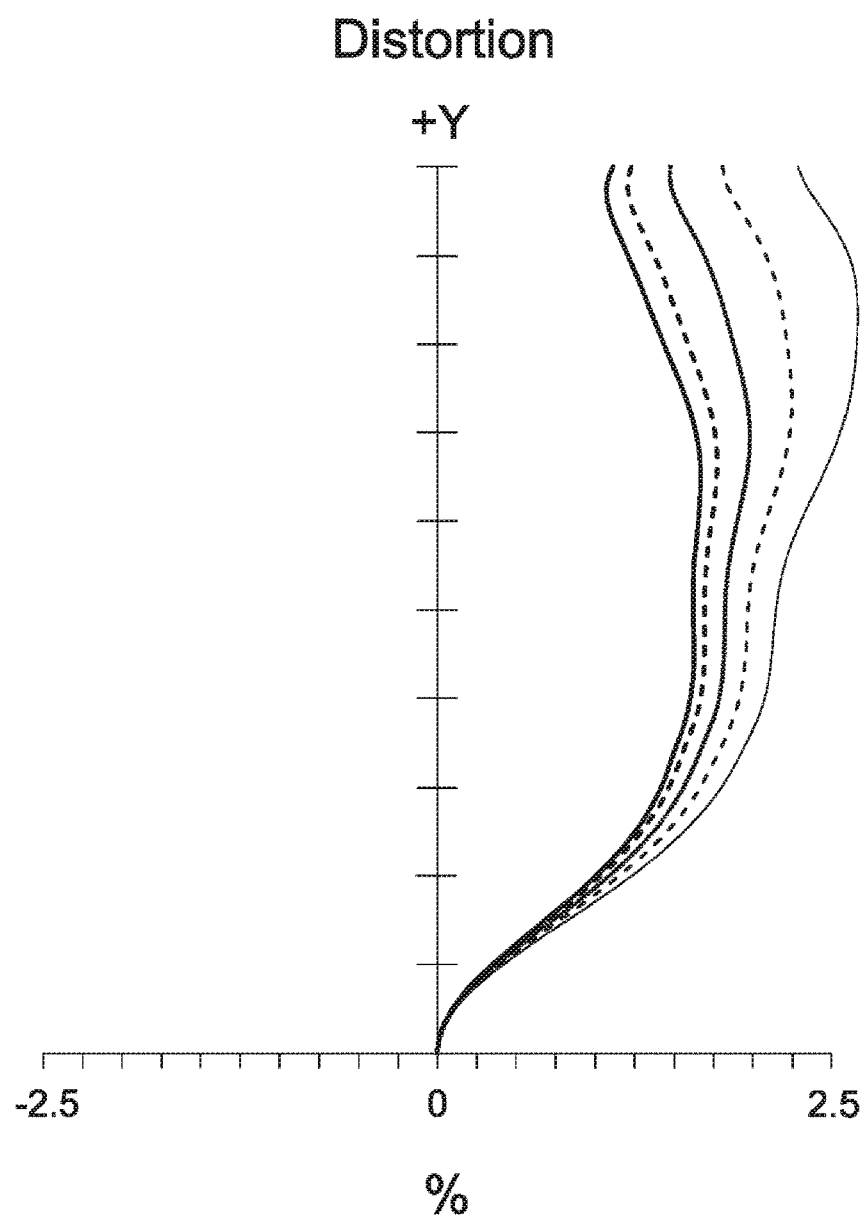
FIG. 16B is a distortion diagram of the lens assembly in accordance with the eighth embodiment of the invention.
Figure 16C:
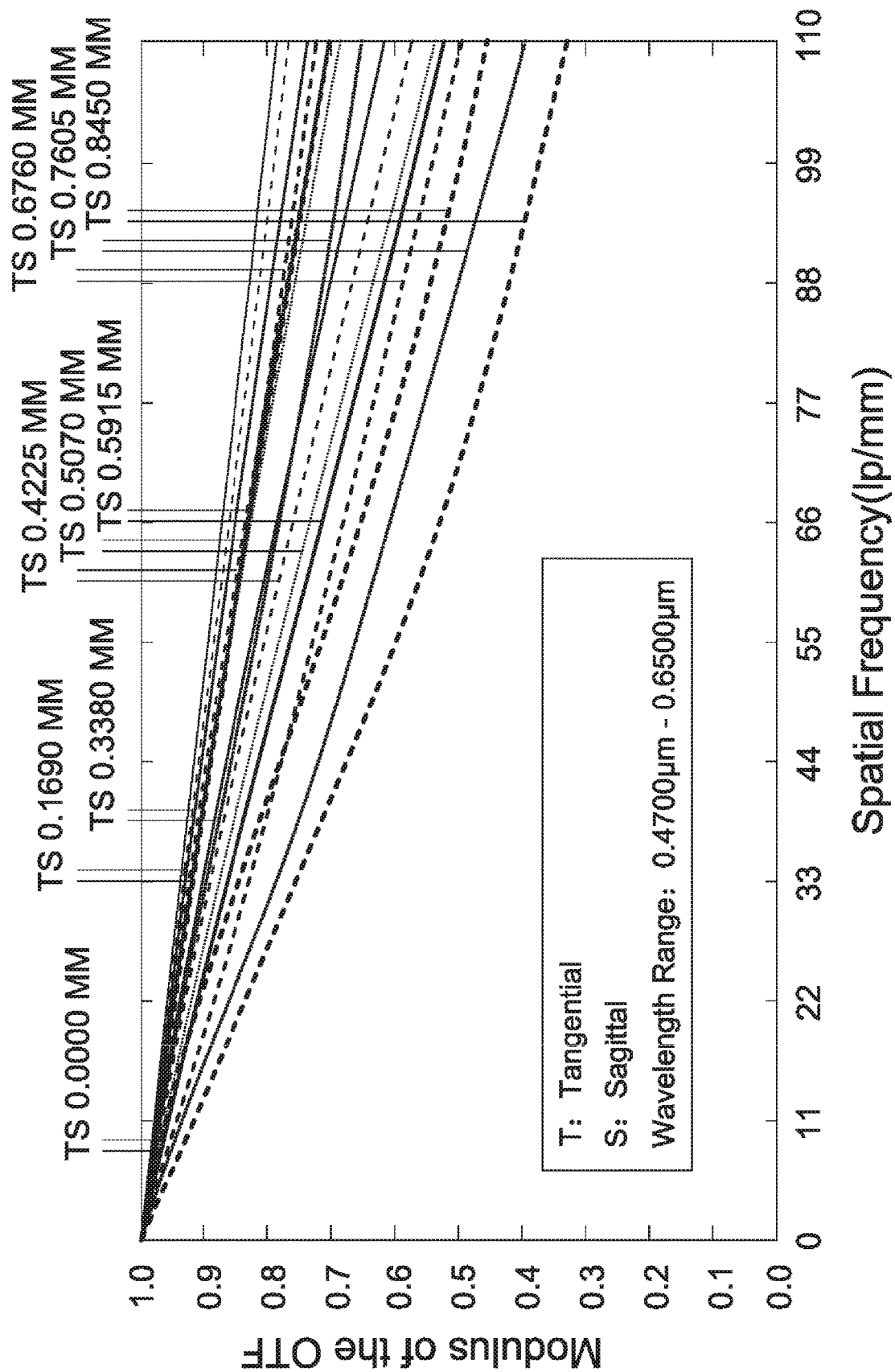
FIG. 16C is a modulation transfer function diagram of the lens assembly in accordance with the eighth embodiment of the invention.

By the above arrangements of the lenses, reflective element P8, and stop ST8, the lens assembly 8 of the eighth embodiment can meet the requirements of optical performance as seen in FIGS. 16A-16C.

It can be seen from FIG. 16A that the field curvature of tangential direction and sagittal direction in the lens assembly 8 of the eighth embodiment ranges from −0.4 mm to 0.15 mm. It can be seen from FIG. 16B that the distortion in the lens assembly 8 of the eighth embodiment ranges from 0% to 2.75%. It can be seen from FIG. 16C that the modulation transfer function of tangential direction and sagittal direction in the lens assembly 8 of the eighth embodiment ranges from 0.33 to 1.0.

It is obvious that the field curvature and the distortion of the lens assembly 8 of the eighth embodiment can be corrected effectively, and the resolution of the lens assembly 8 of the eighth embodiment can meet the requirement. Therefore, the lens assembly 8 of the eighth embodiment is capable of good optical performance.

Figure 17:
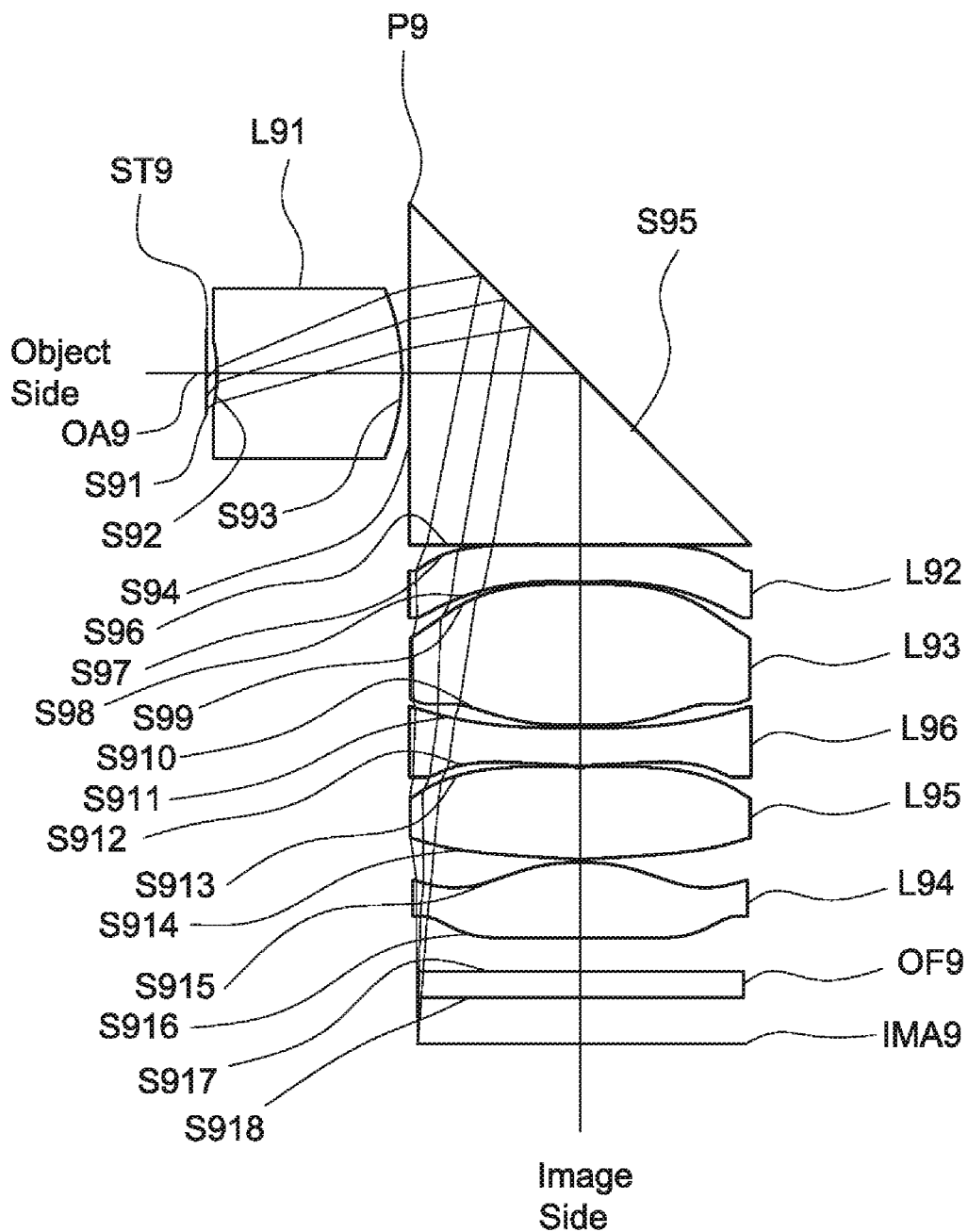
FIG. 17 is a lens layout and optical path diagram of a lens assembly in accordance with a ninth embodiment of the invention.

Referring to FIG. 17, the lens assembly 9 includes a stop ST9, a first lens L91, a reflective element P9, a second lens L92, a third lens L93, a sixth lens L96, a fifth lens L95, a fourth lens L94, and an optical filter OF9, all of which are arranged in order from an object side to an image side along an optical axis OA9. The reflective element P9 includes an incident surface S94, a reflective surface S95, and an exit surface S96, wherein the incident surface S94 and the exit surface S96 are perpendicular to each other. The reflective surface S95 may contains a metal layer, such as a metal thin film layer of aluminum (Al), silver (Ag), etc., and the reflective surface S95 can be made to include metal layer in any suitable ways, such as coating a metal thin film layer. In this way, the color shift phenomenon and the occurrence of halo during imaging can be avoided, so that the color shift can be effectively improved, the point light source can be effectively concentrated, and has a good image quality for the lens assembly 9. In operation, the light from the object side is reflected by the reflective surface S95 to change the propagation direction and imaged on an image plane IMA9. The image plane IMA9 and the exit surface S96 are parallel to each other. In the ninth embodiment, the reflective element takes a prism as an example but is not limited thereto. For example, the reflective element may be a reflective mirror which only includes a reflective surface.

According to the foregoing, wherein: the first lens L91 is a meniscus lens, wherein the object side surface S92 is a concave surface; the second lens L92 is a biconcave lens, wherein the image side surface S98 is a concave surface; the third lens L93 is a biconvex lens, wherein the image side surface S910 is a convex surface and both of the object side surface S909 and image side surface S910 are aspheric surfaces; the sixth lens L96 is a meniscus lens with negative refractive power and made of glass or plastic material, wherein the object side surface S911 is a concave surface, the image side surface S912 is a convex surface, and both of the object side surface S911 and image side surface S912 are aspheric surfaces; the fifth lens L95 is a meniscus lens with positive refractive power and made of glass or plastic material, wherein the object side surface S913 is a concave surface, the image side surface S914 is a convex surface, and both of the object side surface S913 and image side surface S914 are aspheric surfaces; the fourth lens L94 is a meniscus lens with positive refractive power and made of glass or plastic material, wherein the object side surface S915 is a convex surface and the object side surface S915 is an aspheric surface; and both of the object side surface S917 and image side surface S918 of the optical filter OF9 are plane surfaces.

With the above design of the lenses, reflective element P9, stop ST9, and at least any one of the conditions (1)-(20) satisfied, the lens assembly 9 can have an effective shortened total lens length, an effective increased resolution, an effective corrected aberration, and is capable of an effective corrected chromatic aberration.

Table 25 shows the optical specification of the lens assembly 9 in FIG. 17.

TABLE 25

Effective Focal Length = 1.082 mm F-number = 2.48
Total Optical System Length = 6.099 mm Field of View = 37.489 degrees

| Surface Number | Radius of Curvature (mm) | Thickness (mm) | Nd | Vd | Effective Focal Length (mm) | Remark |
|---|---|---|---|---|---|---|
| S91 | ∞ | 0.077 | | | | Stop ST9 |
| S92 | −0.934 | 1.078 | 1.9 | 40.3 | 2.74 | The First Lens L91 |
| S93 | −1.028 | 0.030 | | | | |
| S94 | ∞ | 0.996 | 2.0 | 28.3 | | Reflective Element P9 Incident Surface |
| S95 | ∞ | 0.996 | 2.0 | 28.3 | | Reflective Element P9 Reflective Surface |
| S96 | ∞ | 0.020 | | | | Reflective Element P9 Exit Surface |
| S97 | −39.255 | 0.205 | 1.7 | 19.2 | −3.469 | The Second Lens L92 |
| S98 | 2.506 | 0.020 | | | | |
| S99 | 3.433 | 0.818 | 1.5 | 56.1 | 3.15 | The Third Lens L93 |
| S910 | −3.058 | 0.020 | | | | |
| S911 | −7.805 | 0.212 | 1.7 | 19.2 | −204.946 | The Sixth Lens L96 |
| S912 | −8.360 | 0.020 | | | | |
| S913 | −11.948 | 0.526 | 1.5 | 56.1 | 5.855 | The Fifth Lens L95 |
| S914 | −2.527 | 0.020 | | | | |
| S915 | 0.928 | 0.441 | 1.5 | 56.1 | 2.091 | The Fourth Lens L94 |
| S916 | 4.453 | 0.200 | | | | |
| S917 | ∞ | 0.145 | 1.5 | 64.2 | | Optical Filter OF9 |
| S918 | ∞ | 0.275 | | | | |

The definition of aspheric surface sag z of each aspheric lens in table 25 is the same as that of in Table 16, and is not described here again.

In the ninth embodiment, the conic constant k and the aspheric coefficients A, B, C, D, E, F, G, H, I of each aspheric lens are shown in Table 26.

TABLE 26

| Surface Number | k | A<br>F | B<br>G | C<br>H | D<br>I | E |
|---|---|---|---|---|---|---|
| S92 | 7.05E+00 | 2.00E+00<br>1.30E+07 | −6.32E+01<br>1.19E+08 | 3.22E+03<br>−6.22E+09 | −5.78E+04<br>4.68E+10 | −9.53E+04 |
| S93 | 1.30E+00 | 1.18E−01<br>−3.45E+03 | 6.40E+00<br>−7.98E+04 | −5.46E+01<br>4.66E+05 | 5.95E+01<br>−7.63E+05 | 1.85E+03 |
| S97 | −1.95E+04 | −3.87E−01<br>−1.34E−01 | 2.54E−01<br>1.55E+00 | 3.38E−01<br>−1.36E−01 | −2.42E−01<br>−6.10E−01 | −8.21E−01 |
| S98 | 4.61E+00 | 2.86E−02<br>−4.53E−02 | 1.67E−01<br>7.81E−01 | 2.98E−01<br>5.01E−01 | −1.18E−01<br>−6.02E−01 | −7.13E−01 |
| S99 | −3.37E+01 | −1.15E−02<br>2.65E−02 | 9.54E−02<br>1.43E+00 | −2.77E−01<br>−2.90E+00 | −1.75E−02<br>1.65E+00 | 6.66E−02 |
| S910 | −3.16E−01 | 3.77E−01<br>−1.54E−02 | −5.98E−01<br>−7.37E−01 | −1.89E−01<br>3.66E+00 | 2.21E−01<br>−2.47E+00 | −3.70E−01 |
| S911 | 0.00E+00 | −1.03E−01<br>6.34E−01 | 1.36E−01<br>1.30E+00 | −1.72E−01<br>−1.21E+00 | −2.12E−01<br>8.56E−01 | −1.01E−01 |
| S912 | 0.00E+00 | −4.70E−01<br>−2.16E+00 | 3.61E−01<br>2.99E+00 | 6.64E−01<br>5.85E−01 | 9.76E−02<br>−9.94E−01 | −1.17E+00 |
| S913 | 0.00E+00 | −1.03E−01<br>6.34E−01 | 1.36E−01<br>1.30E+00 | −1.72E−01<br>−1.21E+00 | −2.12E−01<br>8.56E−01 | −1.01E−01 |
| S914 | 1.69E+00 | −4.70E−01<br>−2.16E+00 | 3.61E−01<br>2.99E+00 | 6.64E−01<br>5.85E−01 | 9.76E−02<br>−9.94E−01 | −1.17E+00 |
| S915 | −1.50E+00 | 8.21E−01<br>−1.60E−01 | 4.03E−01<br>1.02E+00 | −3.52E−01<br>1.24E+00 | −4.16E−01<br>−1.49E+00 | −5.14E−01 |
| S916 | 0.00E+00 | 1.33E+00<br>8.33E−01 | −6.98E−01<br>−1.36E+00 | −4.07E−01<br>−1.43E+00 | 2.21E−01<br>2.04E+00 | 3.53E−01 |

Table 27 shows the parameters and condition values for conditions (1)-(2), (5)-(6), (8), and (13)-(20) in accordance with the ninth embodiment of the invention. It can be seen from Table 27 that the lens assembly 9 of the ninth embodiment satisfies the conditions (1)-(2), (5)-(6), (8), and (13)-(20).

TABLE 27

| L | 2.104 mm | ALOD | 10.363 mm | $f_{obj1}$ | 2.74 mm |
|---|---|---|---|---|---|
| $f_{obj3}$ | 3.15 mm | $f_{obj4}$ | −204.949 mm | L1T | 1.078 mm |
| L1SD | 0.48585 mm | $R_{11}$ | −0.934 mm | M1T | 1.026 mm |
| $OD_2$ | 1.99 mm | $OD_3$ | 2 mm | $OD_4$ | 1.99 mm |
| $OD_5$ | 2 mm | | | | |
| TTL/f | 6.513863 | TTL/ALOD | 0.680112 | $(TTL + f)/f_{obj1}$ | 2.967153 |
| $f_{obj3}/f_{obj4}$ | −0.01537 | L1T × L1SD | 0.523746 mm² | L1T × $R_{11}$ | −1.00685 mm² |
| $f_{obj1}$/L1T | 2.541744 mm | M1T/L1T | 0.95176 | TTL/L | 3.34981 |
| L/f | 1.944547 | 8 × M1T − ($OD_2$ + $OD_3$ + $OD_4$ + $OD_5$) | −0.012 mm | | |

Figure 18A:
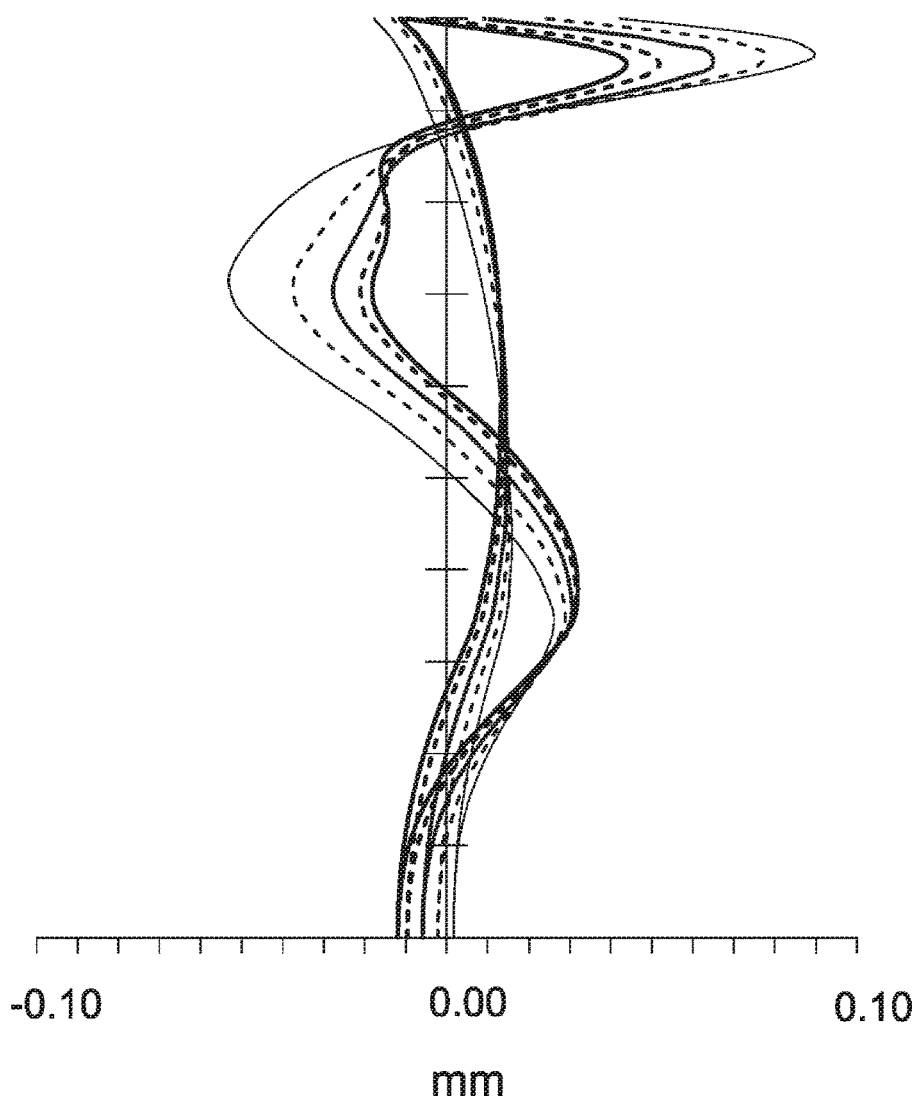
FIG. 18A depicts a field curvature diagram of the lens assembly in accordance with the ninth embodiment of the invention.
Figure 18B:
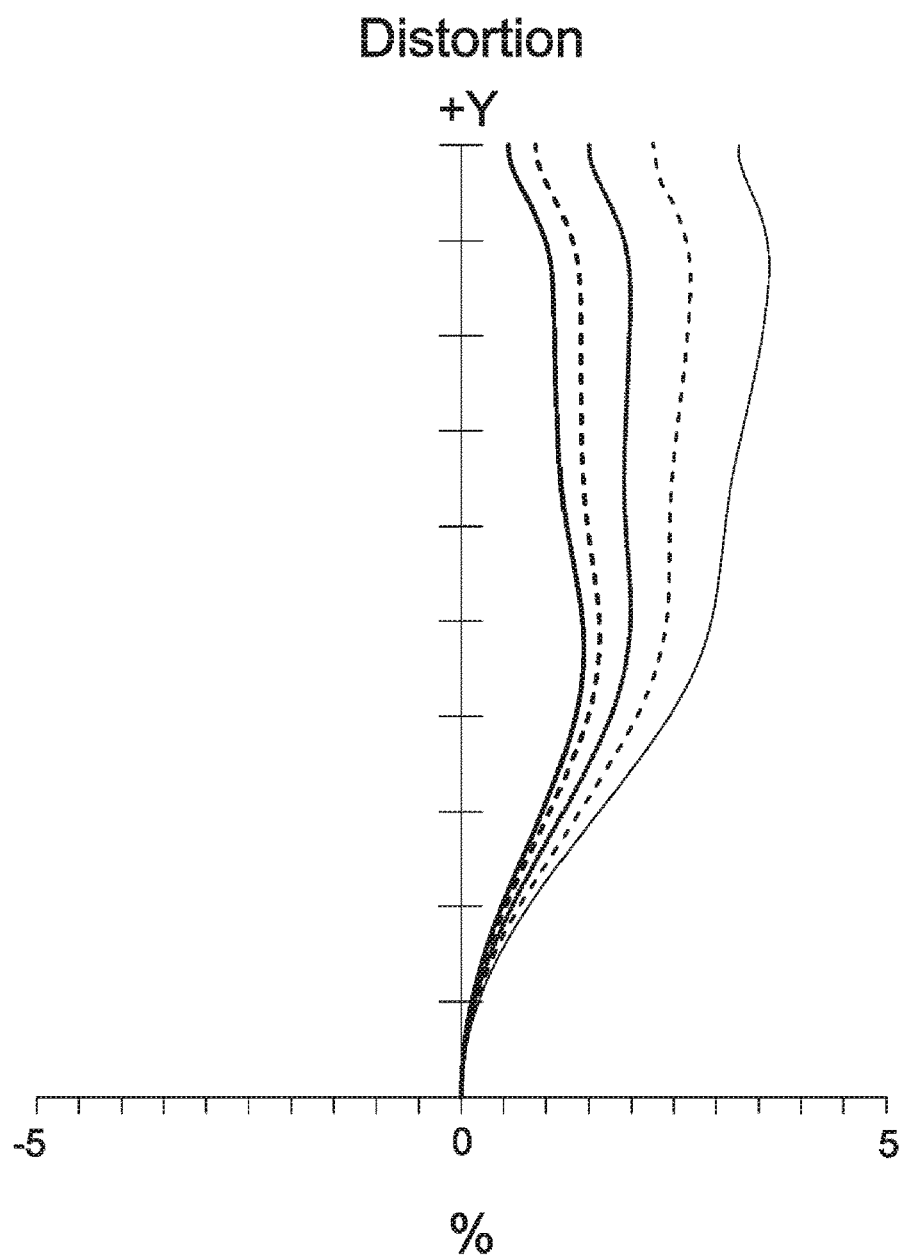
FIG. 18B is a distortion diagram of the lens assembly in accordance with the ninth embodiment of the invention.
Figure 18C:
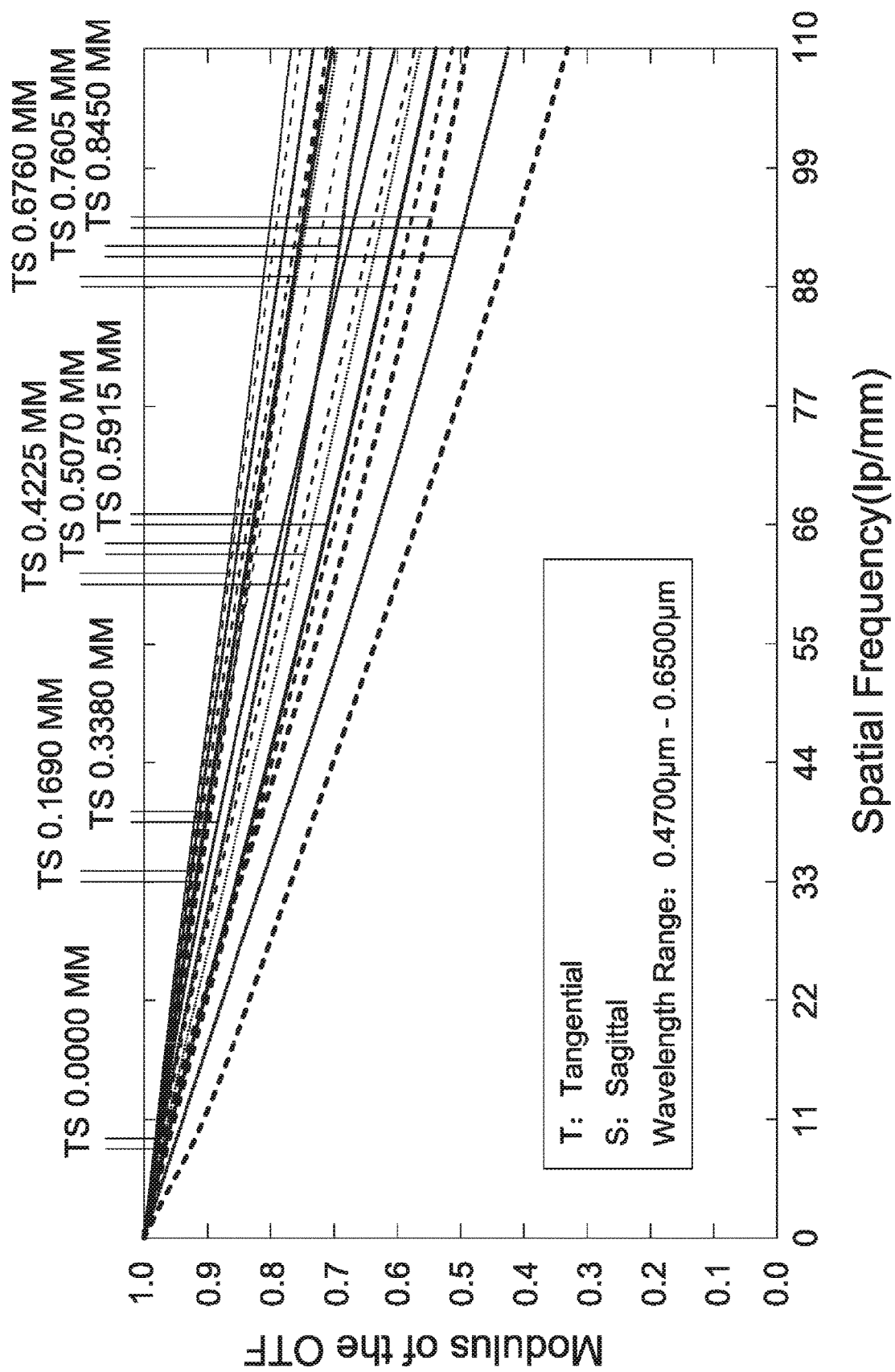
FIG. 18C is a modulation transfer function diagram of the lens assembly in accordance with the ninth embodiment of the invention.

By the above arrangements of the lenses, reflective element P9, and stop ST9, the lens assembly 9 of the ninth embodiment can meet the requirements of optical performance as seen in FIGS. 18A-18C.

It can be seen from FIG. 18A that the field curvature of tangential direction and sagittal direction in the lens assembly 9 of the ninth embodiment ranges from −0.06 mm to 0.09 mm. It can be seen from FIG. 18B that the distortion in the lens assembly 9 of the ninth embodiment ranges from 0% to 4%. It can be seen from FIG. 18C that the modulation transfer function of tangential direction and sagittal direction in the lens assembly 9 of the ninth embodiment ranges from 0.33 to 1.0.

It is obvious that the field curvature and the distortion of the lens assembly 9 of the ninth embodiment can be corrected effectively, and the resolution of the lens assembly 9 of the ninth embodiment can meet the requirement. Therefore, the lens assembly 9 of the ninth embodiment is capable of good optical performance.

Figure 19:
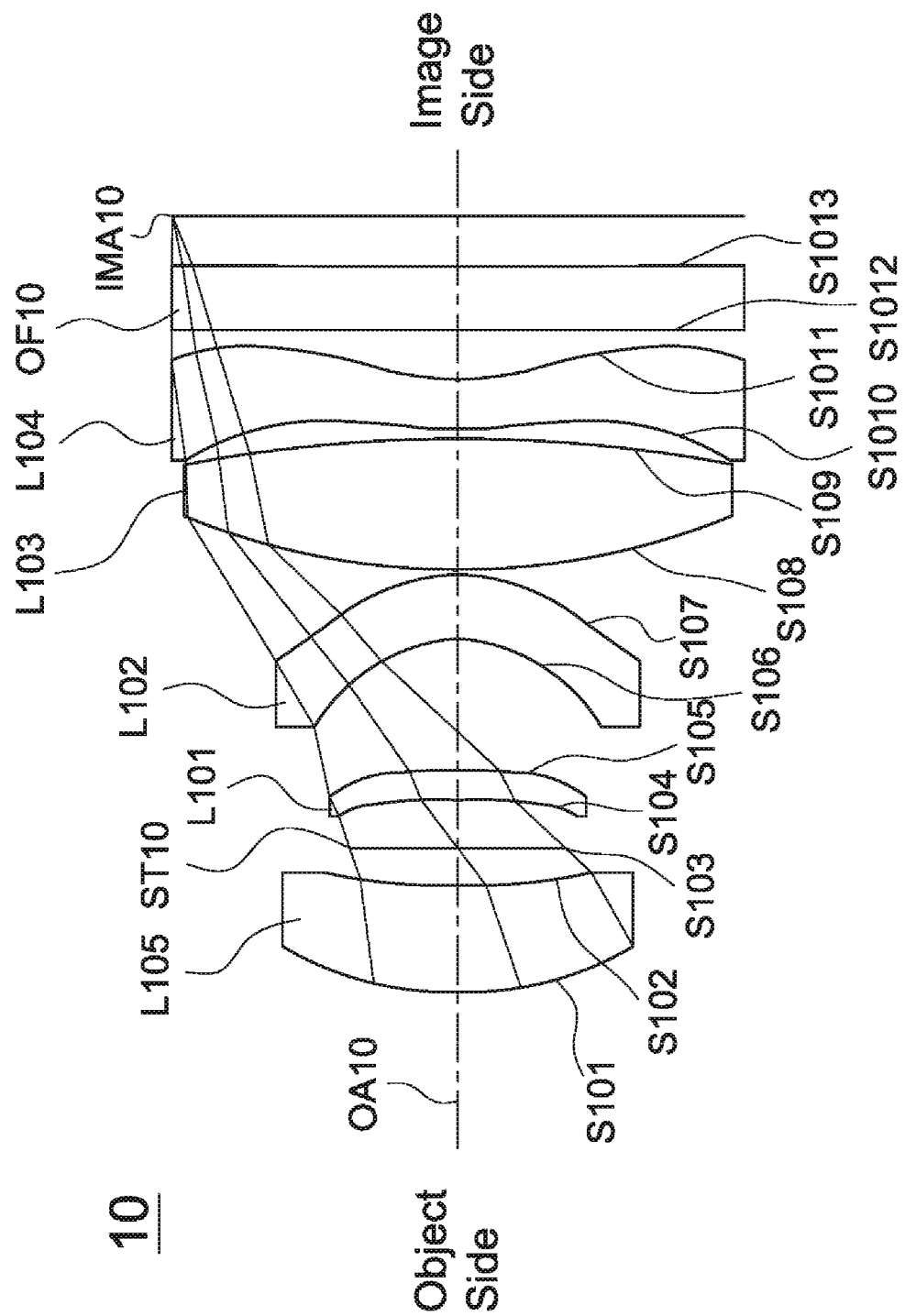
FIG. 19 is a lens layout and optical path diagram of a lens assembly in accordance with a tenth embodiment of the invention.

Referring to FIG. 19, the lens assembly 10 includes a fifth lens L105, a stop ST10, a first lens L101, a second lens L102, a third lens L103, a fourth lens L104, and an optical filter OF10, all of which are arranged in order from an object side to an image side along an optical axis OA10. In operation, the light from the object side is imaged on an image plane IMA10.

According to the foregoing, wherein: the fifth lens L105 is a meniscus lens with positive refractive power and made of glass or plastic material, wherein the object side surface S101 is a convex surface, the image side surface S102 is a concave surface, and both of the object side surface S101 and image side surface S102 are spherical surfaces; the first lens L101 is a meniscus lens, wherein the object side surface S104 is a concave surface and the image side surface S105 is a convex surface; the second lens L102 is a meniscus lens, wherein the object side surface S106 is a concave surface and the image side surface S107 is a convex surface; the third lens L103 is a biconvex lens, wherein the image side surface S109 is a convex surface and both of the object side surface S108 and image side surface S109 are spherical surfaces; the fourth lens L104 is a meniscus lens with negative refractive power and made of glass or plastic material, wherein the object side surface S1010 is a convex surface, the image side surface S1011 is a concave surface, and the object side surface S1010 is an aspheric surface; and both of the object side surface S1012 and image side surface S1013 of the optical filter OF10 are plane surfaces.

With the above design of the lenses, stop ST10, and at least any one of the conditions (21)-(29) satisfied, the lens assembly 10 can have an effective shortened total lens length, an effective increased resolution, an effective resisted environmental temperature change, an effective corrected aberration, and is capable of an effective corrected chromatic aberration.

If the value $Nd_5$ of condition (24) is less than 1.9, the ability to control the optical effective diameter of the lens is decreased, so that the value of $Nd_5$ must at least greater than or equal to 1.9. The best range of $Nd_5$ is to satisfy the condition: $2.2 \geq Nd_5 \geq 1.9$. When the condition (28): $2.2 \geq Nd_5 \geq 1.9$ is satisfied, the lens assembly can be effectively miniaturized.

Table 28 shows the optical specification of the lens assembly 10 in FIG. 19.

TABLE 28

| Effective Focal Length = 5.80646 mm F-number = 2.0 Total Lens Length = 8.55 mm Field of View = 55.00 degrees ||||||
|---|---|---|---|---|---|
| Surface Number | Radius of Curvature (mm) | Thickness (mm) | Nd | Vd | Effective Focal Length (mm) | Remark |
| S101 | 3.95894 | 1.18417 | 1.945958 | 17.9439 | 7.133563 | The Fifth Lens L105 |
| S102 | 8.82867 | 0.40544 | | | | |
| S103 | ∞ | 0.53815 | | | | Stop ST10 |
| S104 | −9.44949 | 0.32834 | 1.54392 | 55.9512 | 38.817584 | The First Lens L101 |
| S105 | −6.57127 | 1.44769 | | | | |
| S106 | −1.41906 | 0.70612 | 1.66143 | 20.3729 | −35.070688 | The Second Lens L102 |
| S107 | −0.55294 | 0.04721 | | | | |
| S108 | 7.90347 | 1.44236 | 1.94596 | 17.9439 | 6.039579 | The Third Lens L103 |
| S109 | −16.02125 | 0.11366 | | | | |
| S1010 | 4.57526 | 0.53893 | 1.66143 | 20.3729 | −8.387423 | The Fourth Lens L104 |
| S1011 | 2.34787 | 0.55401 | | | | |
| S1012 | ∞ | 0.70043 | 1.51680 | 64.2124 | | Optical Filter OF10 |
| S1013 | ∞ | 0.54413 | | | | |

The definition of aspheric surface sag z of each aspheric lens in table 28 is the same as that of in Table 1, and is not described here again.

In the tenth embodiment, the conic constant k and the aspheric coefficients A, B, C, D, E, F, G of each aspheric lens are shown in Table 29.

TABLE 29

| Surface Number | k | A E | B F | C G | D |
|---|---|---|---|---|---|
| S104 | −201.36061 | −0.038636149 | 0.020413122 | −0.013355429 | 0.000050272 |
| | | −0.000758228 | 0.002640600 | −0.001183207 | |
| S105 | −1.53417 | −0.012580526 | −0.003289361 | −0.003195349 | −0.001134968 |
| | | 0.000197044 | 0.000656148 | −0.000357008 | |
| S106 | −0.47215 | 0.017040780 | 0.001459691 | −0.000672766 | 0.000419733 |
| | | 0.000364050 | −0.000321983 | 0.000066342 | |
| S107 | −1.10421 | 0.003023939 | −0.001248133 | 0.000661656 | 0.000008801 |
| | | −0.000011219 | −0.000000121 | 0.000000344 | |
| S1010 | −26.68405 | −0.017531115 | 0.000030348 | 0.000256838 | −0.000010924 |
| | | −0.000001929 | 0.000000084 | 0.000000005 | |
| S1011 | −6.45372 | −0.014760078 | 0.001344553 | −0.000149720 | 0.000019749 |
| | | −0.000000548 | −0.000000163 | 0.000000011 | |

Table 30 shows the parameters and condition values for conditions (21)-(29) in accordance with the tenth embodiment of the invention. It can be seen from Table 30 that the lens assembly 10 of the tenth embodiment satisfies the conditions (21)-(29).

TABLE 30

| D | 2.9 mm | L5T | 1.18417 mm | E | 0.808552 mm |
|---|---|---|---|---|---|
| TCE | 6 × 10$^{-6}$/° C. | L5T/E | 1.46 | | |

Figure 20A:
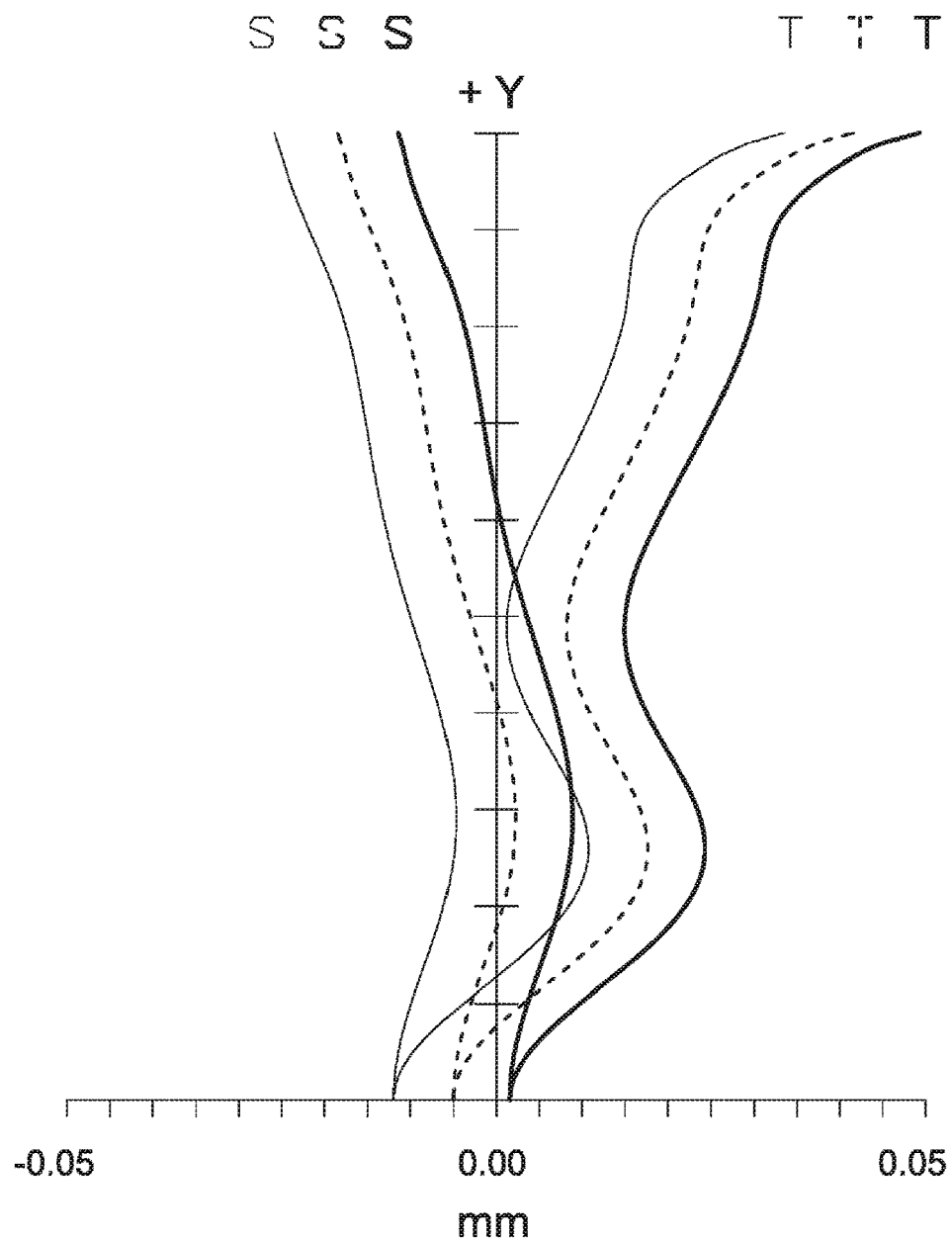
FIG. 20A depicts a field curvature diagram of the lens assembly in accordance with the tenth embodiment of the invention.
Figure 20B:
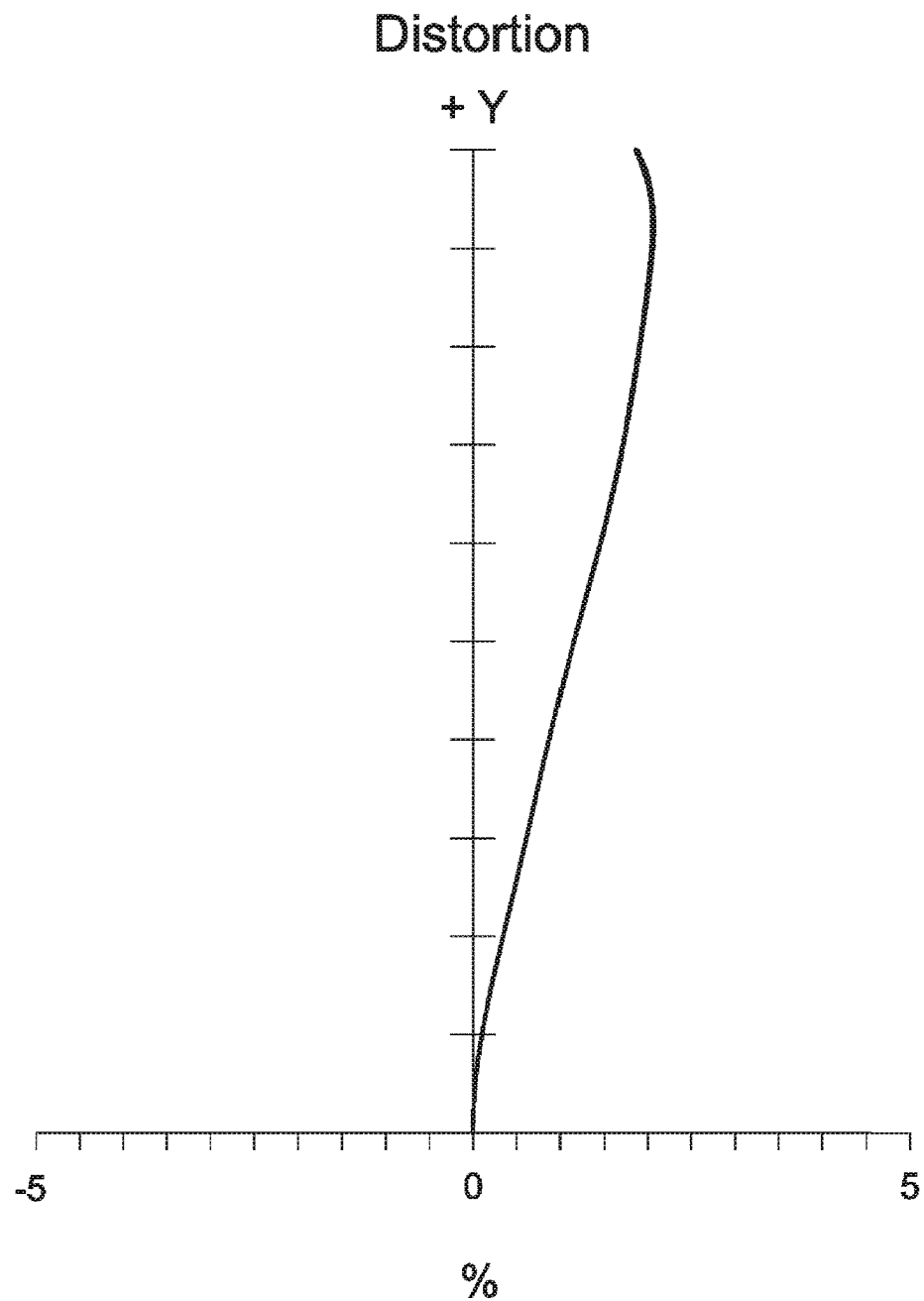
FIG. 20B is a distortion diagram of the lens assembly in accordance with the tenth embodiment of the invention.
Figure 20C:
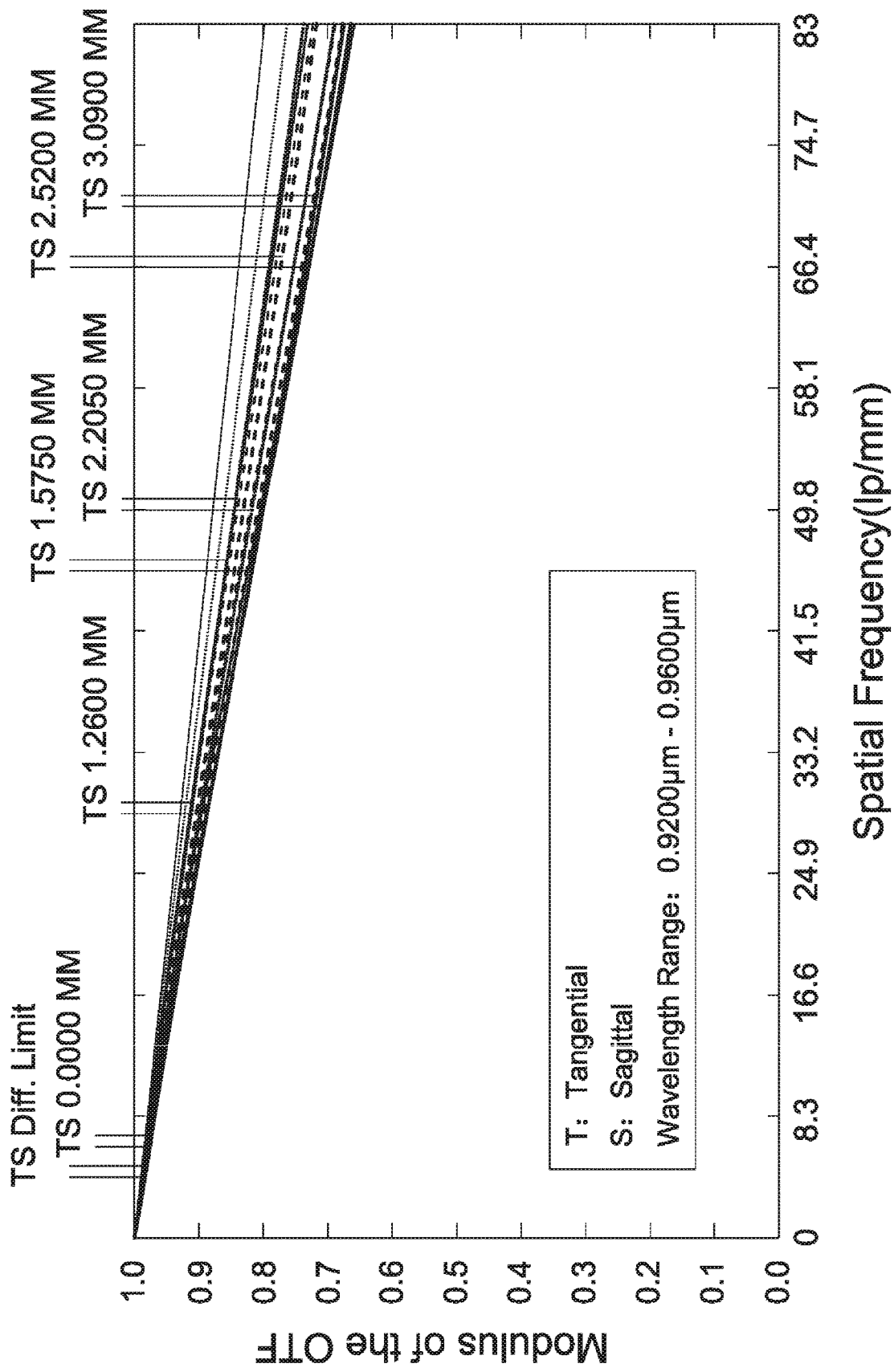
FIG. 20C is a modulation transfer function diagram of the lens assembly in accordance with the tenth embodiment of the invention.

By the above arrangements of the lenses and stop ST10, the lens assembly 10 of the tenth embodiment can meet the requirements of optical performance as seen in FIGS. 20A-20C.

It can be seen from FIG. 20A that the field curvature of tangential direction and sagittal direction in the lens assembly 10 of the tenth embodiment ranges from −0.03 mm to 0.05 mm. It can be seen from FIG. 20B that the distortion in the lens assembly 10 of the tenth embodiment ranges from 0% to 2.5%. It can be seen from FIG. 20C that the modulation transfer function of tangential direction and sagittal direction in the lens assembly 10 of the tenth embodiment ranges from 0.66 to 1.0.

It is obvious that the field curvature and the distortion of the lens assembly 10 of the tenth embodiment can be corrected effectively, and the resolution of the lens assembly 10 of the tenth embodiment can meet the requirement. Therefore, the lens assembly 10 of the tenth embodiment is capable of good optical performance.

Figure 21:
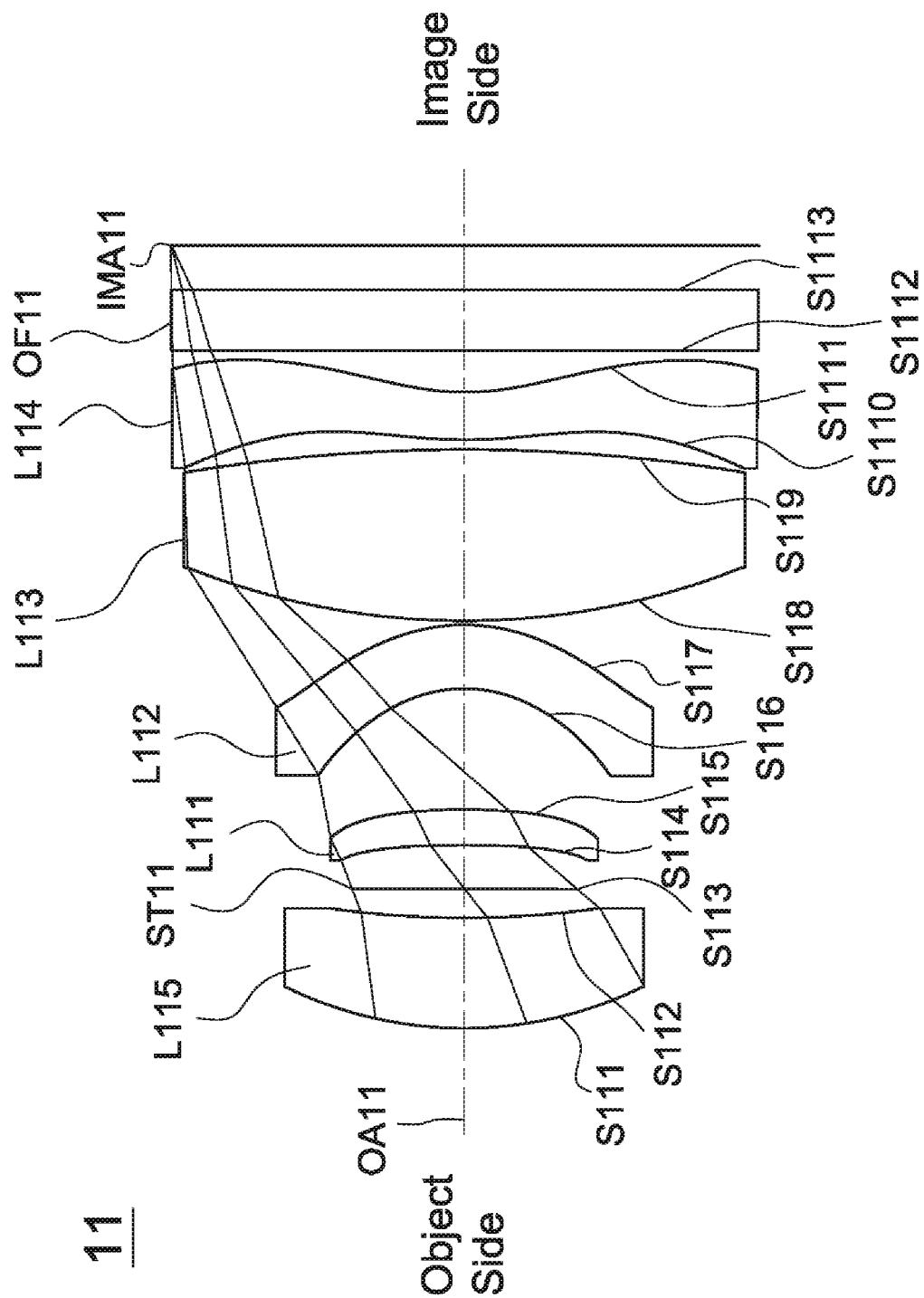
FIG. 21 is a lens layout and optical path diagram of a lens assembly in accordance with a eleventh embodiment of the invention.

Referring to FIG. 21, the lens assembly 11 includes a fifth lens L115, a stop ST11, a first lens L111, a second lens L112, a third lens L113, a fourth lens L114, and an optical filter OF11, all of which are arranged in order from an object side to an image side along an optical axis OA11. In operation, the light from the object side is imaged on an image plane IMA11.

According to the foregoing, wherein: the fifth lens L115 is a meniscus lens with positive refractive power and made of glass or plastic material, wherein the object side surface S111 is a convex surface, the image side surface S112 is a concave surface, and both of the object side surface S111 and image side surface S112 are spherical surfaces; the first lens L111 is a meniscus lens, wherein the object side surface S114 is a concave surface; the second lens L112 is a meniscus lens, wherein the image side surface S117 is a convex surface; the third lens L113 is a biconvex lens, wherein the image side surface S119 is a convex surface and both of the object side surface S118 and image side surface S119 are spherical surfaces; the fourth lens L114 is a meniscus lens with negative refractive power and made of glass or plastic material, wherein the object side surface S1110 is a convex surface and the object side surface S1110 is an aspheric surface; and both of the object side surface S1112 and image side surface S1113 of the optical filter OF11 are plane surfaces.

With the above design of the lenses, stop ST11, and at least any one of the conditions (21)-(29) satisfied, the lens assembly 11 can have an effective shortened total lens length, an effective increased resolution, an effective resisted environmental temperature change, an effective corrected aberration, and is capable of an effective corrected chromatic aberration.

If the value $Vd_5$ of condition (27) is greater than 20, the ability of chromatic aberration correction of the fifth lens L115 is reduced, so that the value of $Vd_5$ must at least less than 20. The best range of $Vd_5$ is to satisfy the condition: $17<Vd_5<20$. When the condition (29): $17<Vd_5<20$ is satisfied, the chromatic aberration of the lens assembly can be effectively decreased.

Table 31 shows the optical specification of the lens assembly 11 in FIG. 21.

TABLE 31

| Effective Focal Length = 5.81 mm F-number = 2.0 | | | | | |
|---|---|---|---|---|---|
| Total Lens Length = 9.04 mm Field of View = 55.038 degrees | | | | | |

| Surface Number | Radius of Curvature (mm) | Thickness (mm) | Nd | Vd | Effective Focal Length (mm) | Remark |
|---|---|---|---|---|---|---|
| S111 | 4.107088 | 1.266335 | 1.945958 | 17.9439 | 7.22427 | The Fifth Lens L115 |
| S112 | 9.482251 | 0.336351 | | | | |
| S113 | ∞ | 0.54772 | | | | Stop ST11 |
| S114 | −9.47203 | 0.40629 | 1.543915 | 55.9512 | 33.33143 | The First Lens L111 |
| S115 | −6.2767 | 1.390833 | | | | |
| S116 | −1.3996 | 0.733813 | 1.661342 | 20.3729 | −20.3528 | The Second Lens L112 |
| S117 | −1.88921 | 0.047214 | | | | |
| S118 | 7.524683 | 1.96791 | 1.945958 | 17.9439 | 6.044728 | The Third Lens L113 |
| S119 | −17.3496 | 0.112765 | | | | |
| S1110 | 4.458774 | 0.548079 | 1.661342 | 20.3729 | −9.54765 | The Fourth Lens L114 |
| S1111 | 2.446003 | 0.476435 | | | | |
| S1112 | ∞ | 0.700425 | 1.516797 | 64.2124 | | Optical Filter OF11 |
| S1113 | ∞ | 0.508777 | | | | |

The definition of aspheric surface sag z of each aspheric lens in table 31 is the same as that of in Table 16, and is not described here again.

In the eleventh embodiment, the conic constant k and the aspheric coefficients A, B, C, D, E, F, G of each aspheric lens are shown in Table 32.

TABLE 32

| Surface Number | k | A<br>E | B<br>F | C<br>G | D |
|---|---|---|---|---|---|
| S114 | −198.99125 | −0.039080575<br>−0.001131297 | 0.020841812<br>0.002470088 | −0.01229672<br>−0.001038633 | 0.000197748 |
| S115 | 0.97126 | −0.014389127<br>0.000106232 | −0.001441984<br>0.000679002 | −0.00298736<br>0.000314135 | −0.001406179 |
| S116 | −0.47308 | 0.013078311<br>0.00035647 | 0.000608593<br>−0.000323491 | −0.000288588<br>6.84E−05 | 0.000474103 |
| S117 | −1.01146 | 0.001487229<br>−6.95E−06 | −0.000977573<br>8.66E−07 | 0.000640356<br>2.91E−08 | 2.96E−06 |
| S1110 | −22.98041 | −0.017388991<br>−1.76E−06 | −3.67E−05<br>9.80E−08 | 0.000248808<br>2.45E−09 | −1.06E−05 |
| S1111 | −6.24639 | −0.014596958<br>−5.18E−07 | 0.001317709<br>−1.64E−07 | −0.000149159<br>1.05E−08 | 2.00E−05 |

Table 33 shows the parameters and condition values for conditions (21)-(29) in accordance with the eleventh embodiment of the invention. It can be seen from Table 32 that the lens assembly 11 of the eleventh embodiment satisfies the conditions (21)-(29).

TABLE 33

| D | 2.9029 mm | L5T | 1.266335 mm | E | 0.897992 mm |
|---|---|---|---|---|---|
| TCE | 6 × 10⁻⁶/° C. | L5T/E | 1.41 | | |

Figure 22A:
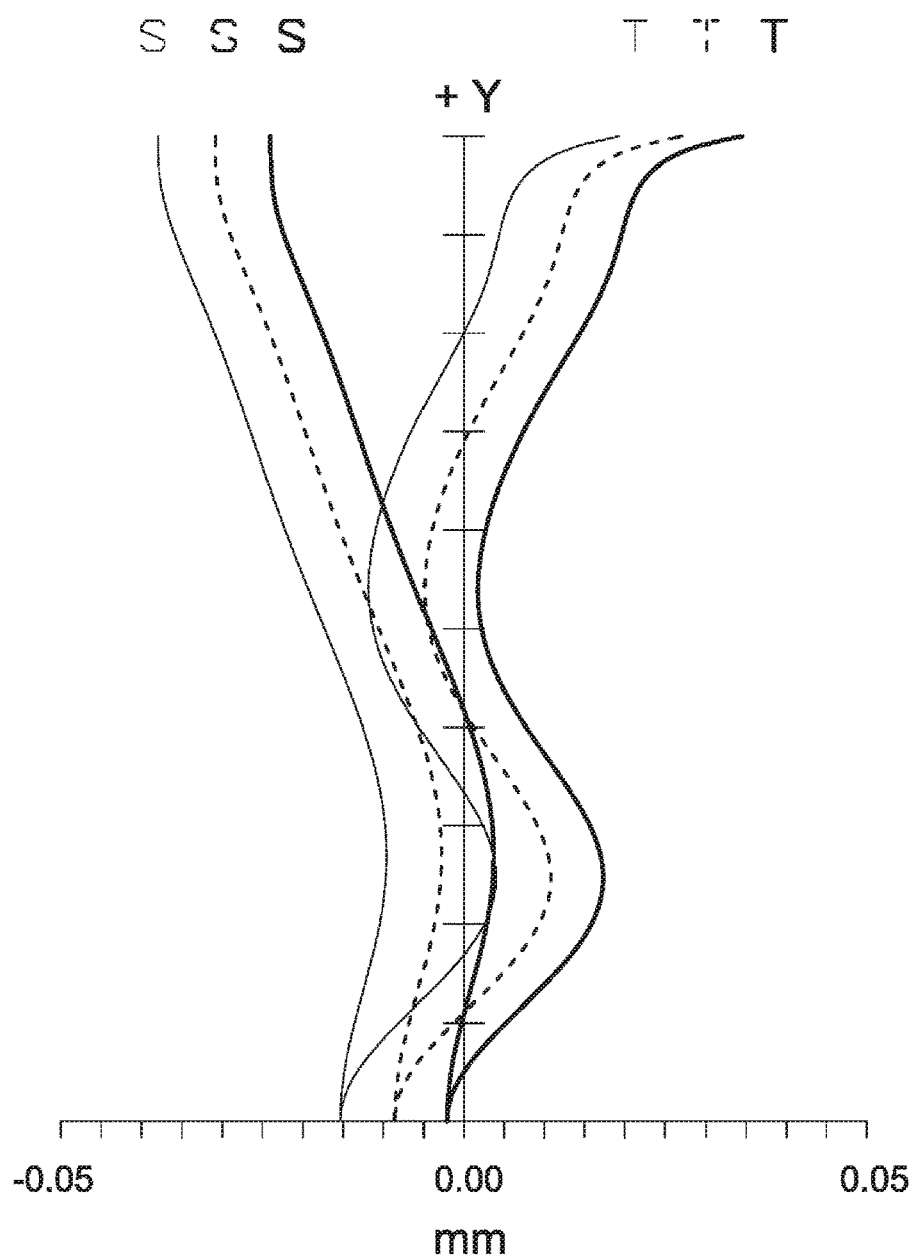
FIG. 22A depicts a field curvature diagram of the lens assembly in accordance with the eleventh embodiment of the invention.
Figure 22B:
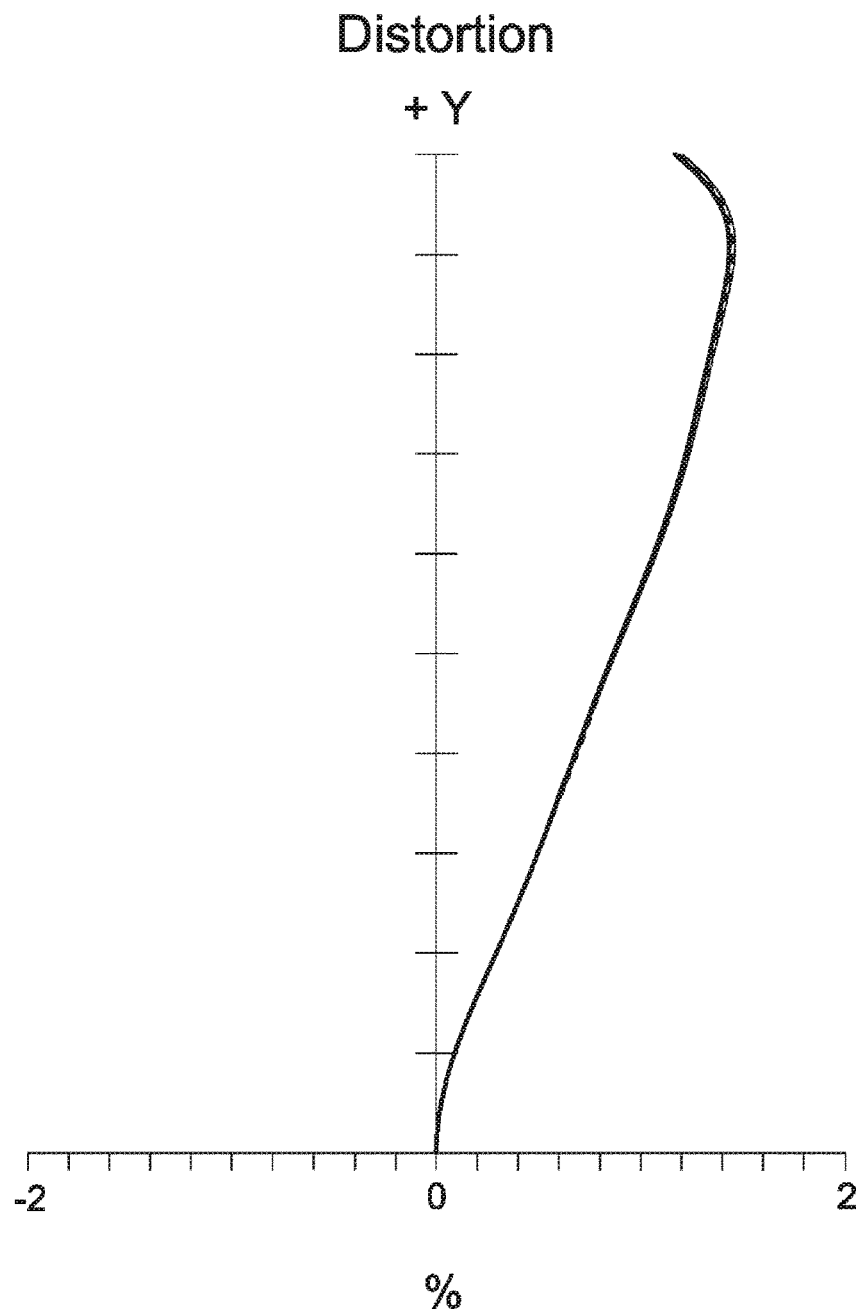
FIG. 22B is a distortion diagram of the lens assembly in accordance with the eleventh embodiment of the invention.
Figure 22C:
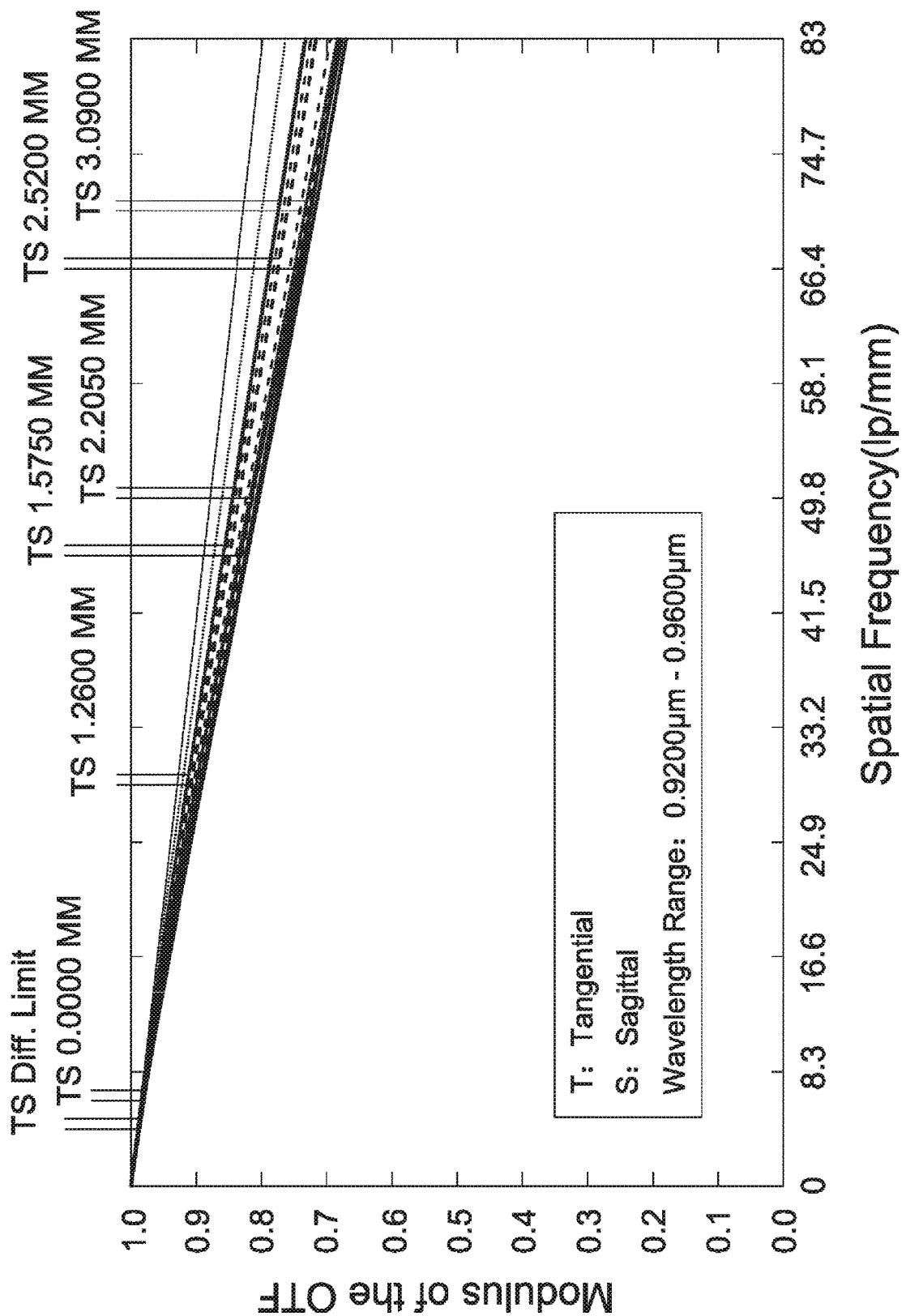
FIG. 22C is a modulation transfer function diagram of the lens assembly in accordance with the eleventh embodiment of the invention.

By the above arrangements of the lenses and stop ST11, the lens assembly 11 of the eleventh embodiment can meet the requirements of optical performance as seen in FIGS. 22A-22C.

It can be seen from FIG. 22A that the field curvature of tangential direction and sagittal direction in the lens assembly 11 of the eleventh embodiment ranges from −0.04 mm to 0.05 mm. It can be seen from FIG. 22B that the distortion in the lens assembly 11 of the eleventh embodiment ranges from 0% to 1.6%. It can be seen from FIG. 22C that the modulation transfer function of tangential direction and sagittal direction in the lens assembly 11 of the eleventh embodiment ranges from 0.67 to 1.0.

It is obvious that the field curvature and the distortion of the lens assembly 11 of the eleventh embodiment can be corrected effectively, and the resolution of the lens assembly 11 of the eleventh embodiment can meet the requirement. Therefore, the lens assembly 11 of the eleventh embodiment is capable of good optical performance.

Figure 23:
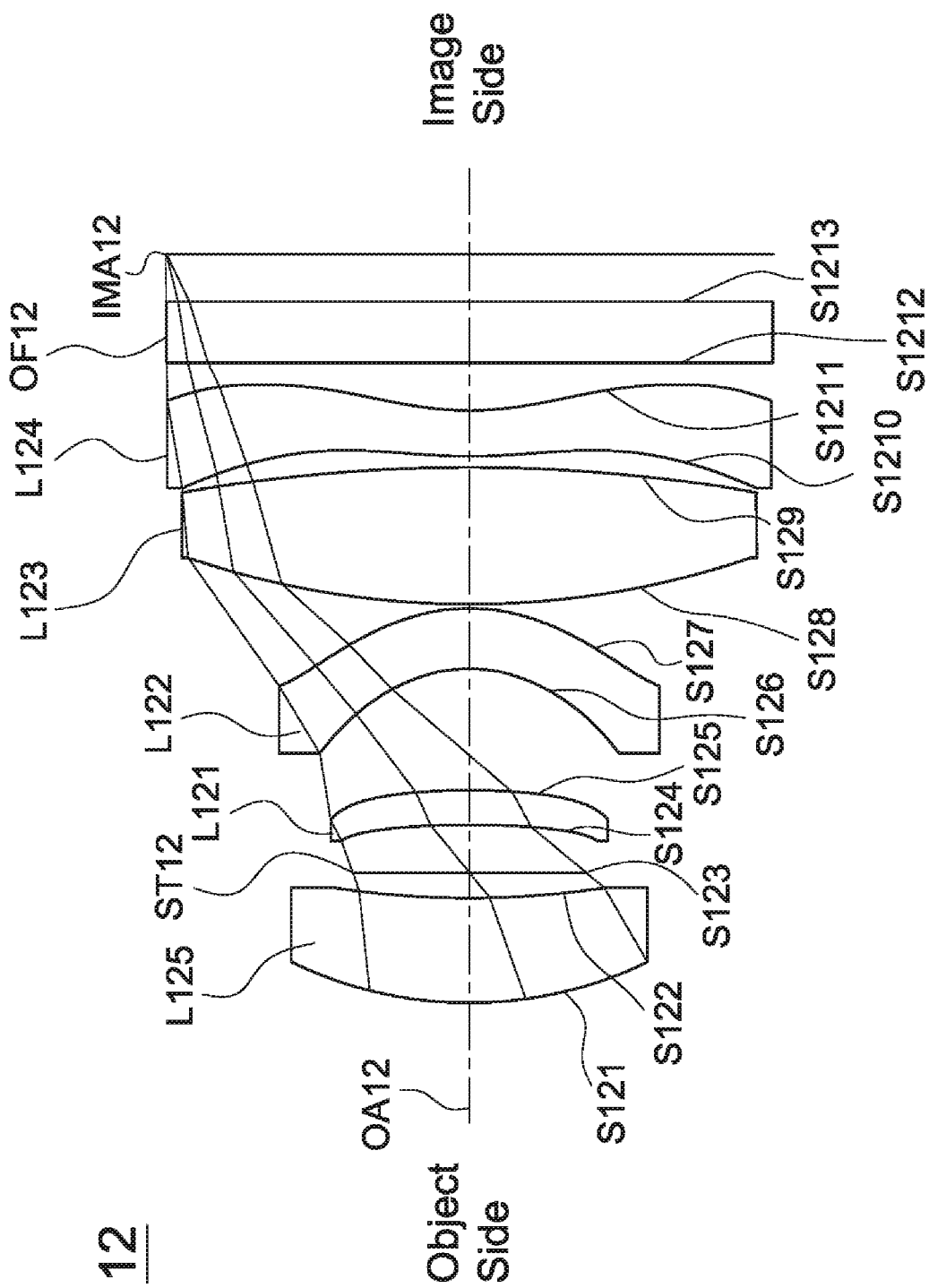
FIG. 23 is a lens layout and optical path diagram of a lens assembly in accordance with a twelfth embodiment of the invention.

Referring to FIG. 23, the lens assembly 12 includes a fifth lens L125, a stop ST12, a first lens L121, a second lens L122, a third lens L123, a fourth lens L124, and an optical filter OF12, all of which are arranged in order from an object side to an image side along an optical axis OA12. In operation, the light from the object side is imaged on an image plane IMA12.

According to the foregoing, wherein: the fifth lens L125 is a meniscus lens with positive refractive power and made of glass or plastic material, wherein the object side surface S121 is a convex surface, the image side surface S122 is a concave surface, and both of the object side surface S121 and image side surface S122 are spherical surfaces; the first lens L121 is a meniscus lens, wherein the object side surface S124 is a concave surface; the second lens L122 is a meniscus lens, wherein the image side surface S127 is a convex surface; the third lens L123 is a biconvex lens, wherein the image side surface S129 is a convex surface and both of the object side surface S128 and image side surface S129 are spherical surfaces; the fourth lens L124 is a meniscus lens with negative refractive power and made of glass or plastic material, wherein the object side surface S1210 is a convex surface and the object side surface S1210 is an aspheric surface; and both of the object side surface S1212 and image side surface S1213 of the optical filter OF12 are plane surfaces.

With the above design of the lenses, stop ST12, and at least any one of the conditions (21)-(29) satisfied, the lens assembly 12 can have an effective shortened total lens length, an effective increased resolution, an effective resisted environmental temperature change, an effective corrected aberration, and is capable of an effective corrected chromatic aberration.

Table 34 shows the optical specification of the lens assembly 12 in FIG. 23.

TABLE 34

Effective Focal Length = 5.79 mm F-number = 2.0
Total Lens Length = 8.19 mm Field of View = 55.11 degrees

| Surface Number | Radius of Curvature (mm) | Thickness (mm) | Nd | Vd | Effective Focal Length (mm) | Remark |
|---|---|---|---|---|---|---|
| S121 | 3.935692 | 1.186649 | 2.001784 | 19.325 | 6.802067 | The Fifth Lens L125 |
| S122 | 8.464791 | 0.290445 | | | | |
| S123 | ∞ | 0.540718 | | | | Stop ST12 |
| S124 | −9.00662 | 0.393322 | 1.543915 | 55.9512 | 39.91597 | The First Lens L121 |
| S125 | −6.42959 | 1.375738 | | | | |
| S126 | −1.40571 | 0.385239 | 1.661342 | 20.3729 | −28.6481 | The Second Lens L122 |
| S127 | −1.88118 | 0.047214 | | | | |
| S128 | 8.423747 | 1.549774 | 1.945958 | 17.9439 | 6.274073 | The Third Lens L123 |
| S129 | −15.7453 | 0.125701 | | | | |
| S1210 | 5.192829 | 0.515782 | 1.661342 | 20.3729 | −8.757644 | The Fourth Lens L124 |
| S1211 | 2.581012 | 0.542045 | | | | |
| S1212 | ∞ | 0.700425 | 1.516797 | 64.2124 | | Optical Filter OF12 |
| S1213 | ∞ | 0.532498 | | | | |

The definition of aspheric surface sag z of each aspheric lens in table 34 is the same as that of in Table 16, and is not described here again.

In the twelfth embodiment, the conic constant k and the aspheric coefficients A, B, C, D, E, F, G of each aspheric lens are shown in Table 35.

TABLE 35

| Surface Number | k | A E | B F | C G | D |
|---|---|---|---|---|---|
| S124 | −1.8218208 | −0.037405167 −0.000973744 | 0.021456633 0.00260212 | −0.01302741 −0.001125216 | 0.00016725 |
| S125 | −2.96846 | −0.012075656 0.000126268 | −0.002658559 0.000654463 | −0.003085045 −0.000315947 | −0.001291418 |
| S126 | −0.46591 | 0.017504217 0.000376188 | 0.000601285 −0.000331765 | −0.00064421 6.89E−05 | 0.000503056 |
| S127 | −1.13584 | 0.003520561 −3.75E−06 | −0.001180144 4.13E−07 | 0.000692902 −5.39E−08 | 2.37E−05 |
| S1210 | −38.45769 | −0.017342398 −1.92E−06 | 8.55E−05 8.79E−08 | 0.000254963 4.42E−09 | −1.11E−05 |
| S1211 | −7.91158 | −0.01494149 −5.40E−07 | 0.001311208 −1.63E−07 | −0.000147028 1.06E−08 | 1.99E−05 |

Table 36 shows the parameters and condition values for conditions (21)-(29) in accordance with the twelfth embodiment of the invention. It can be seen from Table 36 that the lens assembly 12 of the twelfth embodiment satisfies the conditions (21)-(29).

TABLE 36

| D | 2.898295 mm | L5T | 1.186649 mm | E | 0.841372 mm |
|---|---|---|---|---|---|
| TCE | 8.4 × 10⁻⁶/° C. | L5T/E | 1.41 | | |

Figure 24A:
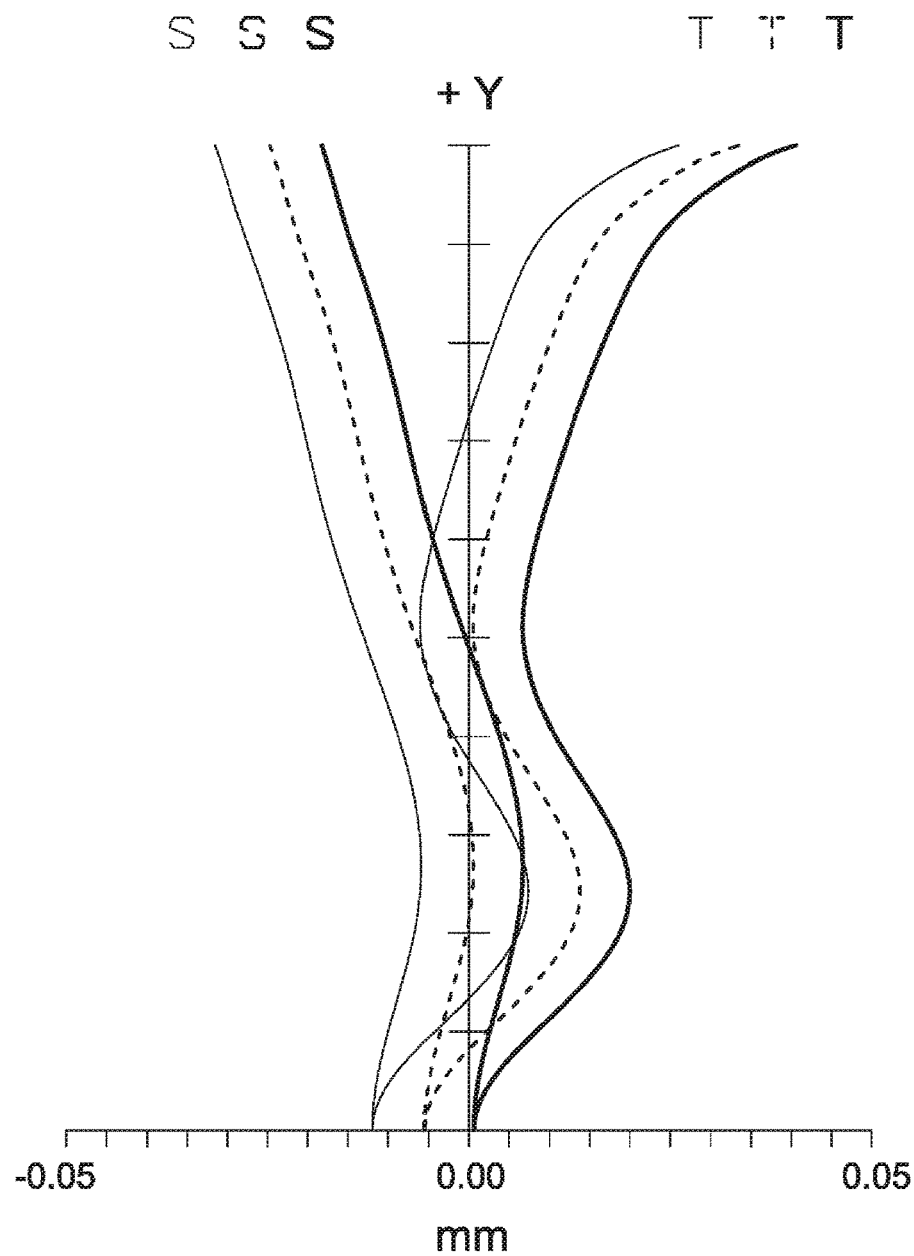
FIG. 24A depicts a field curvature diagram of the lens assembly in accordance with the twelfth embodiment of the invention.
Figure 24B:
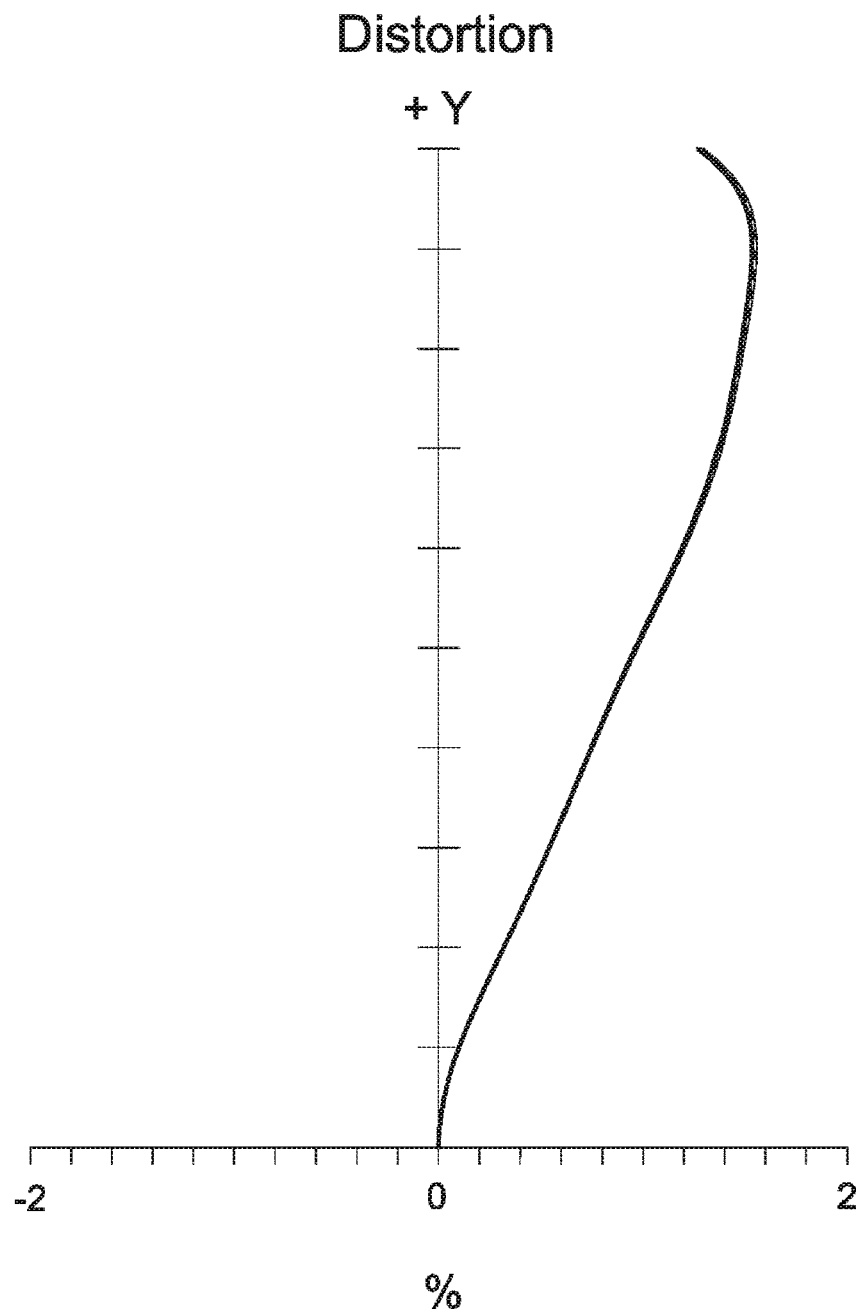
FIG. 24B is a distortion diagram of the lens assembly in accordance with the twelfth embodiment of the invention.
Figure 24C:
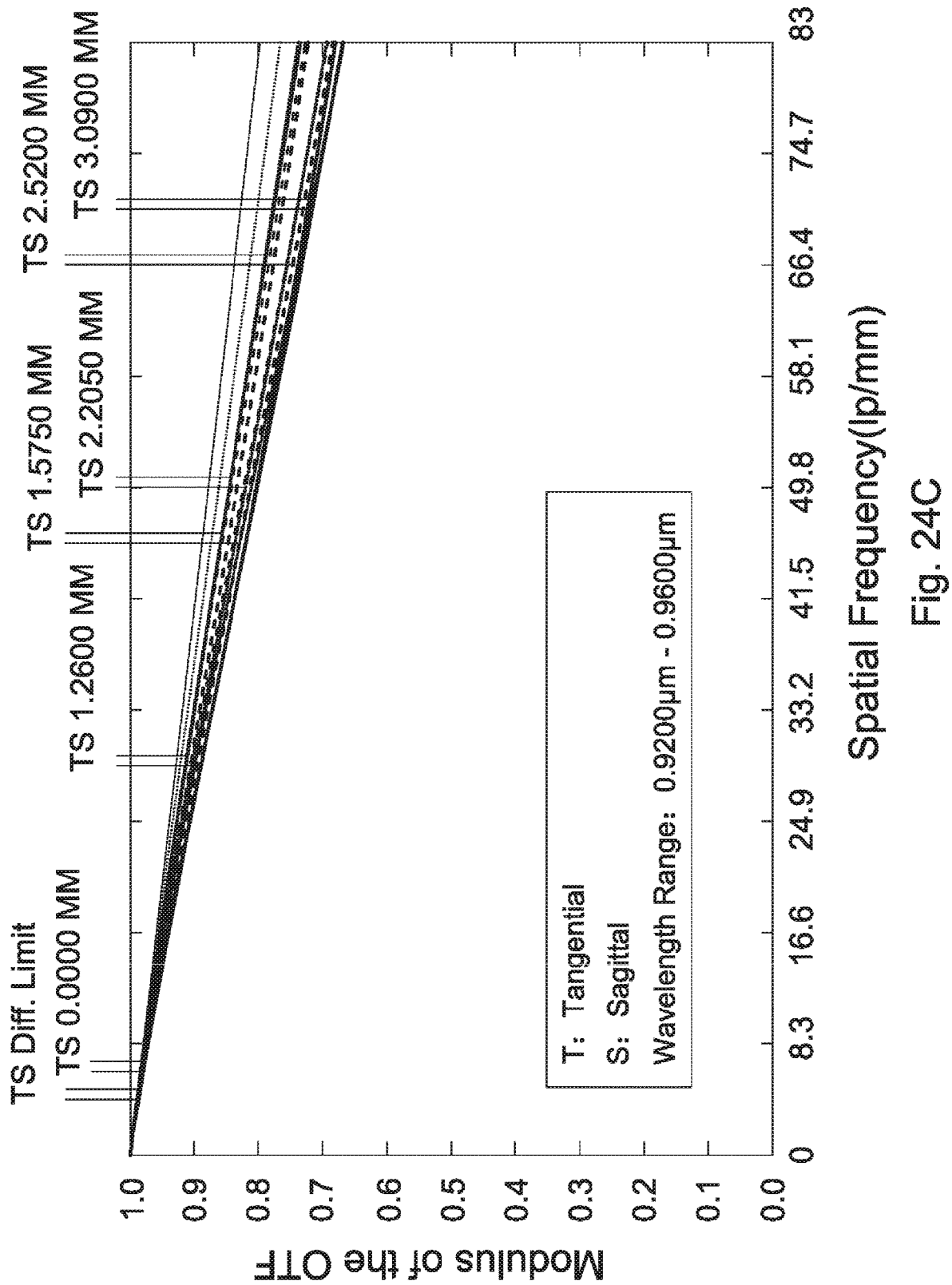
FIG. 24C is a modulation transfer function diagram of the lens assembly in accordance with the twelfth embodiment of the invention.

By the above arrangements of the lenses and stop ST12, the lens assembly 12 of the twelfth embodiment can meet the requirements of optical performance as seen in FIGS. 24A-24C.

It can be seen from FIG. 24A that the field curvature of tangential direction and sagittal direction in the lens assembly 12 of the twelfth embodiment ranges from −0.035 mm to 0.045 mm. It can be seen from FIG. 24B that the distortion in the lens assembly 12 of the twelfth embodiment ranges from 0% to 1.6%. It can be seen from FIG. 24C that the modulation transfer function of tangential direction and sagittal direction in the lens assembly 12 of the twelfth embodiment ranges from 0.67 to 1.0.

It is obvious that the field curvature and the distortion of the lens assembly 12 of the twelfth embodiment can be corrected effectively, and the resolution of the lens assembly 12 of the twelfth embodiment can meet the requirement. Therefore, the lens assembly 12 of the twelfth embodiment is capable of good optical performance.

Figure 25:
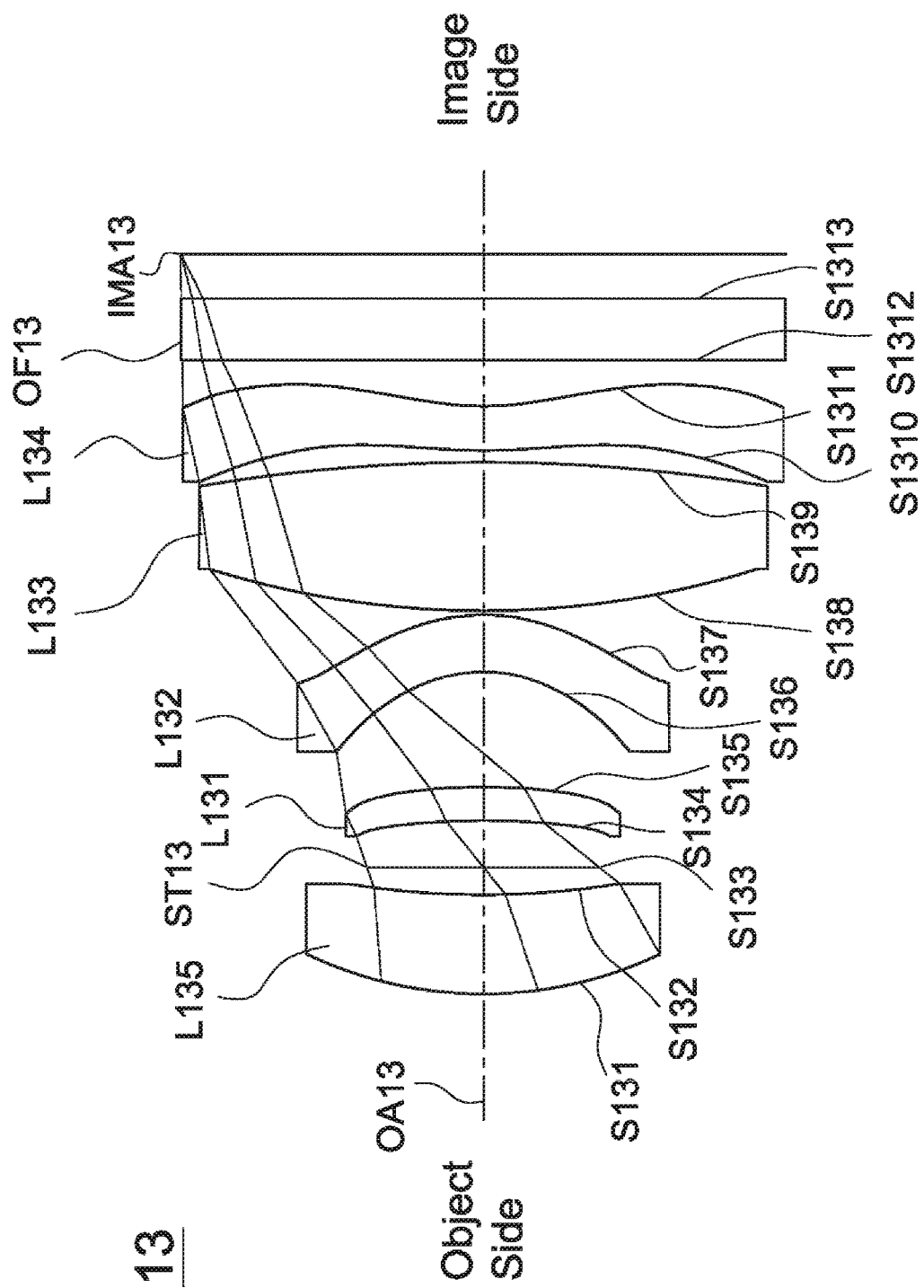
FIG. 25 is a lens layout and optical path diagram of a lens assembly in accordance with a thirteenth embodiment of the invention.

Referring to FIG. 25, the lens assembly 13 includes a fifth lens L135, a stop ST13, a first lens L131, a second lens L132, a third lens L133, a fourth lens L134, and an optical filter OF13, all of which are arranged in order from an object side to an image side along an optical axis OA13. In operation, the light from the object side is imaged on an image plane IMA13

According to the foregoing, wherein: the fifth lens L135 is a meniscus lens with positive refractive power and made of glass or plastic material, wherein the object side surface S131 is a convex surface, the image side surface S132 is a concave surface, and both of the object side surface S131 and image side surface S132 are spherical surfaces; the first lens L131 is a meniscus lens, wherein the object side surface S134 is a concave surface; the second lens L132 is a meniscus lens, wherein the image side surface S137 is a convex surface; the third lens L133 is a biconvex lens, wherein the image side surface S139 is a convex surface and both of the object side surface S138 and image side surface S139 are spherical surfaces; the fourth lens L134 is a meniscus lens with negative refractive power and made of glass or plastic material, wherein the object side surface S1310 is a convex surface and the object side surface S1310 is an aspheric surface; and both of the object side surface S1312 and image side surface S1313 of the optical filter OF13 are plane surfaces.

With the above design of the lenses, stop ST13, and at least any one of the conditions (21)-(29) satisfied, the lens assembly 13 can have an effective shortened total lens length, an effective increased resolution, an effective resisted environmental temperature change, an effective corrected aberration, and is capable of an effective corrected chromatic aberration.

Table 37 shows the optical specification of the lens assembly 13 in FIG. 25.

TABLE 37

Effective Focal Length = 5.79 mm F-number = 2.0
Total Lens Length = 8.41 mm Field of View = 55.086 degrees

| Surface Number | Radius of Curvature (mm) | Thickness (mm) | Nd | Vd | Effective Focal Length (mm) | Remark |
| --- | --- | --- | --- | --- | --- | --- |
| S131 | 3.982505 | 1.124168 | 2.102999 | 18.0511 | 6.472169 | The Fifth Lens L135 |
| S132 | 8.196364 | 0.310158 | | | | |
| S133 | ∞ | 0.530517 | | | | Stop ST13 |
| S134 | −8.25083 | 0.389504 | 1.543915 | 55.9512 | 51.8046 | The First Lens L131 |
| S135 | −6.46134 | 1.305865 | | | | |
| S136 | −1.42388 | 0.647982 | 1.661342 | 20.3729 | −22.6349 | The Second Lens L132 |
| S137 | −1.85981 | 0.047214 | | | | |
| S138 | 8.905051 | 1.68856 | 1.945958 | 17.9439 | 6.593054 | The Third Lens L133 |
| S139 | −16.2986 | 0.133293 | | | | |
| S1310 | 5.385474 | 0.505013 | 1.661342 | 20.3729 | −10.0388 | The Fourth Lens L134 |
| S1311 | 2.812151 | 0.519068 | | | | |
| S1312 | ∞ | 0.700425 | 1.516797 | 64.2124 | | Optical Filter OF13 |
| S1313 | ∞ | 0.505963 | | | | |

The definition of aspheric surface sag z of each aspheric lens in table 37 is the same as that of in Table 16, and is not described here again.

In the thirteenth embodiment, the conic constant k and the aspheric coefficients A, B, C, D, E, F, G of each aspheric lens are shown in Table 38.

TABLE 38

| Surface Number | k | A E | B F | C G | D |
| --- | --- | --- | --- | --- | --- |
| S134 | −149.97542 | −0.03621325 | 0.022298996 | −0.012802649 | −2.51E−05 |
| | | −0.000952638 | 0.002503675 | −0.001077983 | |
| S135 | −5.82246 | −0.011093431 | −0.002507191 | −0.003063226 | −0.001511286 |
| | | 0.000125019 | 0.000666585 | −0.000313545 | |
| S136 | −0.47816 | 0.01744862 | −0.000159595 | −0.000539317 | 0.000456602 |
| | | 0.000394915 | −0.000330973 | 6.50E−05 | |
| S137 | −1.15720 | 0.004155917 | −0.000756778 | 0.000776814 | 3.46E−05 |
| | | −1.65E−06 | 3.08E−07 | −2.56E−07 | |
| S1310 | −44.91773 | −0.017066787 | 1.09E−04 | 0.000252699 | −1.13E−05 |
| | | −1.92E−06 | 8.88E−08 | 4.52E−09 | |
| S1311 | −9.51625 | −0.015578827 | 0.001331543 | −0.000148357 | 1.98E−05 |
| | | −5.47E−07 | −1.63E−07 | 1.07E−08 | |

Table 39 shows the parameters and condition values for conditions (21)-(29) in accordance with the thirteenth embodiment of the invention. It can be seen from Table 39 that the lens assembly 13 of the thirteenth embodiment satisfies the conditions (21)-(29).

TABLE 39

| D | 2.9 mm | L5T | 1.124168 mm | E | 0.796983 mm |
|---|---|---|---|---|---|
| TCE | 8.4 × 10⁻⁶/° C. | L5T/E | 1.41 | | |

Figure 26A:
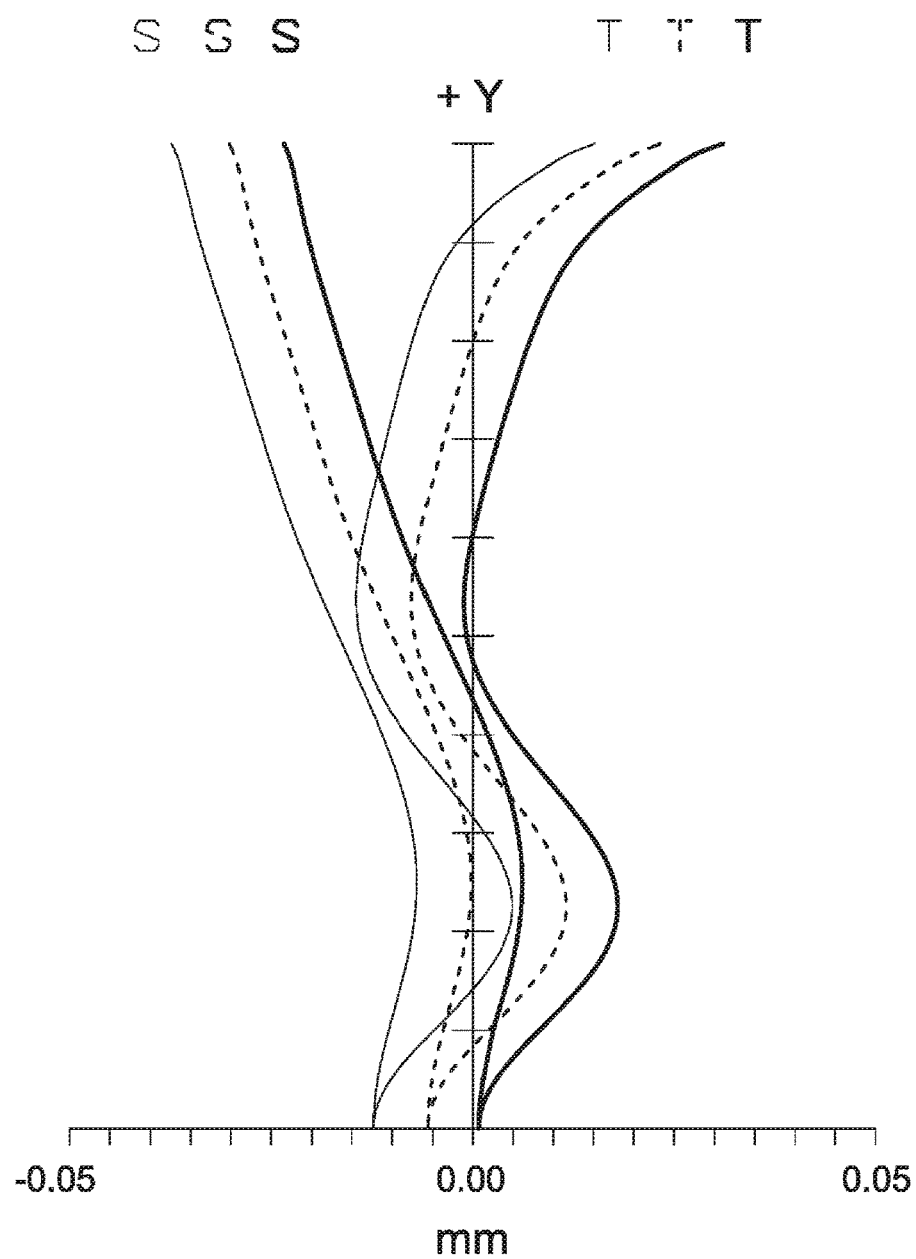
FIG. 26A depicts a field curvature diagram of the lens assembly in accordance with the thirteenth embodiment of the invention.
Figure 26B:
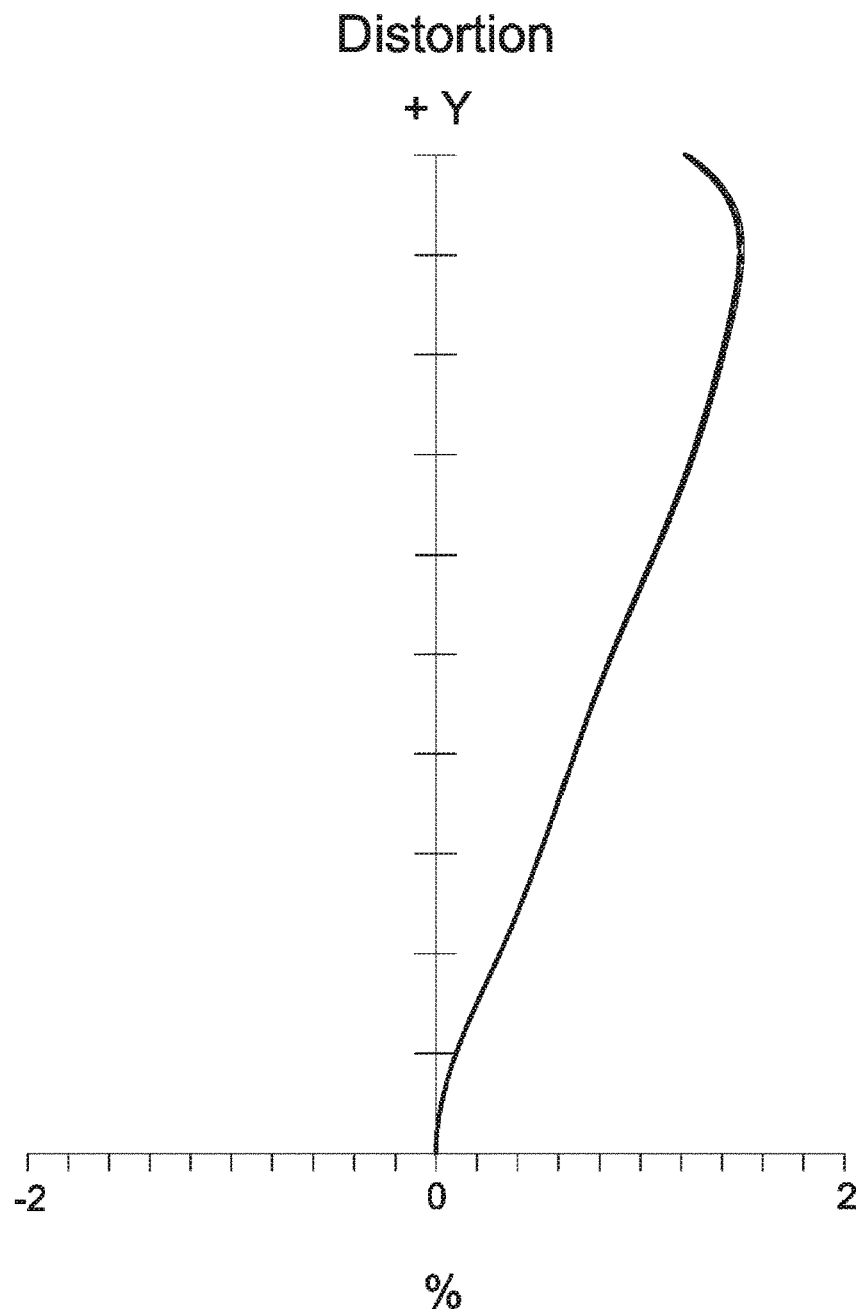
FIG. 26B is a distortion diagram of the lens assembly in accordance with the thirteenth embodiment of the invention.
Figure 26C:
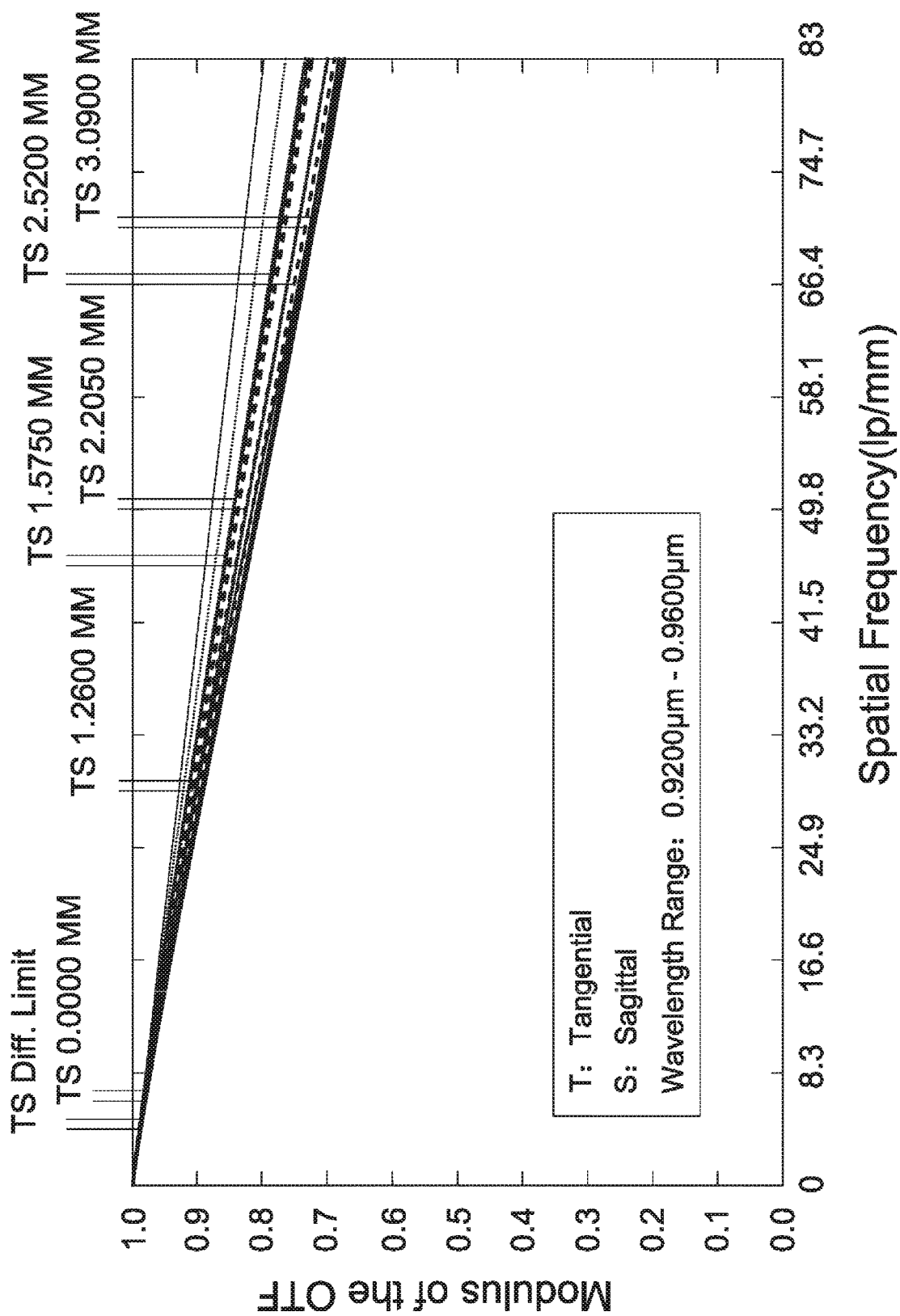
FIG. 26C is a modulation transfer function diagram of the lens assembly in accordance with the thirteenth embodiment of the invention.

By the above arrangements of the lenses and stop ST13, the lens assembly 13 of the thirteenth embodiment can meet the requirements of optical performance as seen in FIGS. 26A-26C.

It can be seen from FIG. 26A that the field curvature of tangential direction and sagittal direction in the lens assembly 13 of the thirteenth embodiment ranges from −0.04 mm to 0.035 mm. It can be seen from FIG. 26B that the distortion in the lens assembly 13 of the thirteenth embodiment ranges from 0% to 1.6%. It can be seen from FIG. 26C that the modulation transfer function of tangential direction and sagittal direction in the lens assembly 13 of the thirteenth embodiment ranges from 0.66 to 1.0.

It is obvious that the field curvature and the distortion of the lens assembly 13 of the thirteenth embodiment can be corrected effectively, and the resolution of the lens assembly 13 of the thirteenth embodiment can meet the requirement. Therefore, the lens assembly 13 of the thirteenth embodiment is capable of good optical performance.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A lens assembly comprising:
    a first lens which is with positive refractive power and comprises a concave surface facing an object side and a convex surface facing an image side;
    a second lens which is with negative refractive power and comprises a concave surface facing the object side;
    a third lens which is with positive refractive power; and
    a fourth lens which is with refractive power and comprises a concave surface facing the image side;
    wherein the first lens, the second lens, the third lens, and the fourth lens are arranged in order from the object side to the image side along an optical axis;
    wherein the lens assembly satisfies at least any one of the following conditions:

$5\ mm < ALOD < 14\ mm$;

$0 < TTL/ALOD < 2$;

$0.2\ mm^2 < L1T \times L1SD < 2.2\ mm^2$;

$-4\ mm^2 < L1T \times R_{11} < 0\ mm^2$;

wherein TTL is a total length of optical system of the lens assembly, ALOD is a total effective optical diameter of an object side surface of each lens of the lens assembly, L1T is a thickness along the optical axis of the first lens, L1SD is an effective optical semi-diameter of an image side surface of the first lens, and $R_{11}$ is a radius of curvature of an object side surface of the first lens.

2. The lens assembly as claimed in claim 1, wherein:
    the lens assembly further comprises a reflective element disposed between the first lens and the fourth lens; and
    the reflective element comprises a reflective surface.

3. The lens assembly as claimed in claim 2, wherein the lens assembly satisfies at least any one of the following conditions:

$1 < (TTL+f)/f_{obj1} < 5$;

$1 < f_{obj1}/L1T < 4$;

$TTL/f > 1.2$;

wherein TTL is the total length of optical system of the lens assembly, f is an effective focal length of the lens assembly, $f_{obj1}$ is an effective focal length of a lens closest to the object side, and L1T is a thickness along the optical axis of the first lens.

4. The lens assembly as claimed in claim 2, wherein the lens assembly satisfies at least any one of the following conditions:

$0.5 < M1T/L1T < 4$;

$1 < TTL/L < 5$;

$0 < L/f < 2.5$;

$-1 < f_{obj3}/f_{obj4} < 2$;

wherein M1T is an interval from an image side surface of the first lens to the reflective surface along the optical axis, L1T is a thickness along the optical axis of the first lens, TTL is a total length of optical system of the lens assembly, L is an interval from an object side surface of a lens closest to the object side to the reflective surface along the optical axis, $f_{obj3}$ is an effective focal length of a lens third close to the object side, $f_{obj4}$ is an effective focal length of a lens fourth close to the object side, and f is an effective focal length of the lens assembly.

5. The lens assembly as claimed in claim 1, wherein the second lens further comprises a convex surface or a concave surface facing the image side, the third lens comprises a convex surface facing the object side.

6. The lens assembly as claimed in claim 5, wherein:
    the third lens further comprises a concave surface or another convex surface facing the image side; and
    the fourth lens is with negative refractive power and further comprises a convex surface facing the object side.

7. The lens assembly as claimed in claim 5 further comprising a fifth lens disposed between the object side and the first lens, wherein:
    the fifth lens is a meniscus lens with positive refractive power and comprises a convex surface facing the object side and a concave surface facing the image side;
    the third lens further comprises a plane surface or another convex surface facing the image side; and
    the fourth lens is with negative refractive power and further comprises a plane surface or a convex surface facing the object side.

8. The lens assembly as claimed in claim 1 further comprising a fifth lens disposed between the object side and the first lens, wherein:
    the fifth lens is a meniscus lens with positive refractive power and comprises a convex surface facing the object side and a concave surface facing the image side;

the second lens further comprises a convex surface facing the image side;
the third lens comprises a convex surface facing the image side; and
the fourth lens is with negative refractive power and further comprises a convex surface facing the object side.

9. The lens assembly as claimed in claim 8, wherein the lens assembly satisfies:

8 mm≤TTL1≤9 mm;

wherein TTL1 is an interval from the convex surface of the fifth lens to an image plane along the optical axis.

10. The lens assembly as claimed in claim 9, wherein the lens assembly satisfies:

D=f/2, 2.85 mm≤D≤2.95 mm;

wherein D is an effective diameter of an entrance pupil of the lens assembly and f is an effective focal length of the lens assembly.

11. The lens assembly as claimed in claim 8, wherein the lens assembly satisfies at least any one of the following conditions:

55 degrees≤FOV≤65 degrees;

0/° C.≤TCE<10×10$^{-6}$/° C.;

0.5≤L5T/E≤1.47;

Nd$_5$≥1.9;

Vd$_5$<20;

wherein FOV is a field of view of the lens assembly, TCE is a coefficient of thermal expansion of the fifth lens at 25 degrees Celsius, L5T is a thickness along the optical axis of the fifth lens, E is a thickness of the outermost periphery of the fifth lens, Nd$_5$ is an index of refraction of the fifth lens, and Vd$_5$ is an Abbe number of the fifth lens.

12. A lens assembly comprising:
a first lens which is with positive refractive power and comprises a convex surface facing an image side;
a second lens which is with negative refractive power and comprises a concave surface facing an object side;
a third lens which is with positive refractive power;
a fourth lens which is with refractive power and comprises a concave surface facing the image side; and
a reflective element which comprises a reflective surface;
wherein the first lens, the second lens, the third lens, and the fourth lens are arranged in order from the object side to the image side along an optical axis;
wherein the reflective element is disposed between the first lens and the fourth lens;
wherein the lens assembly further comprises a fifth lens disposed between the fourth lens and the image side or the third lens and the fourth lens, wherein the fifth lens is with positive refractive power and comprises a convex surface facing the image side; wherein the lens assembly satisfies:

−2 mm<8×M1T−(OD$_2$+OD$_3$+OD$_4$+OD$_5$)<1 mm;

2 mm<L<6 mm;

wherein L is an interval from an object side surface of a lens closest to the object side to the reflective surface along the optical axis, M1T is an interval from an image side surface of the first lens to the reflective surface along the optical axis, OD$_2$ is an effective optical diameter of an object side surface of a lens second close to the object side, OD$_3$ is an effective optical diameter of an object side surface of a lens third close to the object side, OD$_4$ is an effective optical diameter of an object side surface of a lens fourth close to the object side, and OD$_5$ is an effective optical diameter of an object side surface of a lens fifth close to the object side.

13. A lens assembly comprising:
a first lens which is with positive refractive power and comprises a convex surface facing an image side;
a second lens which is with negative refractive power and comprises a concave surface facing an object side;
a third lens which is with positive refractive power;
a fourth lens which is with refractive power and comprises a concave surface facing the image side; and
a reflective element which comprises a reflective surface;
wherein the first lens, the second lens, the third lens, and the fourth lens are arranged in order from the object side to the image side along an optical axis;
wherein the reflective element is disposed between the first lens and the fourth lens;
wherein the lens assembly satisfies at least any one of the following conditions:

5 mm<ALOD<14 mm;

0<TTL/ALOD<2;

wherein ALOD is a total effective optical diameter of an object side surface of each lens of the lens assembly and TTL is a total length of optical system of the lens assembly.

14. The lens assembly as claimed in claim 13 further comprising a fifth lens disposed between the fourth lens and the image side or the third lens and the fourth lens, wherein the fifth lens is with positive refractive power and comprises a convex surface facing the image side.

15. The lens assembly as claimed in claim 14 wherein the fifth lens further comprises another convex surface facing the object side;
the second lens further comprises a convex surface or a concave surface facing the image side;
the third lens comprises a convex surface facing the object side and a concave surface or a convex surface facing the image side; and
the fourth lens is with positive or negative refractive power and further comprises a convex surface facing the object side.

16. The lens assembly as claimed in claim 14 further comprising a sixth lens disposed between the third lens and the fifth lens, wherein:
the sixth lens is a meniscus lens with negative refractive power and comprises a concave surface facing the object side and a convex surface facing the image side;
the fifth lens is a meniscus lens and further comprises a concave surface facing the object side;
the second lens further comprises another concave surface facing the image side;
the third lens further comprises another convex surface facing the image side; and
the fourth lens is with positive refractive power and further comprises a convex surface facing the object side.

17. The lens assembly as claimed in claim 13, wherein:
the second lens further comprises a convex surface or a concave surface facing the image side; and
the third lens comprises a convex surface facing the object side.

18. The lens assembly as claimed in claim 17, wherein the first lens further comprises another convex surface facing the object side.

19. The lens assembly as claimed in claim 13, wherein the lens assembly satisfies:

2 mm<$L$<6 mm;

wherein L is an interval from an object side surface of a lens closest to the object side to the reflective surface along the optical axis.

20. The lens assembly as claimed in claim 13, wherein the lens assembly satisfies at least any one of the following conditions:

1<(TTL+$f$)/$f_{obj1}$<5;

−1<$f_{obj3}$/$f_{obj4}$<2;

1<$f_{obj1}$/$L1T$<4;

0.2 mm²<$L1T$×$L1SD$<2.2 mm²;

−4 mm²<$L1T$×$R_{11}$<0 mm²;

0.5<$M1T$/$L1T$<4;

1<TTL/$L$<5;

0<$L$/$f$<2.5;

wherein TTL is a total length of optical system of the lens assembly, f is an effective focal length of the lens assembly, $f_{obj1}$ is an effective focal length of a lens closest to the object side, $f_{obj3}$ is an effective focal length of a lens third close to the object side, $f_{obj4}$ is an effective focal length of a lens fourth close to the object side, L1T is a thickness along the optical axis of the first lens, L1SD is an effective optical semi-diameter of an image side surface of the first lens, $R_{11}$ is a radius of curvature of an object side surface of the first lens, M1T is an interval from an image side surface of the first lens to the reflective surface along the optical axis, L1T is a thickness along the optical axis of the first lens, L is an interval from an object side surface of a lens closest to the object side to the reflective surface along the optical axis, and f is an effective focal length of the lens assembly.

* * * * *